United States Patent [19]
Nakatsuma et al.

[11] Patent Number: 6,115,132
[45] Date of Patent: *Sep. 5, 2000

[54] PRINTING SYSTEM THAT TRANSMITS JOB INFORMATION INDEPENDENTLY OF PRINT DATA

[75] Inventors: Takuji Nakatsuma, Urayasu; Takashi Yagita, Tokyo; Junichi Takeda, Inagi; Koichiro Wanda, Kawasaki; Mitsuo Kimura; Takuya Kakehashi, both of Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/997,790

[22] Filed: Dec. 24, 1997

[30] Foreign Application Priority Data

| Dec. 27, 1996 | [JP] | Japan | 8-349634 |
| Dec. 27, 1996 | [JP] | Japan | 8-350179 |
| Dec. 27, 1996 | [JP] | Japan | 8-350208 |
| Oct. 1, 1997 | [JP] | Japan | 9-268663 |
| Oct. 9, 1997 | [JP] | Japan | 9-277158 |
| Nov. 1, 1997 | [JP] | Japan | 9-305739 |

[51] Int. Cl.[7] .................................................. G06K 15/00

[52] U.S. Cl. .......................................... 358/1.14; 714/18

[58] Field of Search ........................... 395/101, 112–116; 358/406, 404, 408, 296, 444, 407; 714/1, 2, 4, 5, 15–20, 23–25, 30–31, 44–45, 47–49

[56] References Cited

U.S. PATENT DOCUMENTS

| 4,958,298 | 9/1990 | Okamoto | 364/519 |
| 5,327,526 | 7/1994 | Nomura et al. | 395/115 |
| 5,566,278 | 10/1996 | Patel et al. | 395/114 |
| 5,625,757 | 4/1997 | Kageyama et al. | 395/113 |
| 5,721,825 | 2/1998 | Lawson et al. | 395/200.33 |

OTHER PUBLICATIONS

IBM Corporation, "OS/390 V2R4.0 JES2 Introduction", Topics 1.0–1.2 and 5.1.2–5.1.3, 1990

IBM Corporation, "OS/390 V2R7.0 JES2 Initialization and Tuning Guide", Topics 2.1.5.14.1, 2.1.5.14.6, Appendix 1.2.1.1, 1988.

IBM Corporation, "OS/390 V2R7.0 MVS Setting Up A Sysplex", Topics 7.5–7.5.2.2, 1988.

IBM Corporation, "OS/390 V2R7.0 JES2 Commands", Topic 5.129, 1988.

IBM Corporation, "OS/390 VR24.0 SDSF Guide and Reference", Topic 3.25, 1997.

*Primary Examiner*—Mark R. Powell
*Assistant Examiner*—Lance W. Sealey
*Attorney, Agent, or Firm*—Fitzpatrick, Cella, Harper & Scinto

[57] ABSTRACT

A client transmits only job information of print data to a server, the server manages a print order in accordance with the job information, and if printable, the client transmits the print data directly to a printer. After the print is completed, the printer notifies the server of a print completion, and upon reception of this print completion notice, the server instructs the client to delete the print data. In a print system on a network configured as above, the network traffic is not increased, a large memory capacity is not necessary for the server so that the server load is reduced, the job management of the server can be performed by the client, the completion of a print operation can be monitored, and a print operation is possible even if the server is in an error state.

82 Claims, 47 Drawing Sheets

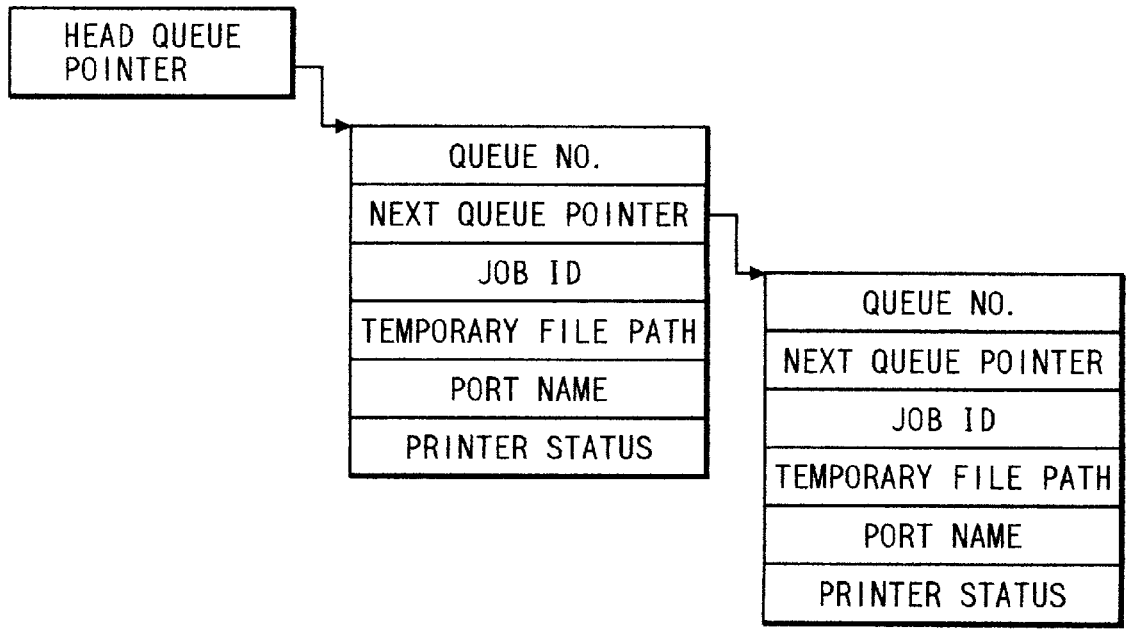

| SERVER NAME |
| --- |
| PRINTER NAME |
| PORT NAME |
| PRIORITY LEVEL |
| DEFAULT PRIORITY LEVEL |
| PRINTER STATUS |
| JOB NO. |

FIG. 24

ADDITION OF VIRTUAL PRINTER

PRINTER NAME: | VPS-PRINTER | | SET |

DESCRIPTION: | VIRTUAL PRINTER |

PRINT DESTINATION: | | ADD PORT |
| | DELETE PORT |
| | SET PORT |

| OK | | CANCEL |

FIG. 25

ADDITION OF NETWORK PRINTER

DESIGNATE HOST PROVIDING lpd AND PRINTER REGISTERED IN THE HOST

HOST NAME OR IP ADDRESS: 192.168.0.1

PRINTER NAME: lpd1

OK   CANCEL

FIG. 26

ADDITION OF VIRTUAL PRINTER

PRINTER NAME: VPS-PRINTER    SET

DESCRIPTION: VIRTUAL PRINTER

PRINT DESTINATION: 192.168.0.1@lpd

ADD PORT
DELETE PORT
SET PORT

OK    CANCEL

FIG. 29

ADDITION OF PRINT DESTINATION ON VIRTUAL PRINT SERVER

DESIGNATE NAME OF VIRTUAL PRINT SERVER AND NAME OF PORT PROVIDED BY THE SERVER

VIRTUAL PRINT SERVER NAME: VPS-MACHINE

VIRTUAL PRINTER NAME: VPS-PRINTER [REFERENCE]

[OK] [CANCEL]

FIG. 30

PRINT DESTINATION ON VIRTUAL PRINT SERVER

LIST OF PRINT DESTINATIONS

VPS-MACHINE@VPS-PRINTER

[ADD]
[DELETE]
[SET]

FIG. 31

SETTING OF PRINTER

PRINTER NAME: Conon Printer

DRIVER: Conon LOSER SHOT LBP-720 →

COMMENT: PRINTER FOR VIRTUAL PRINT SERVER

PRINT DESTINATION: VPS-MACHINE: VPS-PRINTER →

☐ FOR COMMON USE ON NETWORK

NAME:

SITE:

OK
CANCEL
SET
DETAIL
PORT SETTING
HELP

PRINTING SYSTEM THAT TRANSMITS JOB INFORMATION INDEPENDENTLY OF PRINT DATA

BACKGROUND OF THE INVENTION

1. Field of the Invention

The present invention relates to a printing system, an information processing apparatus, an output control apparatus, and a method, for sharing a printer connected to a network by a plurality of network clients, and to a recording medium which stores programs realizing the functions of the invention.

2. Related Background Art

Personal computers are now prevailing widely in offices, and network technologies interconnecting such computers are being developed. In using printers, conventionally, one printer is connected to one personal computer. However, recently, a printer is connected to a network and is shared by a plurality of personal computers connected to the network.

In many environments using a network printer, a print server is used which runs on a network OS such as Netware and Windows NT (registered trademarks). For sharing a printer, the printer server has been essential. A conventional server receives print data (job) from a client on the network, and transmits it to the printer if it is not busy. In this manner, the conventional printer controls a temporary storage of print data and a job transmission to the printer. Therefore, a storage means having a large capacity becomes necessary and a large load is always imposed in order to realize the server function.

With conventional technologies, after print data is sent to the network printer, the client has no print data at hand, and a print end notice is given when the print data is transmitted to the printer. Therefore, after the print data is sent, a host computer cannot recognize the actual print end of each job, i.e., the actual print paper discharge.

SUMMARY OF THE INVENTION

With conventional technologies, if a plurality of communications terminals connected to a network share an apparatus which can only perform a sequential control of jobs in the order of job registrations, some problems arise. For example, if a personal computer as a client on the network uses a TCP/IP network printer of LPR, the order of job registrations by communications terminals may not coincide with the order of job registrations received by the shared printer, because of communications timing errors, or after jobs are registered, it is impossible to delete a particular job.

If a communications terminal or a personal computer uses a network printer via a printer server having a dedicated sequential order control function of jobs, the shared network printer can control the order of jobs in accordance with the instruction from such a print server. In this case, the shared network printer can perform the sequential order control of jobs, and a job can be deleted before it is transmitted to the shared network printer. However, another problem occurs which requires two communications protocols, including a protocol for transferring a job to the printer server with the sequential order control function and a protocol for transferring the job to the printer server to the network printer.

Another problem is an increased traffic on the network.

Still another problem is a necessity of a storage resource at the printer server with the sequential order control function for storing all job data from communications terminals. The print server with the sequential order control function performs both the reception of all job data from communications terminals and the sequential order control and transfer of the job data. Therefore, as in the case wherein a personal computer is used as a print server, the power of a CPU of the print server is occupied mostly by the sequential order control, so that this print server resource cannot be used for the other operations.

As described above, in the network sharing a particular apparatus by a plurality of communications terminals, the function of deleting a job from the particular apparatus can only be realized through the provision of an apparatus with the sequential order control function and through an overload on the network.

Another problem is that a client cannot perform a print operation if the server is in a system-down state or in an error state.

It is desired that a client can recognize the completion of the print operation up to paper discharge, without making data transfer communications redundant and with a small number of communications lines.

It is also desired that if the normal completion of the print operation up to paper discharge cannot be recognized, the print operation only for the job whose completion was not recognized is performed again.

According to one aspect of the present invention, there is provided a print system comprising: an information processing apparatus including transmitting means for transmitting job information of graphics data to a print control apparatus and storage means for storing the graphics data corresponding to the job information transmitted from the transmitting means;

and the print control apparatus including sequential order controlling means for controlling a print order in accordance with the job information transmitted from the transmitting means and outputting means for outputting output enabled information to the information processing apparatus, the output enabled information indicating that the graphics data can be output to a printer, wherein the information processing apparatus instructs the transmitting means to transmit the job information of the graphics data necessary for the sequential order control means of the print control apparatus, to the print control apparatus, the print control apparatus instructs the sequential order control means to control the print order in accordance with the job information transmitted from the transmitting means, and when the print control apparatus outputs the output enabled information to the information processing apparatus, the information processing apparatus transmits the graphics data stored in the storage means, to the printer.

According to the present invention, a virtual job sequential order control mechanism is provided for controlling the job order at the apparatus shared by a plurality of communications terminals on the network. Each communication terminal requesting a job print operation registers in the apparatus with the sequential order control mechanism, not the job data but only the data necessary for the sequential order control. This sequential order control mechanism determines a suspension of a print job request. Therefore, even an apparatus without a function of recognizing a job and a job deletion function which apparatus is shared by a plurality of communications terminal on the network, does not occupy excessive resources otherwise necessary for the sequential order control mechanism. Therefore, both the sequential order control and suspension of print job requests from communications terminals can be satisfied.

BRIEF DESCRIPTION OF THE DRAWINGS

FIG. 13 is a diagram showing a registered job information queue table.

FIG. 14 is a diagram illustrating a linkage of the registered job information queue table by a queuing table.

FIG. 22 is a sequence diagram illustrating a flow of a command and job information when a job list of the invention is referred to.

FIG. 24 is a diagram showing a setting display for adding a virtual printer of the virtual print server of the invention.

FIG. 25 is a diagram showing a setting display for adding a network printer of the virtual print server of the invention.

FIG. 26 is a diagram showing a setting display for adding a virtual printer of the virtual print server of the invention, with an additional print destination.

FIG. 29 is a diagram showing a setting display with an additional print destination of the virtual print server of the invention.

FIG. 30 is a diagram showing a print destination list of the virtual print server of the invention.

FIG. 31 is a diagram showing a setting display of a printer of the virtual print server of the invention.

DETAILED DESCRIPTION OF THE PREFERRED EMBODIMENTS

The fundamental configuration of the invention will be described with reference to the accompanying drawings.

Figure 1:
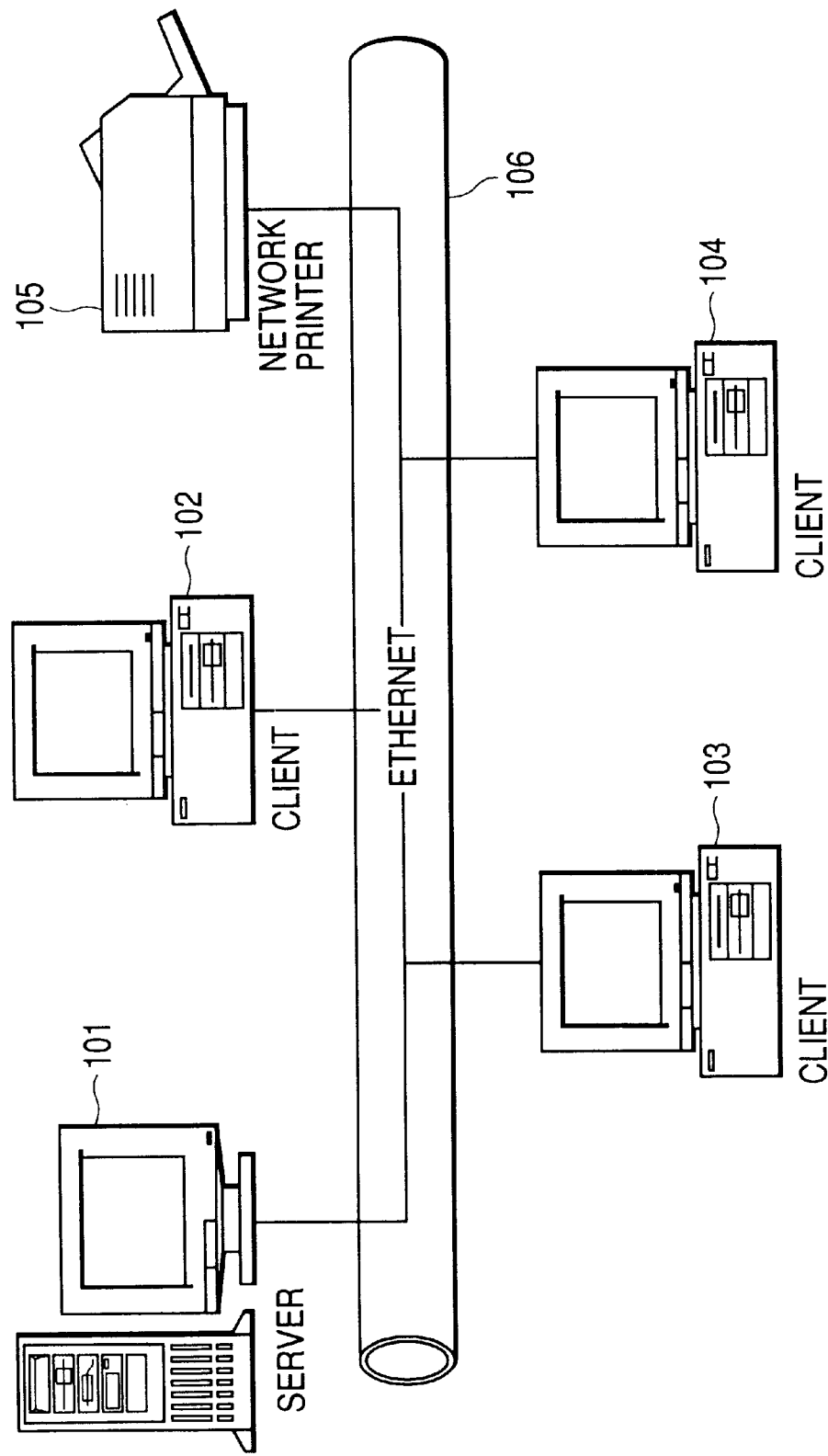
FIG. 1 is a diagram showing the configuration of a network system to which a virtual server of this invention is applied.

FIG. 1 shows an example of the configuration of a network system suitable for the explanation of a virtual server of the invention.

In FIG. 1, n client computers as information processing apparatuses are assumed to be connected to the network system. Client computers 102, 103 and 104 are connected to a network 106 by network cables such as Ethernet cables. The client computer can execute various programs such as application programs and has a printer driver with a function of converting print data into a printer language specific to a printer. The printer driver is assumed to support a plurality of printer languages.

Reference numeral 101 represents a server for controlling the print operation requested by a client computer. The server is connected to the network 106 by a network cable, stores files to be used by the network, and monitors the use state of the network 106. The server 101 of the embodiment also stores job information on print data requested to print by the client computers 102, 103 and 104 and has a function of notifying client computers of IP information of the network printer 105 and job information received in a buffer. The job information is information necessary for a print reservation of a job to be printed. The details thereof will be later described. The job information does not contain graphics data (image command and image data) of a print job, but is constituted of a document name, client information and the like.

The network printer 105 is connected via a network board and a network interface to the network 106. The network printer 105 converts print data transmitted from a client computer into a dot image of each page and prints one page after another. The network 16 is connected to the client computers, the server, the network printer and the like.

The server 101, client computers 102, 103, 104 and network printer 105 each perform a particular job in a distributed manner to efficiently use client computers and reduce the load of the network.

Figure 2:
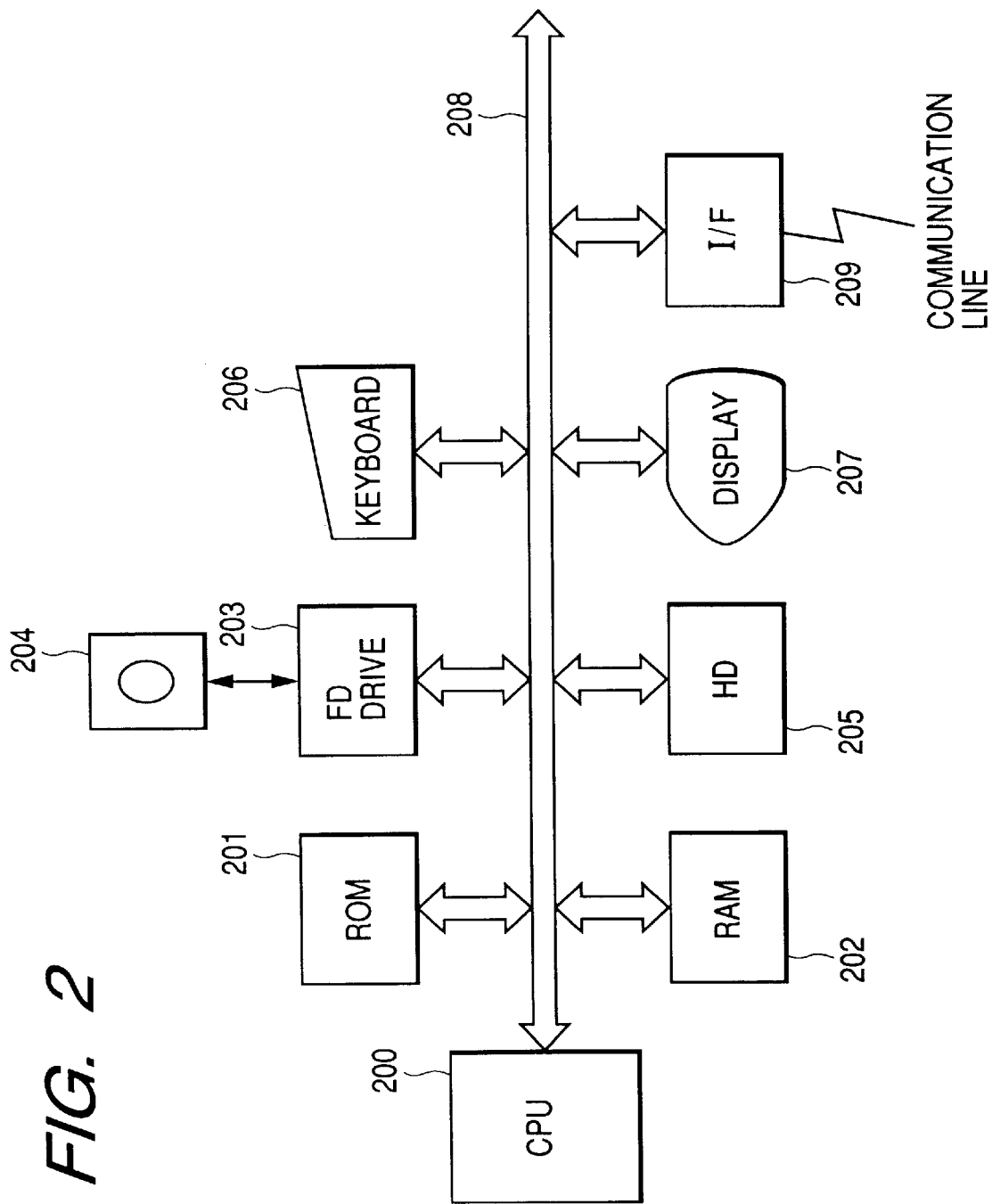
FIG. 2 is a block diagram showing the outline structure of a client computer shown in FIG. 1.

FIG. 2 is a block diagram showing the outline structure of the client computer 102. In this embodiment, the client computers 103 and 104 as well as the server 101 have the same structure as the client computer 102.

Reference numeral 202 represents a CPU serving as a control means for the information processing apparatus. CPU 200 controls to execute application programs, printer driver programs, OSes, network printer control programs and the like stored in a hard disk (HD) loaded in an HD drive 205 and to temporarily store information, files and the like necessary for the execution of programs in a RAM 202 as a storage means.

ROM 201 stores therein programs such as fundamental I/O programs, and various data such as font data and template data to be used for document processing. RAM 202 functions as a main memory and a working area of CPU 200.

Reference numeral 203 represents an FD (floppy disk) drive. As shown in FIG. 5, the FD drive 203 can load programs or the like stored in an FD 204, into the computer system. FD 204 as one of external storage means is a storage medium for storing computer readable programs. FD 204 stores therein network printer control programs and relevant data of this embodiment. The structure of contents stored in FD 204 are shown in FIG. 4.

Figure 4:
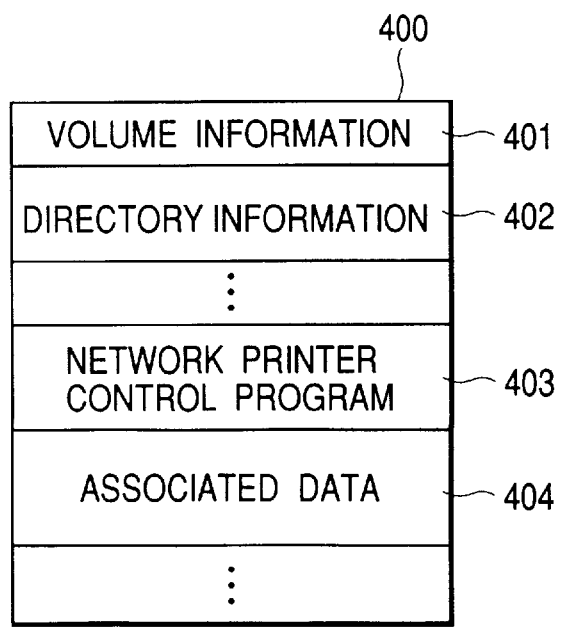
FIG. 4 is a memory map showing internal data of an FD shown in FIG. 1.
Figure 5:
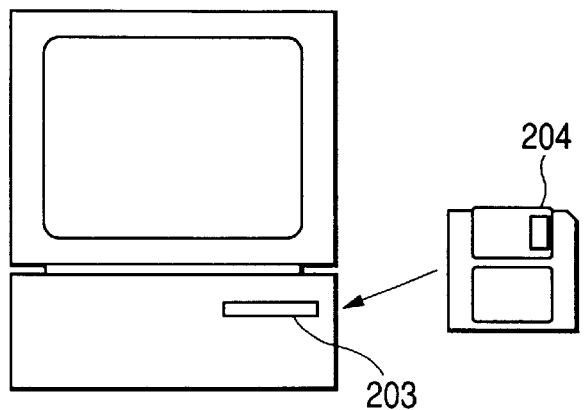
FIG. 5 is a diagram showing the relationship between the client computer shown in FIG. 1 and FD shown in FIG. 2.

In FIG. 4, reference numeral 400 indicates the data contents of FD 204, including volume information 401 indicating data information, directory information 402, network printer control programs 403 of this embodiment, and related data 404.

The network printer control programs 403 are constituted of program codes realizing the printer control sequences illustrated in the flow charts of FIGS. 12, 18, 19, 33 to 39, 42 to 47, 49, 50, 53 and 56. The network printer control programs 403 include VPS setting programs, printer setting programs and the like.

Reference numeral 205 represents an HD drive for driving an HD as an external storage means which stores therein application programs, printer driver programs, OSes, network printer control programs, and other related programs. A virtual print spooler as a spooling means to be later described is stored in an HD.

Reference numeral 206 represents a keyboard as an input means for a user to supply an instruction such as a device control command, to the client computer.

Reference numeral 207 represents a display as a display means for displaying a command entered from the keyboard 206, a printer status, or the like.

Reference numeral 208 represents a system bus through which data in the client computer is transferred.

Reference numeral 209 represents an interface as an input/output means via which the information processing apparatus transfers data to and from an external apparatus.

Figure 3:
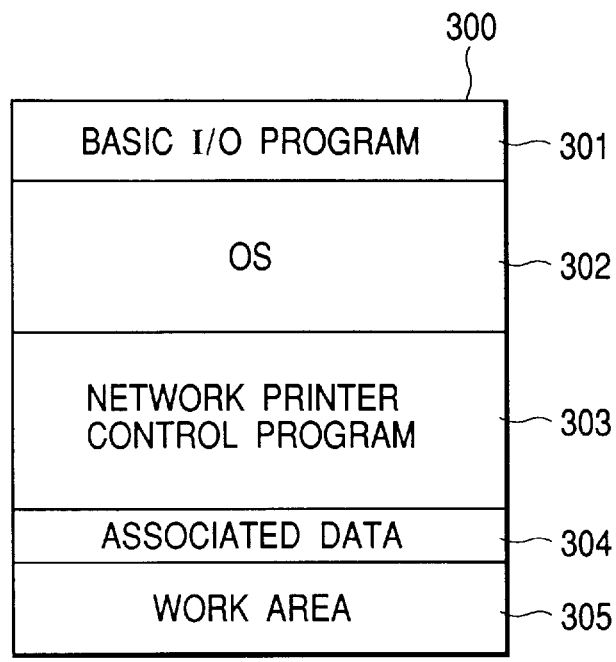
FIG. 3 is a memory map of a RAM shown in FIG. 2 when a program in an FD shown in FIG. 4 is developed.

FIG. 3 is a memory map of a network printer control program loaded in RAM 202 and made executable.

In this embodiment, the network printer control program and relevant data are directly loaded from FD 204 into RAM 202, by way of example only. The network control program may be loaded from HD 205 already storing it, into RAM 202. The network control program may be stored not only in FD, but also in other media such as a CD-ROM, a CD-R, a PC card, a DVD, and an IC memory card. The network control program may be stored in a storage area of ROM 201, the storage area being set to a portion of the memory map and being accessible directly by CPU 200 for the execution of the network control program.

Reference numeral 301 represents a basic I/O program which is read by an OS from HD 205 to RAM 202 when the power of the apparatus is turned on. The basic I/O program includes a program realizing an initial program loading (IPL) function for the start of operation by an OS 302. A network printer control program 303 and related data 304 are developed in these fields. Reference numeral 305 represents a working area for CPU 200 to execute the network printer control program.

Figure 6:
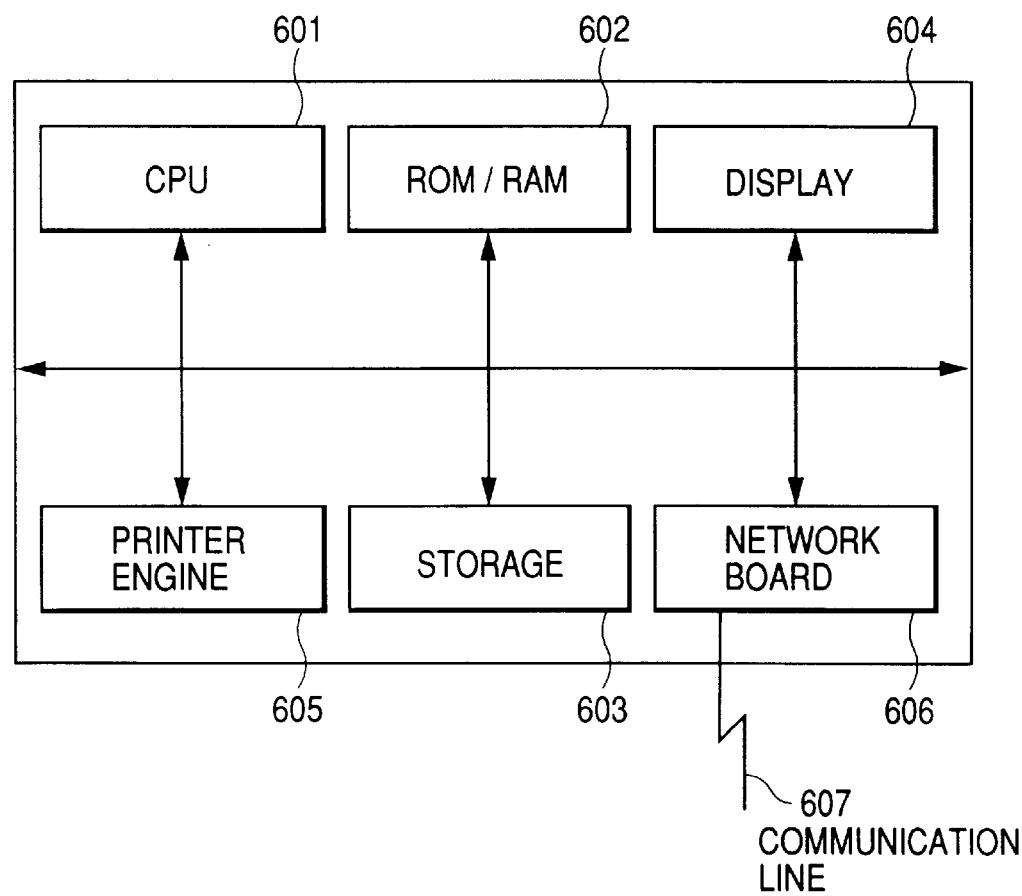
FIG. 6 is a block diagram showing the outline structure of a network printer shown in FIG. 1.

FIG. 6 is a block diagram showing the outline structure of the network printer 105 of this embodiment. In this embodiment, a laser beam printer (LBP) is used as the network printer. It is obvious that other types of printers may also be used.

Reference numeral 601 represents a CPU for controlling the whole of the network printer. Reference numeral 602 represents a ROM/RAM as a storage means for storing a control program and constant data for the control of CPU 601 and for providing buffers for temporarily storing transmission/reception data.

Reference numeral 603 represents a storage unit such as a hard disk for storing transmission/reception data, control programs executable by CPU 601, print data identification information and other data relevant to the embodiment.

Reference numeral 604 represents a display unit such as a display panel for displaying the data temporarily stored in ROM/RAM 602 and the data stored in the storage unit 603, an operation status, and the like.

Reference numeral 605 represents a printer engine for printing out bit map data generated by CPU 601 in accordance with a program stored in ROM/RAM 602.

Reference numeral 606 represents a network board as an input/output control means via which data such as character data and job information is transferred to and from an external apparatus such as a client computer and a server.

Reference numeral 607 represents a communications line connecting the network board 606 to the network.

Figure 7:
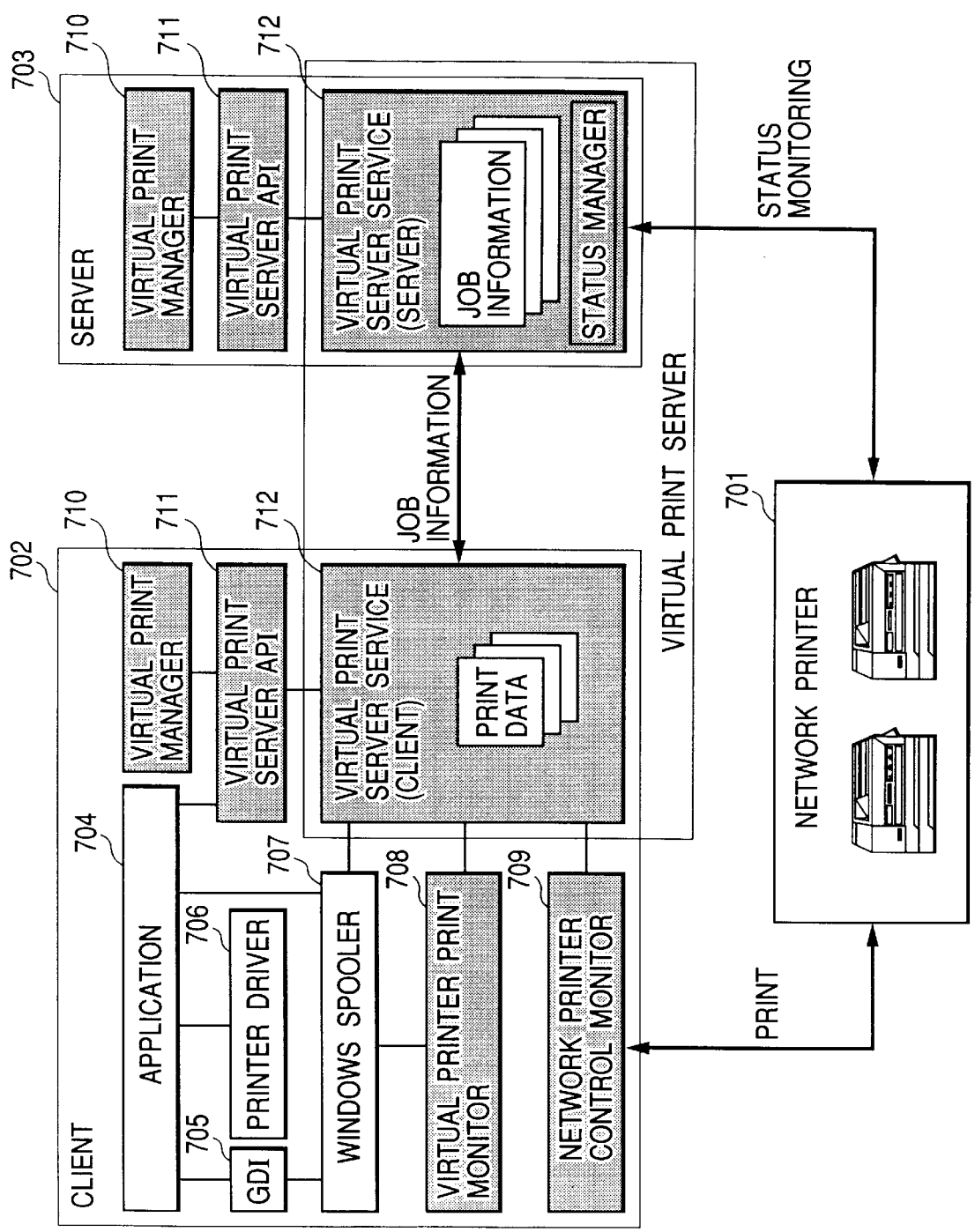
FIG. 7 is a diagram showing the software module structure of the client computer and server of the invention.

FIG. 7 is a diagram showing the configuration of software modules of the client computer and server, the modules being supplied from FD as described previously.

Reference numeral 701 represents a network printer, reference numeral 702 represents the configuration of software modules of the client computer, and reference numeral 703 represents the configuration of software modules of the server. Reference numeral 704 represents an application module for supplying a print instruction to the network print system of the invention. Reference numeral 705 represents a GDI of Windows, reference numeral 706 represents a printer driver built in Windows, and reference numeral 707 represents a printer spooler of Windows. Modules including a printer monitor 708 for virtual printer, a network printer control monitor 709, a virtual manager 710, a virtual printer server API (application interface) 711 and a virtual printer server service 712 constitute of a system of the virtual print server of this invention and supplied from a storage medium, in this embodiment, FD 204. The control program of this invention includes the modules 708, 709, 710, 711 and 712 hatched in FIG. 7.

The virtual print manager 710, virtual print server API 711 and virtual print server service 712 are provided to both the client computer and server. The virtual print server services 712 both in the client and server are called hereinafter where applicable a virtual print server, and this system is called a virtual print server system. Similarly, the virtual print server service (client) is called a client service, and the virtual print server service (server) is called a server service, hereinafter where applicable.

In this embodiment, although the client side modules and server side modules are supplied from one storage medium FD 204, the modules may be supplied from a storage medium used only for the client and from a storage medium used only for the server, to realize the above system. The latter arrangement is intended to be included in the scope of the claims.

In this embodiment, terms "character data", "print data", and "graphics data" are used. The character data and print data are data to be printed and transmitted from a client to a printer or server. The graphics data may be considered to be the same as the character data and print data, but this graphics data is intended to mean particularly data used for graphics such as image commands and image data. In a conventional system, data transmitted from a client to a server is print data inclusive of graphics data and job information. The job information will be later described.

(First Embodiment)

The setting processes of the server and client computer of the virtual print server system configured as above (hereinafter called a VPS (abbreviation for Virtual Printing System) will be described with reference to the setting displays shown in FIGS. 23 to 31.

Figure 23:
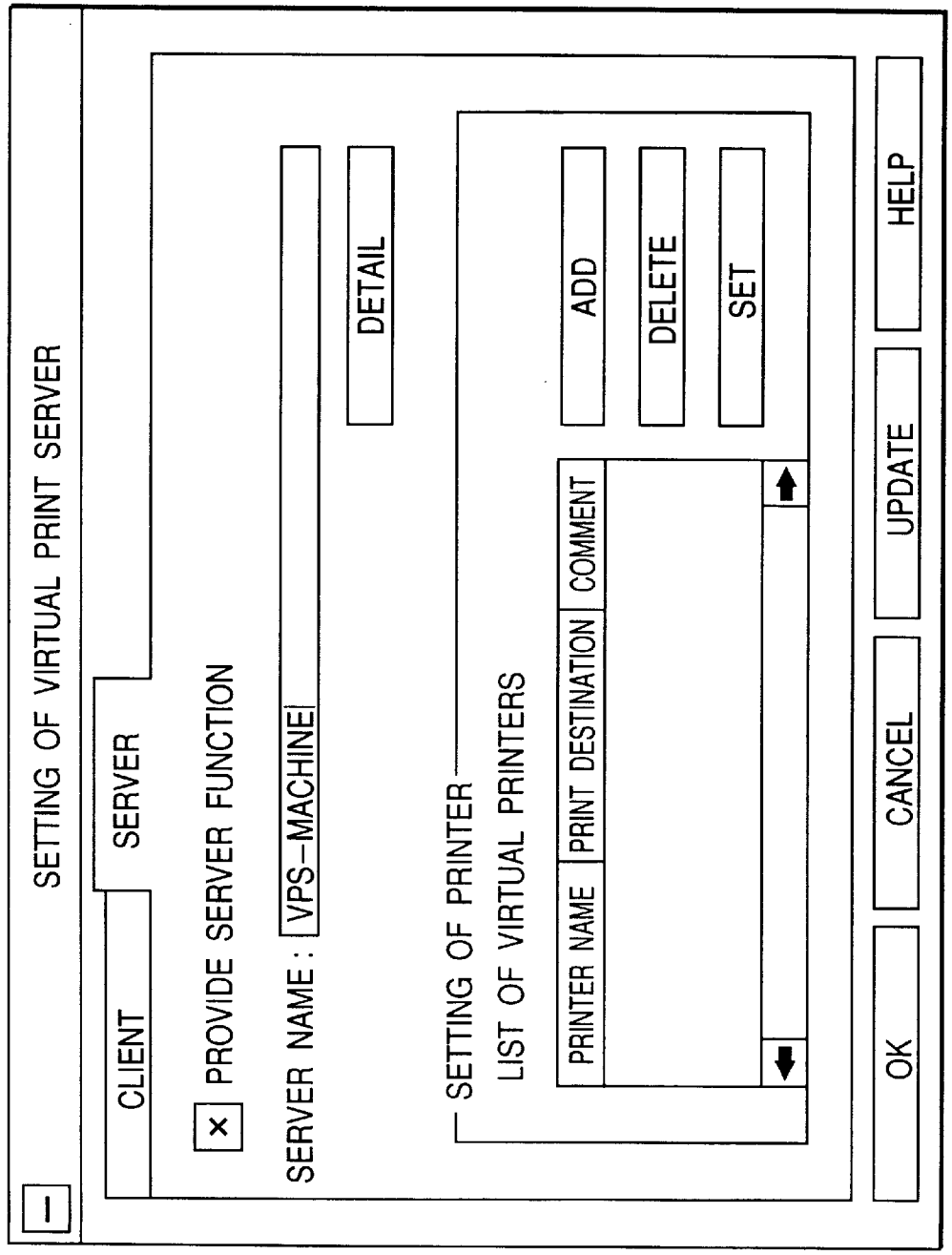
FIG. 23 is a diagram showing a setting display on the side of the virtual print server of the invention.
Figure 27:
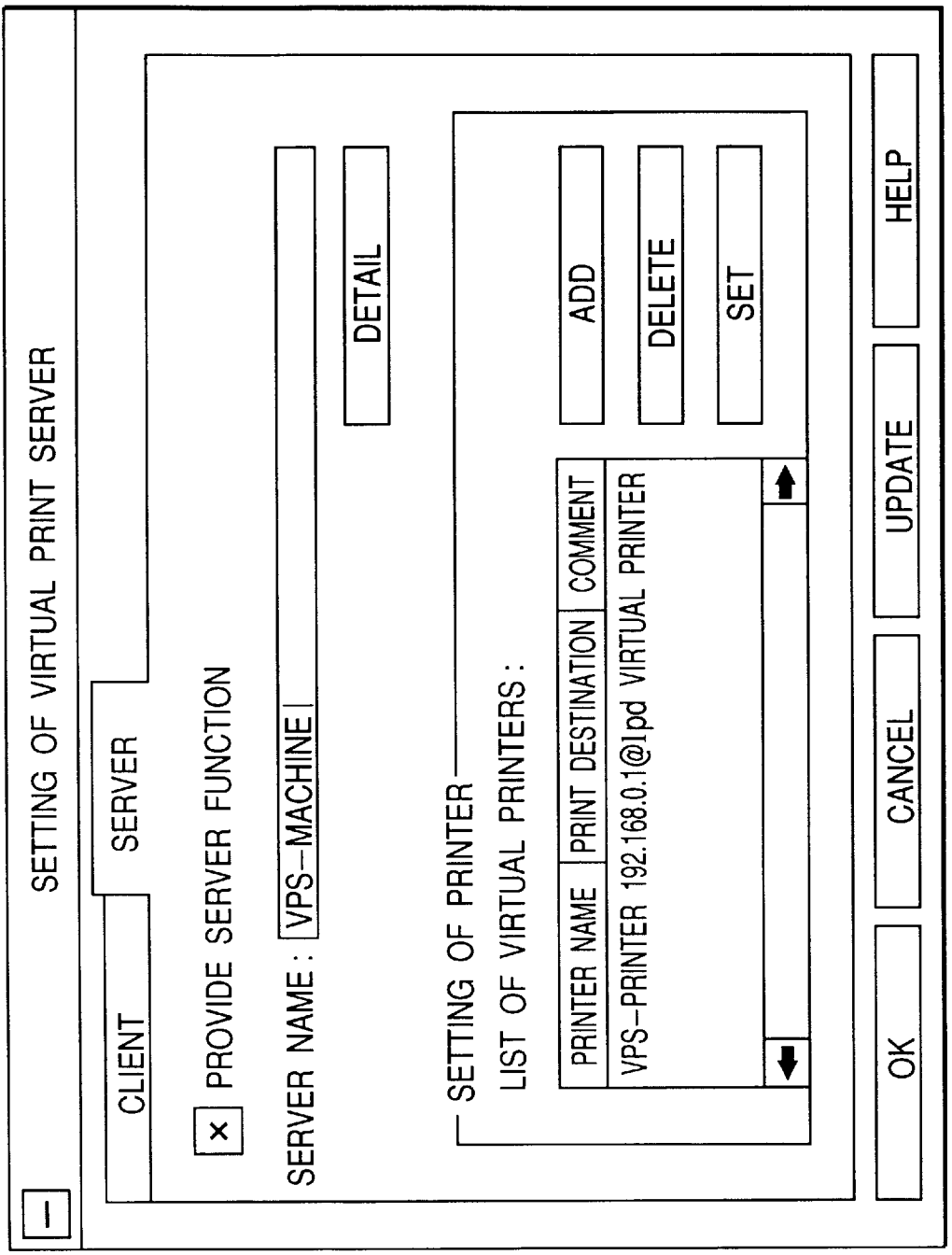
FIG. 27 is a diagram showing a setting display for the virtual print server of the invention, with an additional virtual printer.
Figure 33:
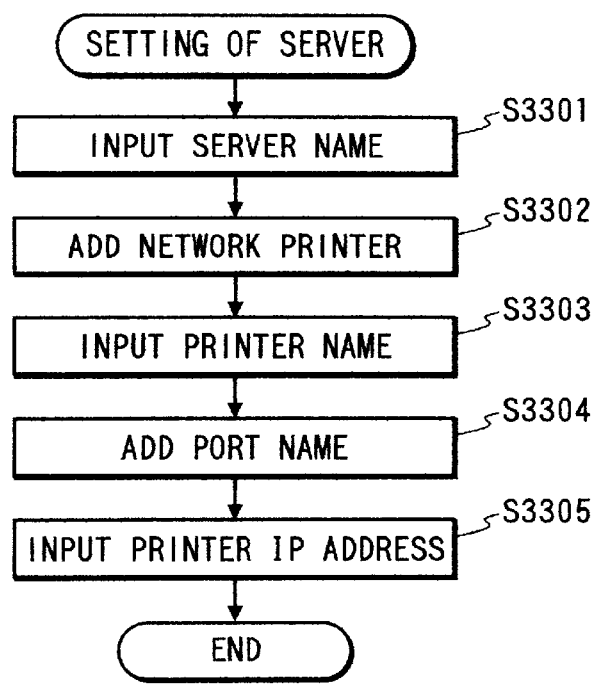
FIG. 33 is a flow chart illustrating a setting process of the virtual print server according to a first embodiment of the invention.

First, the setting process of the server will be described with reference to the flow chart shown in FIG. 33. In setting one of the clients on the network as a server, the VPS setting program stored in HD 205 shown in FIG. 2 is activated at the clients 102 to 104 of the system shown in FIG. 1. As the VPS setting program is activated, a display shown in FIG. 23 is displayed on the display device 207 shown in FIG. 2. The server is set by using the keyboard 206 shown in FIG. 2. In FIG. 23, the "client" and "server" tugs can be alternately selected. Next, a check box for providing a server function is checked to activate the server function. One of the clients is set to the server 101 shown in FIG. 1.

After the check box is checked, a server name identifying the server is entered at Step S3301. In order to register the printer of this server, an "ADD" button for setting a virtual printer shown in FIG. 23 is depressed at Step S3302 when the display on the display device 207 shown in FIG. 2 changes to the display shown in FIG. 24. At Step S3303, a virtual printer name and a printer description (comment) are entered. When an "ADD PORT" button is depressed at Step S3304, the display changes as shown in FIG. 25. At Step S3305, an IP address of the printer and a printer name (lpd) used with the print communication protocol are entered. As an OK button is depressed thereafter, the display changes as shown in FIG. 26. As an OK button is depressed, all input information can be confirmed in the initial display shown in FIG. 27. As an OK button is depressed, the server setting is completed.

Figure 34:
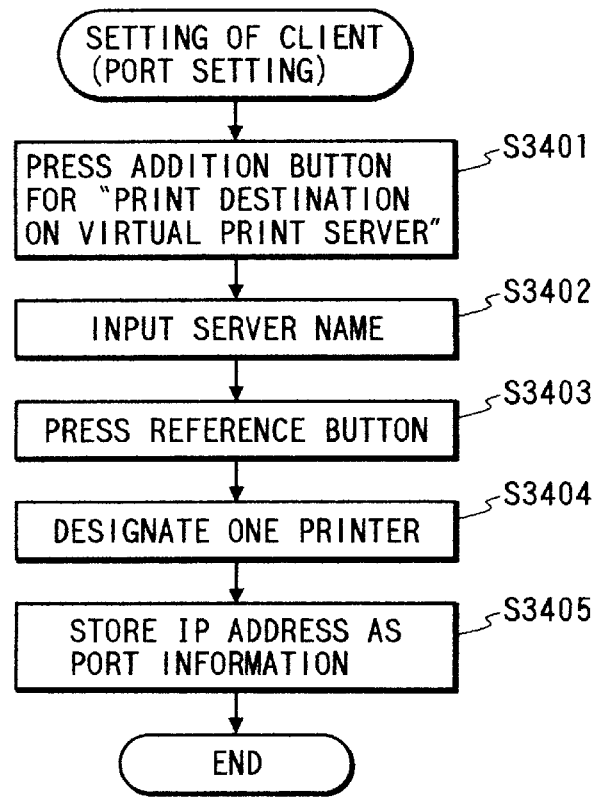
FIG. 34 is a flow chart illustrating a port setting process of the client computer according to the first embodiment of the invention.
Figure 35:
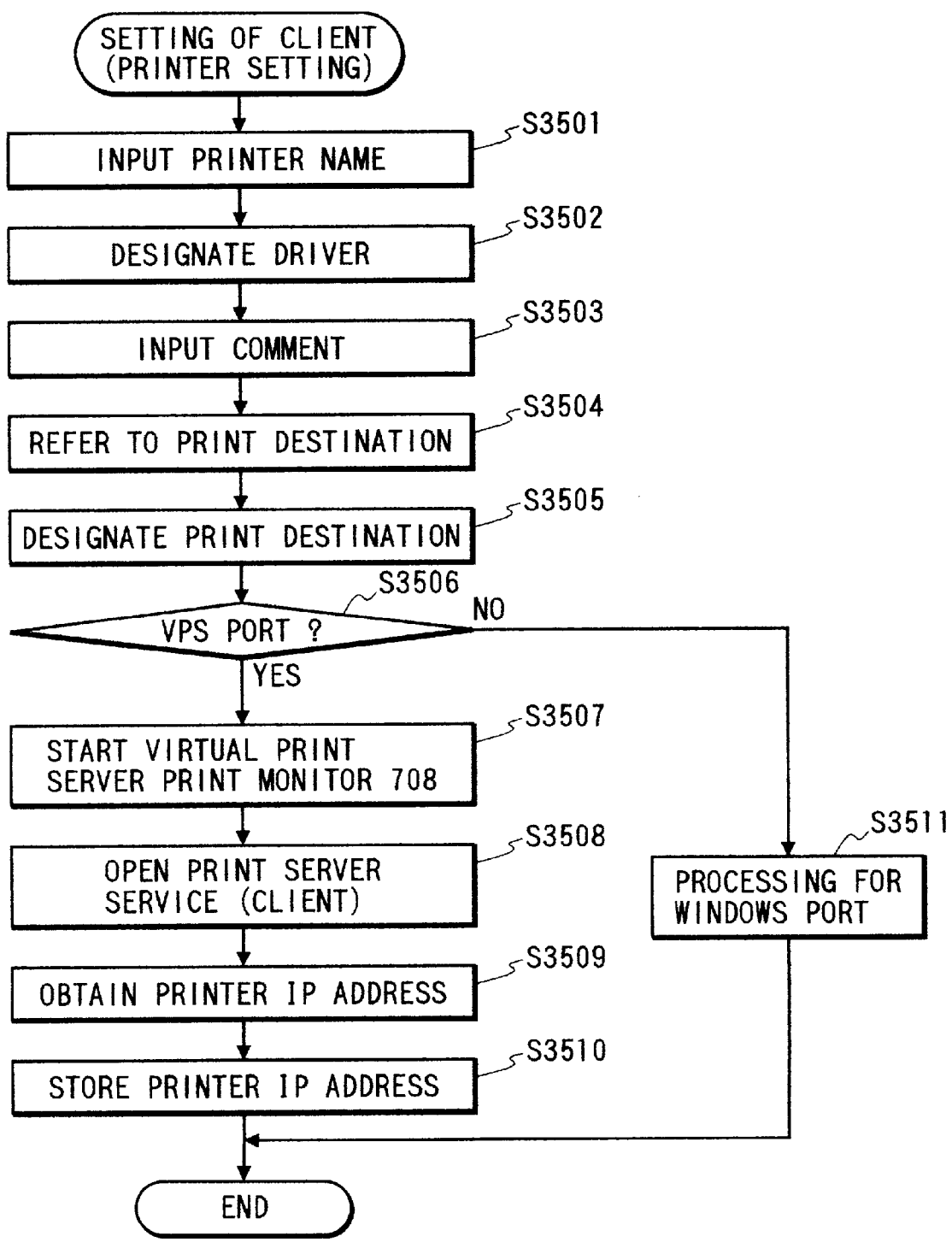
FIG. 35 is a flow chart illustrating a port setting process of the client computer according to the first embodiment of the invention.

Next, the setting process of the virtual server and printer by a client will be described with reference to the flow charts shown in FIGS. 34 and 35. FIG. 34 is a flow chart illustrating the port setting process by a client computer, and FIG. 35 is a flow chart illustrating the setting process of a printer by a client computer.

Figure 28:
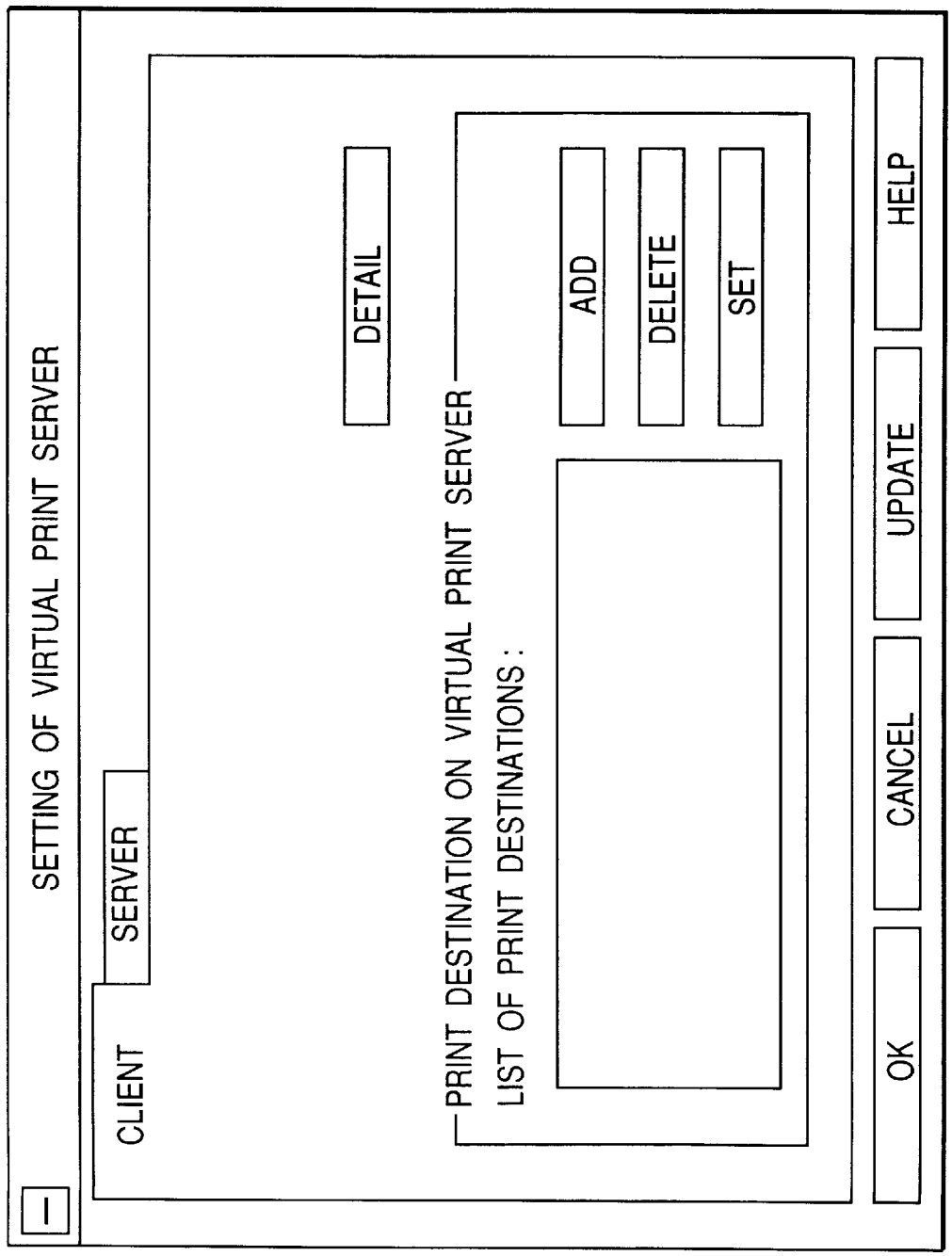
FIG. 28 is a diagram showing a setting display on the side of a client of the virtual print server of the invention.

In setting a client, it is necessary to set a port shown in FIG. 34. The VPS setting program stored in HD 205 shown in FIG. 2 is activated at the client 102 of the system shown in FIG. 1. As this program is activated, a display shown in FIG. 28 is displayed on the display device 207 shown in FIG. 2. The "client" tug is selected by using the keyboard 206 shown in FIG. 2.

In FIG. 28, the "client" and "server" tugs can be alternately selected. FIG. 28 shows a setting display of the client when the client tug is selected. At Step S3401, as an operator depresses an "ADD" button in a sub-window "PRINT DESTINATION ON VIRTUAL PRINT SERVER", the display changes as shown in FIG. 29. The server name is entered at Step S3402. As the operator depresses "REFERENCE" button at Step S3403, the server having the server name entered at Step S3402 is inquired from a printer list and printer information such as a printer IP address managed by the server. When the client receives from the server the printer list and printer information, the printer list managed by the server is displayed.

At Step S3404 the operator selects one printer from the printer list. At Step S3405, the printer information (IP address and the like) of the printer designated at Step S3404 and received from the server at Step S3403 is stored in HD of the client computer as the port information to thereafter terminate the port setting process. In transmitting the print data to the network, the IP address in the stored printer information is used. FIG. 30 shows an addition of a port by the port setting in the display shown in FIG. 28, as indicated by a virtual printer server name @ virtual printer "VPS-MACHINE@VPS-PRINTER".

After the port is set as illustrated in FIG. 34, it is necessary to set a printer as illustrated in the flow chart shown in FIG. 35. A printer setting program stored in HD 205 shown in FIG. 2 is activated at the client computer 102 of the system shown in FIG. 1. As this program is activated, a display shown in FIG. 31 is displayed on the display device 207 shown in FIG. 2. The printer setting is performed by using the keyboard 206 shown in FIG. 2. At Step S3501, after the display shown in FIG. 31 is displayed, an operator enters the printer name. At Step S3502, a driver the printer uses is designated. At Step S3502, a description (comment) is entered.

At Step S3504, the print destination is referred to. The port added by the process illustrated in FIG. 34 can be confirmed at this time. At Step S3505, the port added by the process illustrated in FIG. 34 is designated. As the operator depresses an "OK" button, CPU 202 of the client computer shown in FIG. 2 checks whether the port designated at Step S3506 is a VPS port or not. If CPU 200 judges that the designated port is a VPS port, the virtual print server print monitor 708 and the network printer control monitor 709 shown in FIG. 7 are activated. At Step S3508, the activated virtual print server print monitor 708 instructs the print server service (client) 712 to perform an open process. The print server service (client) 712 asked for the open process instructs the server designated as illustrated in FIG. 34 to acquire the printer information such as an IP address of the printer linked to the port designated at Step S3505 to thereby acquire the printer information (At Step S3509). At Step S3510, the printer information (such as IP address) received from the server is stored in HD of the client computer as the port information to thereafter terminate the printer setting process. In transmitting the print data to the network printer, the IP address in the stored printer information is used.

The processes at Steps S3507 to S3510 are executed also when the computer restarts. Even if the printer information (IP address) of the printer managed by the server is changed, the changed IP address can be automatically confirmed when the client computer restarts. If it is judged at Step S3506 that the port is not a virtual server port, a standard setting process of Windows is performed at Step S3511 to thereafter complete the printer setting process.

As above, according to the first embodiment, the printer information is entered in a printable indication command received by the client from the server and entered when setting the client port and printer during the client setting process. Therefore, an operator is not necessary to enter the printer information (IP address and the like), but the printer information can be acquired automatically from the printer name and the like and the client setting can be changed automatically only by changing the server setting. It is therefore possible to manage the system easily.

Since the virtual server is given a virtual printer name, a user is not necessary to set another print specification for each printer each time a print operation is performed. For example, if an operator (manager) of a virtual server registers a name "VPS-PRINTER1" for an A4 horizontal cassette and a name "VPS-PRINTER2" for an A4 vertical cassette, even a novice user can set the print specification set by the manager by selecting the virtual printer name.

(Second Embodiment)

In the second embodiment, an operator of the client computer 102 shown in FIG. 2 refers to a job list of jobs in a standby state in the VPS system.

Figure 22:
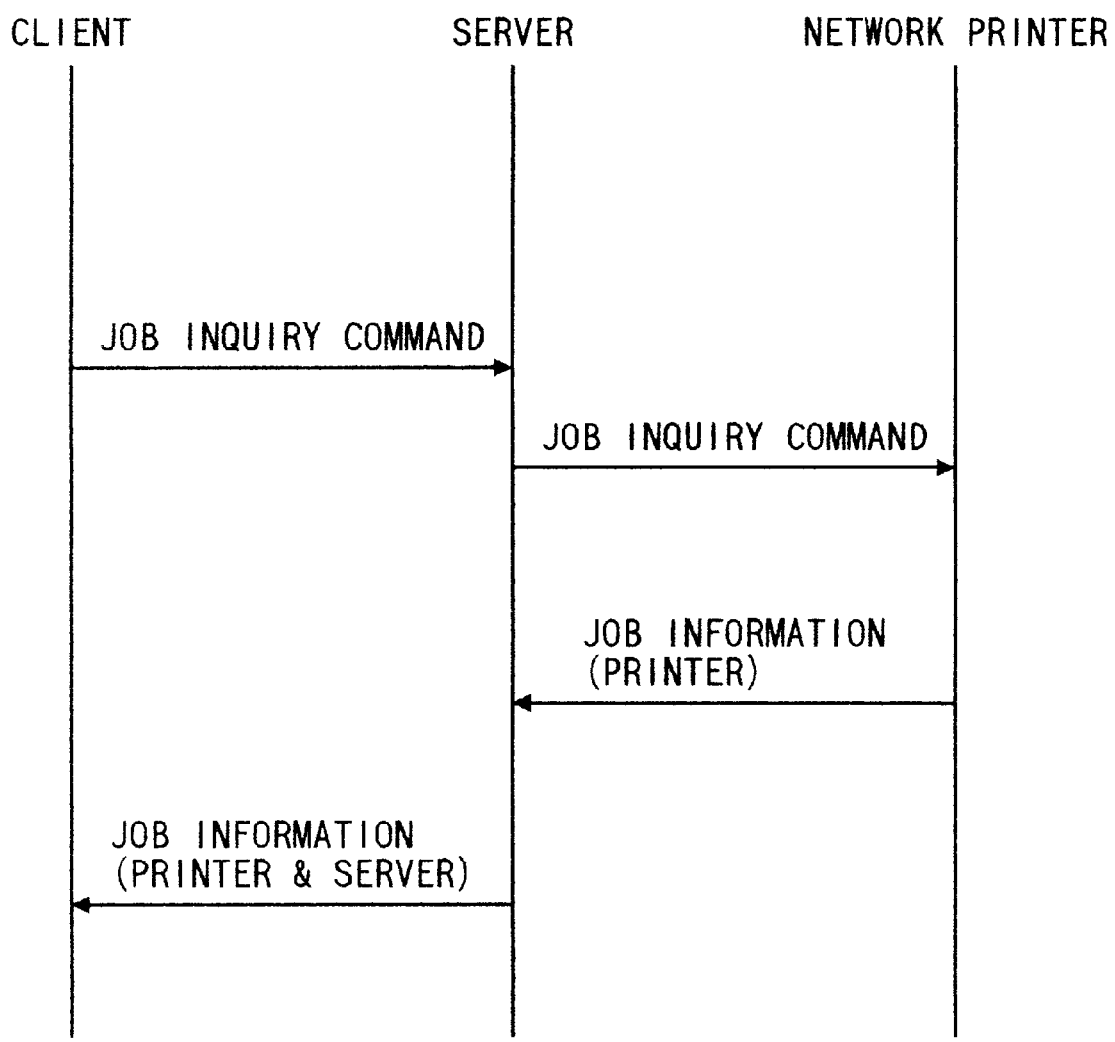
Figure 32:
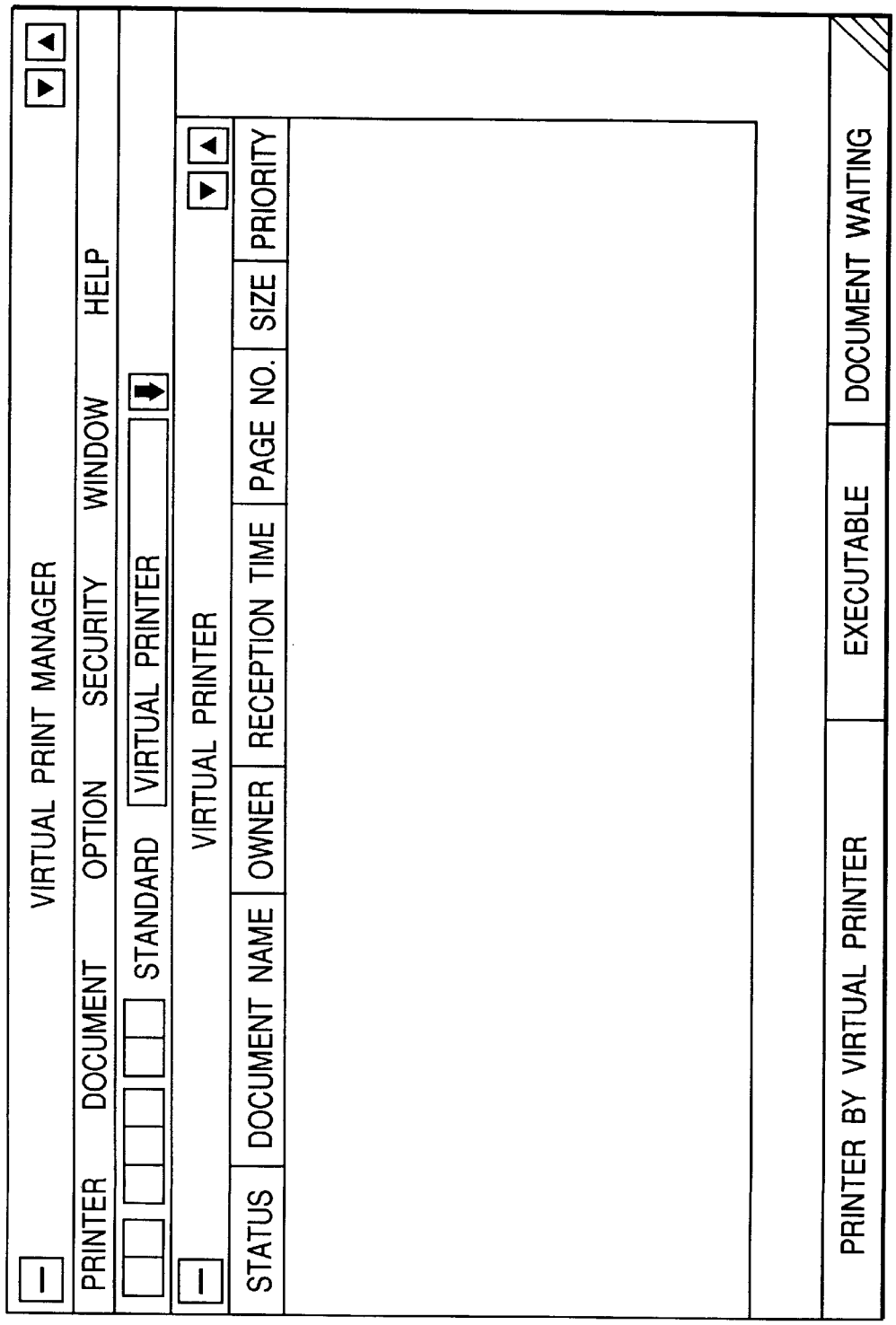
FIG. 32 is a diagram showing a main display of a virtual print manager of the virtual print server of the invention.

FIG. 32 shows a display used when a job list of jobs in a standby state in the VPS system is referred to. In FIG. 22, when a client computer refers to a job list of each printer, the client computer first transmits a job inquiry command to the server. Upon reception of this job inquiry command, the server transmits it to the network printer. Upon reception of this job inquiry command, the network printer transmits the job information presently in the network printer. Upon reception of the job information, the server rearranges the job information in accordance with the received job information and the job information presently in the server, and transmits the rearranged job information to the client as new job information.

The job inquiry process will be described with reference to the flow charts shown in FIG. 36 (client process) and FIG. 37 (server process).

When a client refers to the job list, the virtual print manager program 710 shown in FIG. 7 and stored in HD 205 shown in FIG. 2 is activated at the client computer 102 of the system shown in FIG. 1. The virtual print manager program 710 shown in FIG. 7 issues via the virtual print server VPS 711 a VPSOpenPrinter, a VPSClosePrinter, and a job inquiry API to the virtual print server service (client) 712. The flow chart of FIG. 36 illustrates the operation of the virtual print server service (client) 712.

Figure 36:
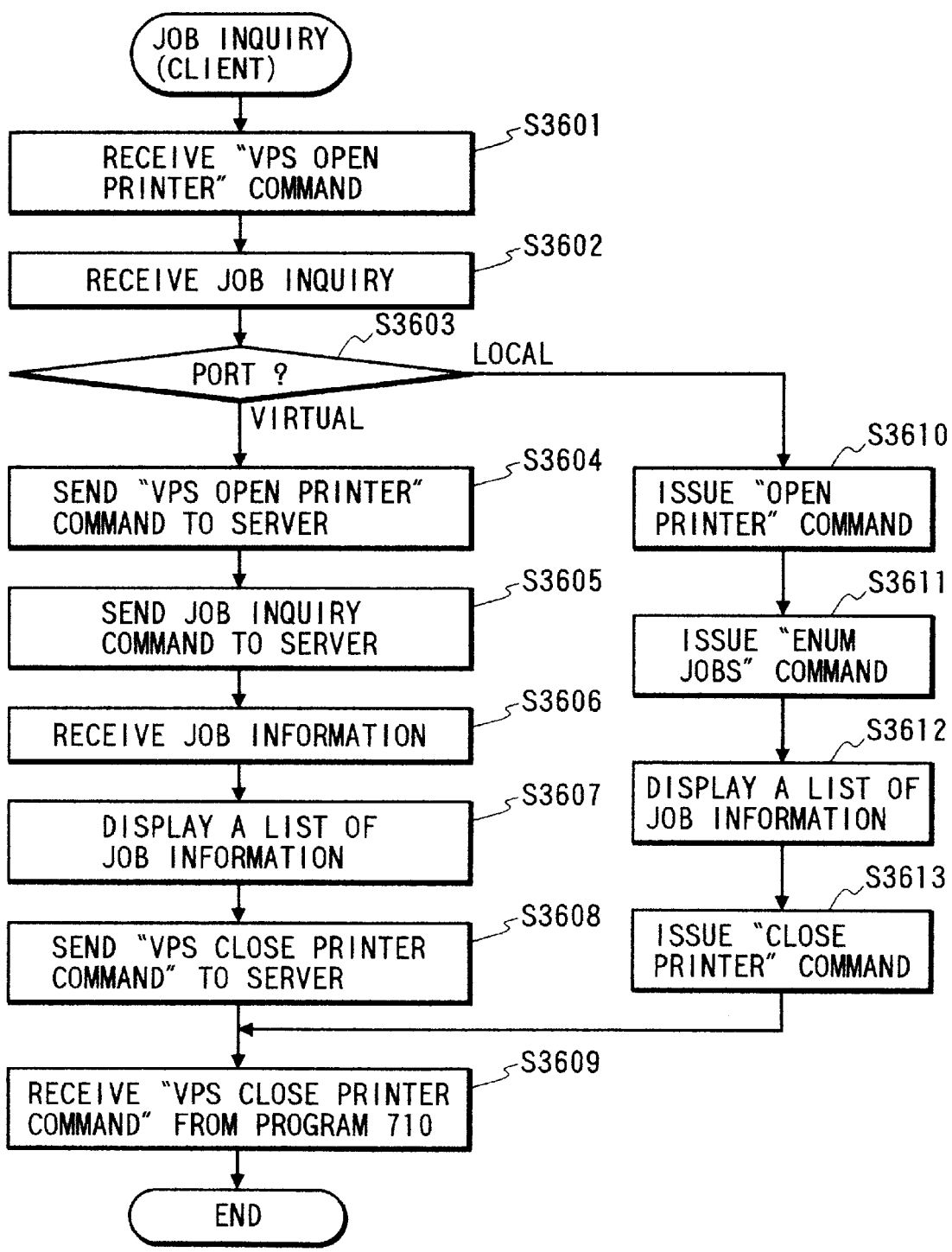
FIG. 36 is a flow chart illustrating a job inquiry process of the client computer according to a second embodiment of the invention.
Figure 37:
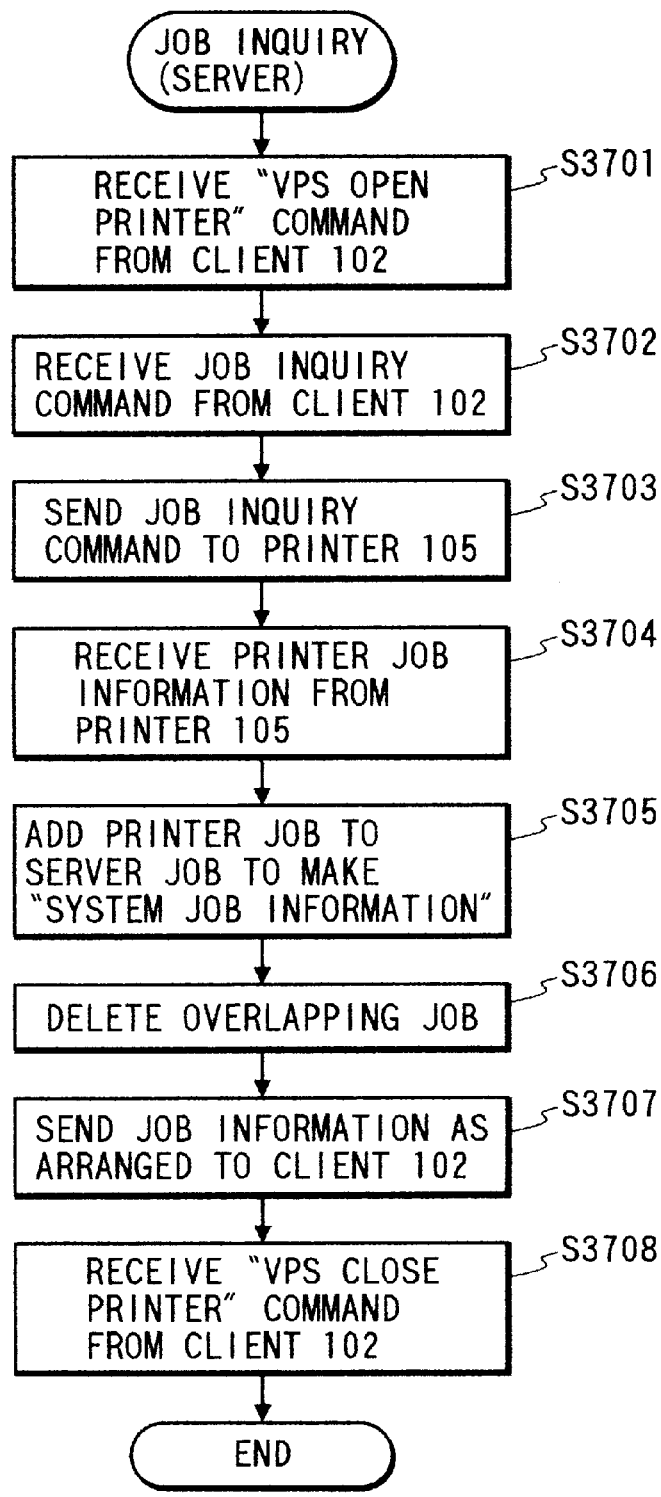
FIG. 37 is a flow chart illustrating a job inquiry process of the server according to the second embodiment of the invention.

At Step S3601 shown in FIG. 36, the virtual print server service (client) 712 receives VPSOpenPrinter and receives the job inquiry at Step S3602 to start the operation. At Step S3603, the virtual print server service (client) 712 checks a parameter representative of the printer name contained in the VPSOpenPrinter command received at Step S3601, as to whether the designated printer name corresponds to a virtual printer managed by the virtual print server service (client) 712. If affirmative, the VPSOpenPrinter command is transmitted to the server 703 at Step S3604. At Step S3605 the job inquiry command is transmitted to the server 703. Thereafter, the virtual print server service (client) 712 waits for the reception of the job information from the server.

If the virtual print server service (client) 712 receives the job information from the server 703 at Step S3606, the received job information is displayed in the job information list shown in FIG. 32 at Step S3607. Thereafter, at Step S3608 the virtual print server service (client) 712 transmits the VPSClosePrinter command to the server 703. At Step S3609 the virtual print server service (client) 712 receives the VPSClosePrinter command from the virtual print manager program 710 via the virtual printer server API 711 to thereafter terminate the process.

The virtual print server service (client) 712 checks at Step S3603 the parameter representative of the printer name contained in the VPSOpenPrinter command received at Step S3601, as to whether the designated printer name corresponds to the virtual printer 702 managed by the virtual print server service (client) 712 or another printer. If it judges that the printer name corresponds to a printer different from the virtual printer 702, then it displays the job list managed by Windows by using a standard virtual print server service of Windows. At Step S3610 an OpenPrinter is issued, and at Step S3611 an EnumJobs is issued to obtain the job list information. At Step S3612, the job information is displayed in the job list shown in FIG. 32. At Step S3613 a Close-Printer is issued to terminate the process.

The job inquiry process by the server will be described with reference to the flow chart shown in FIG. 37. At Step S3701 the server 101 in the system shown in FIG. 1 receives the VPSOpenPrinter command from the client computer 102. When the job inquiry command is received from the client server 102 at Step S3702, the server 101 transmits at Step S3703 a printer job inquiry command to the network printer 105 and waits for the transmission of the printer information by the network printer.

As the printer job information is transmitted from the network printer, the server 101 receives at Step S3704 the printer job information inclusive of the job list information on the job under printing at the network printer 105. At Step S3705 the server 101 adds the jobs in the received job information to the printer jobs presently managed by the server 101 in the printing order to thereby generate new job information (called system job information) of one printer of the system.

Since jobs (e.g., presently printed jobs) managed by both the network printer 105 and the server 101 are regarded as duplicated jobs at Step S3705, the server 101 deletes the duplicated jobs from the system job information at Step S3706. If a job already transmitted to the network printer in the job list of the server is not contained in the job list of the network printer, it can be considered that the job disappeared by some reasons. In this case, this job is also deleted from the system job information. At Step S3707 the server 101 transmits the new system job information with some jobs deleted, to the client computer 102 which issued the job inquiry command.

At Step S3708 the server 101 receives the VPSClose-Printer command from the client computer 102 to thereafter terminate the process.

As described above, the client can refer to the job list of the whole system. In this embodiment, list information of all jobs is generated. Instead, a list of only the jobs transmitted from the client which issued the job inquiry may be formed. Whether the job is transmitted from which client can be discriminated by referring to the job information.

As above, according to the second embodiment, when a job inquiry is issued from the client to the server, the server inquiries a list of jobs presently in the printer, and in accordance with the received job list and the list of jobs presently in the server, the server generates a list of jobs present in the whole system and notifies the client of the new list. As compared to conventional techniques, more correct information can be referred. Even if a job disappears because of some errors in the network printer, the client can confirm this disappeared job.

(Third Embodiment)

Figure 8:
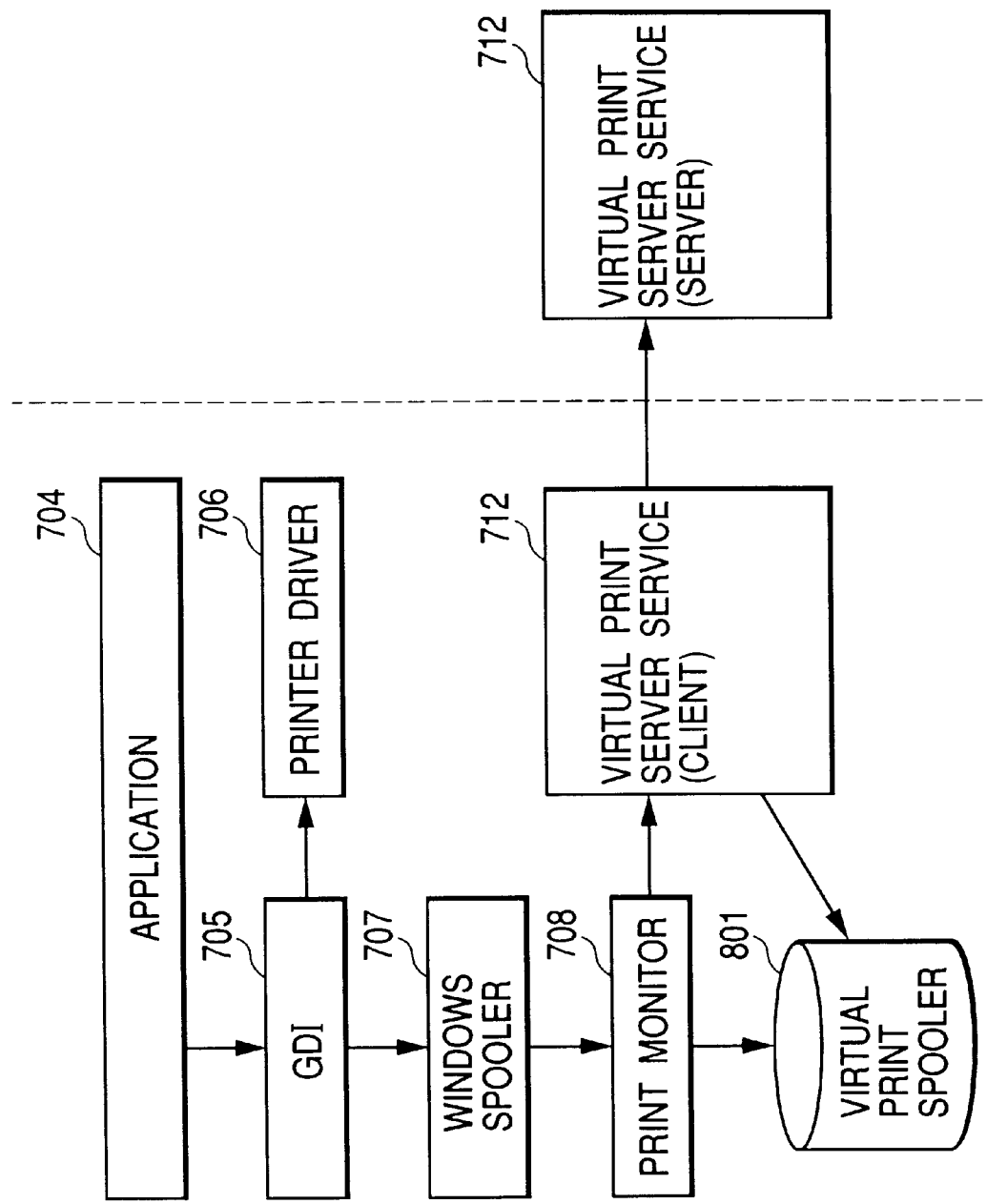
FIG. 8 is a diagram showing the print process flow when a print request is issued from the client to the server shown in FIG. 1.
Figure 9:
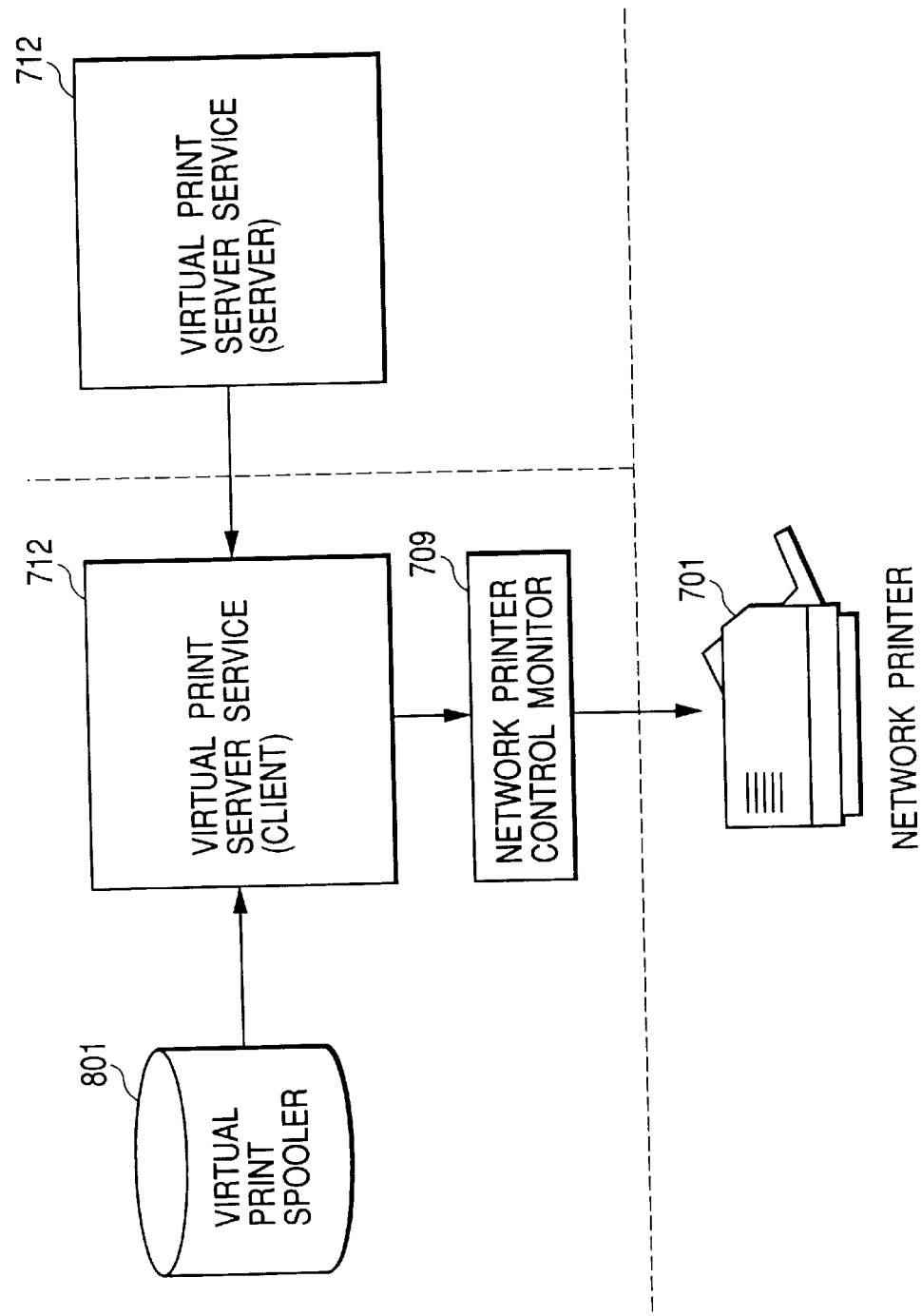
FIG. 9 is a diagram showing the print process flow when a printable indication is sent from the server to the client shown in FIG. 1 and thereafter print data is transmitted to a printer.

In the third embodiment, the client computer 102 instructs the network printer 105 to perform a print operation. In the description of this embodiment, Windows is used by way of example. The process of transmitting a print request from a server to a client is illustrated in FIG. 8, and the process of transmitting a printable indication from the server to the client and transmitting print data to the printer is illustrated in FIG. 9. The components shown in the block diagrams already described are used in the following description, with identical reference numbers as above being given. The print process will be described with reference to the sequence charts shown in FIGS. 8 and 9.

The application program 704 starts a print operation on the client computer 702 (102) by using GDI 705. GDI notifies the Windows spooler 707 and virtual print server print monitor 708 of the print start. Upon reception of the print start notice, the virtual print server print monitor 708 requests a print start to the virtual print server service (server) 712 of the server 703 (101) via the virtual print server service (client) 712. GDI 705 requests the printer driver 706 to convert the print data into a printer language. The printer driver 706 converts the print data into a printer language. The print data (graphics data) converted into the printer language is spooled by the Windows spooler 707.

The virtual server print monitor 708 receives the print data spooled by the Windows spooler 707 and passes the print data to the virtual print server service (client) 712. The virtual print server service (client) 712 temporarily stores the received print data in the virtual print spooler 801 as a spooling means, in HD 205 shown in FIG. 2. When all the print data is stored in the virtual print spooler 801 in HD 205, the virtual print server service (client) 712 notifies the virtual print server service (server) 712 of the server 703 (101) of the completion of storing the print data and requests a print operation. The virtual print server service uses the same module both for the client and server which can be used in a discriminating way through setting. As described earlier, this module is not necessarily the same for both the client and server, but different modules may be used which are supplied from different FDs as the storage means.

FIG. 9 is the sequence chart illustrating the operation that when the server determines that it is a time when a print job registered in the virtual print server service (server) 712 is printed, the print data is transmitted to the network printer.

The virtual print server service (server) 712 issues a printable indication to the client 702 when it is a time to print the print data. Upon reception of this printable indication, the virtual print server service (client) 712 reads the print data temporarily stored in the virtual print spooler 801 and passes it to the network printer control monitor 709. The network printer control monitor 709 passes the print data to the network printer in accordance with a print communications protocol to print it at the network printer 701.

The virtual print server service 712 will be detailed. This virtual print server service 712 is the main module in the virtual print server system, and uses the same module for both the client and server in a discriminating way through setting. The module set for the server may be used for the client by resetting it. As described with the first embodiment, the network printer is given a name and its IP address in the server setting to allow the client to use it. Other items are also set, such as a protocol to be used, a response time to a client, and a printer status monitor interval. For the client setting, the server is designated to thereby set the network printer managed by the server.

Figure 10:
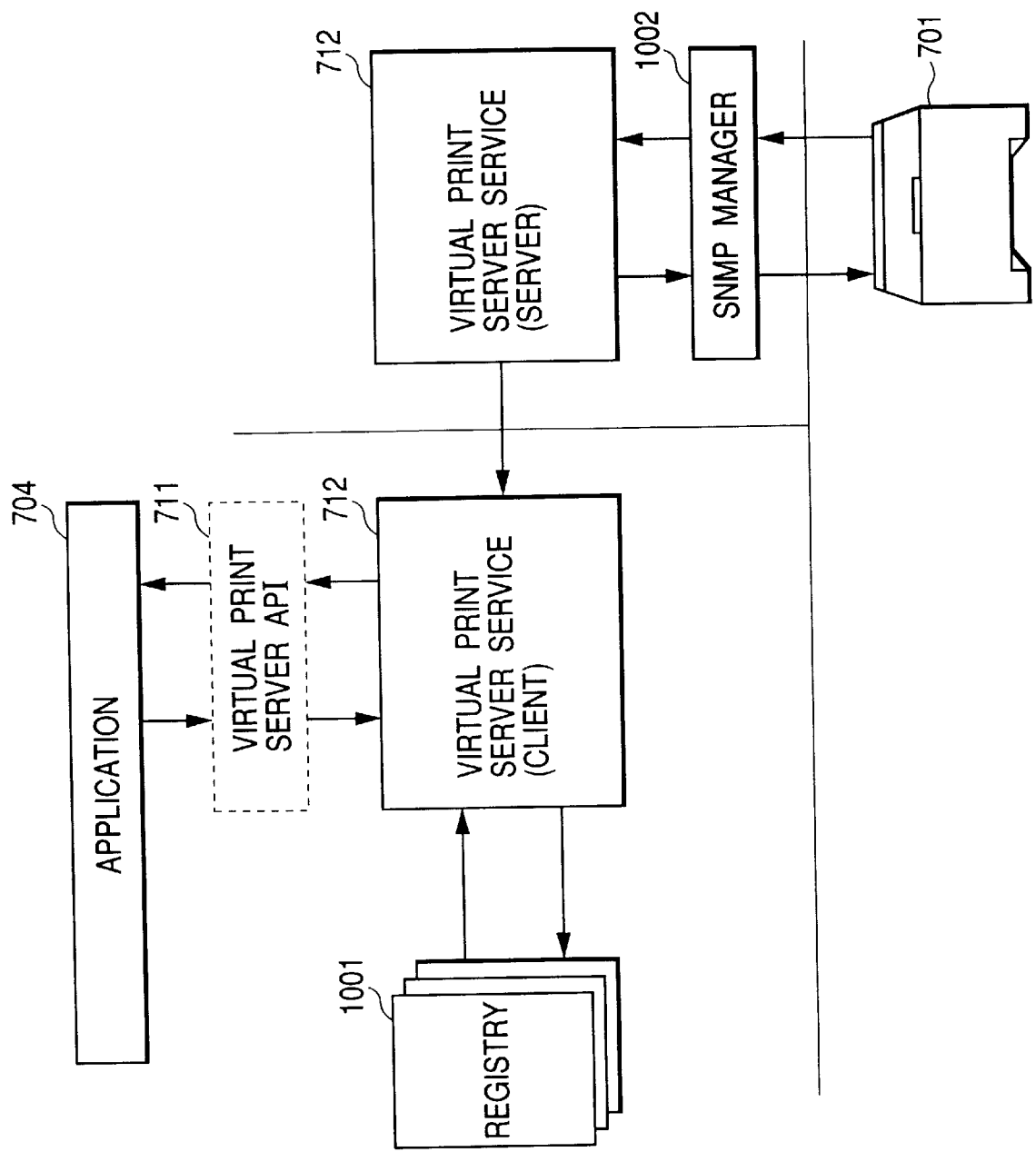
FIG. 10 is a diagram showing a printer status flow in the virtual server system of the invention.

The operation of notifying the client computer 702 of a status of the network printer will be described. This operation will be described by using Windows by way of example. The printer status sequence flow is shown in FIG. 10.

In this embodiment, the virtual print server service (server) 712 requests an SNMP manager 1002 at an interval of 5 seconds (default) to collect the status of the network printer 701. The SNMP manager 1002 requests the network printer 701 to collect the status. The network printer 701 returns the current status. If the status of the network printer 701 changes, the virtual print server service (server) 712 notifies the status change to the client computer 702 using the network printer 701. The change notice of the printer status issued from the server 703 is received by the virtual print server service (client) 712 of the client computer 702, and the printer status is stored in a registry 1001 in RAM of the client computer 702. The application program 704 can acquire the printer status stored in the registry 1001, via the virtual printer server API 711.

Figure 11:
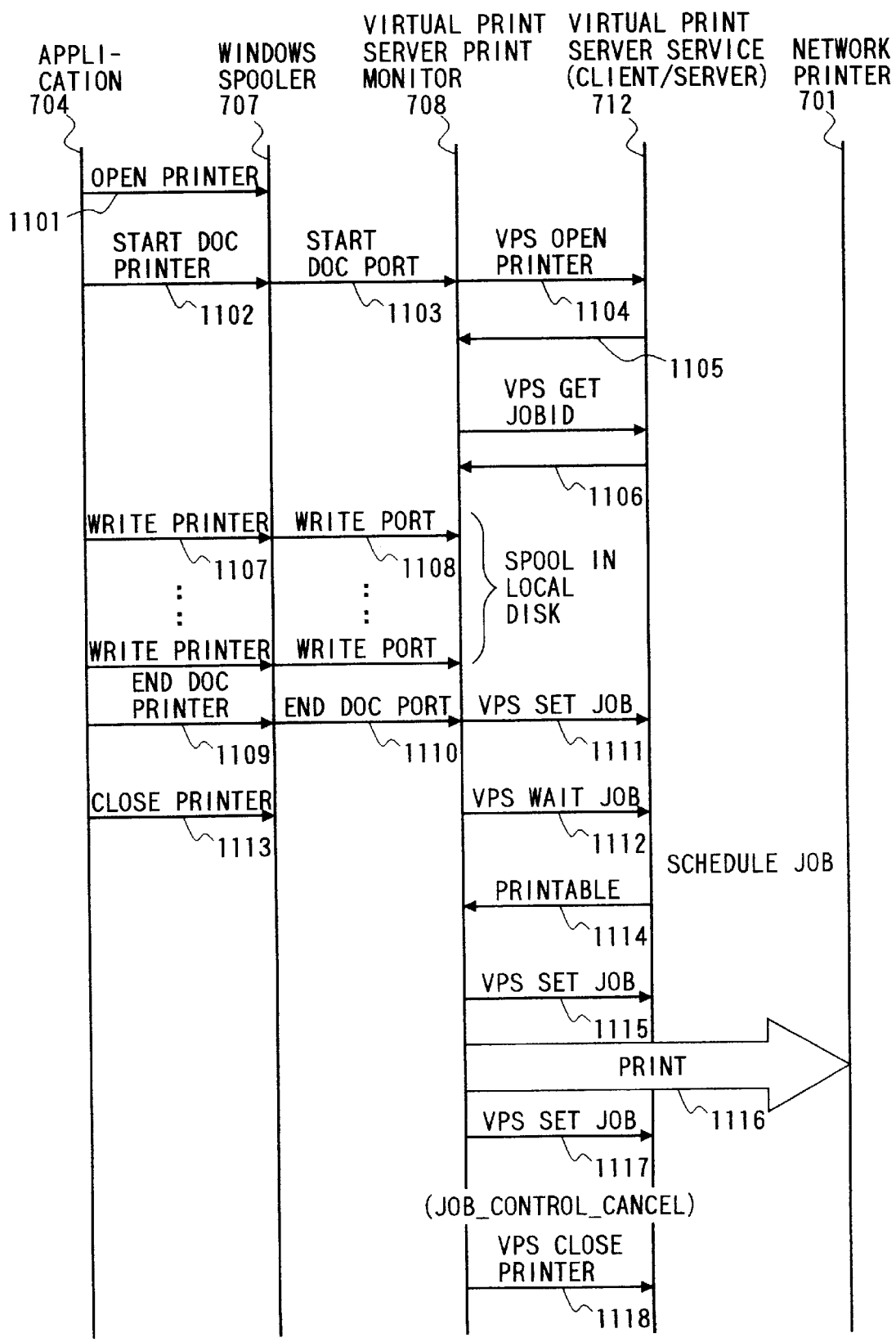
FIG. 11 is a diagram showing a print operation sequence of a virtual print server in the virtual server system of the invention.

The print sequence is shown in FIG. 11. The application program 704 starts a print operation by using a StartDoc API. GDI 705 requests the printer driver 706 to convert the print data into a printer language, and requests the Windows spooler 707 to start spooling. When all the print data is written in the Windows spooler 707 after the request by GDI 705, the print process by the application program 704 is terminated. The Windows spooler 707 passes the print data to the port corresponding the network printer 701 set as described with FIGS. 24, 25 and 26. Depending upon settings of the Windows spooler, writing the print data from GDI to the Windows spooler is not necessarily synchronous with writing the print data from the Windows spooler to the print monitor.

Prior to receiving the print data from the Windows spooler 707, the virtual print server print monitor 708 adds job information to the virtual print server service 712 to obtain a new job ID from the virtual print server service 712.

The job information will be detailed. In this system, a client transmits only the job information to the server (virtual server) without transmitting the print data, in order to register the print request. The job information includes a document name of the job, the number of pages, the amount of data, the status, the owner name (client name), a client ID and the like. The job information is therefor data other than the graphics data among the print data as used in the conventional technologies. It is to be noted that the graphics data among the print data as used in the conventional technologies is described as print data in this specification. The job information is registered in the server in the print order, and the server transmits the job ID to the client requested the print operation. The job ID is used in various operations such as when a printable indication is transmitted to the client.

After the virtual print server service (client) 712 acquires a new job ID, the virtual print server print monitor 708 writes the print data as a print file in the virtual print spooler 801 reserved in HD 205 (FIG. 2) of the client computer 702. After the spooling, the virtual print service print monitor 708 requests the virtual print server service 712 to start job scheduling. Upon reception of the scheduling start instruction from the virtual print server print monitor 708, the virtual print server service 712 requests the server 703 to start scheduling. Upon reception of this request, the server 703 starts the job scheduling at the virtual print server service (server) 712.

Figure 17:
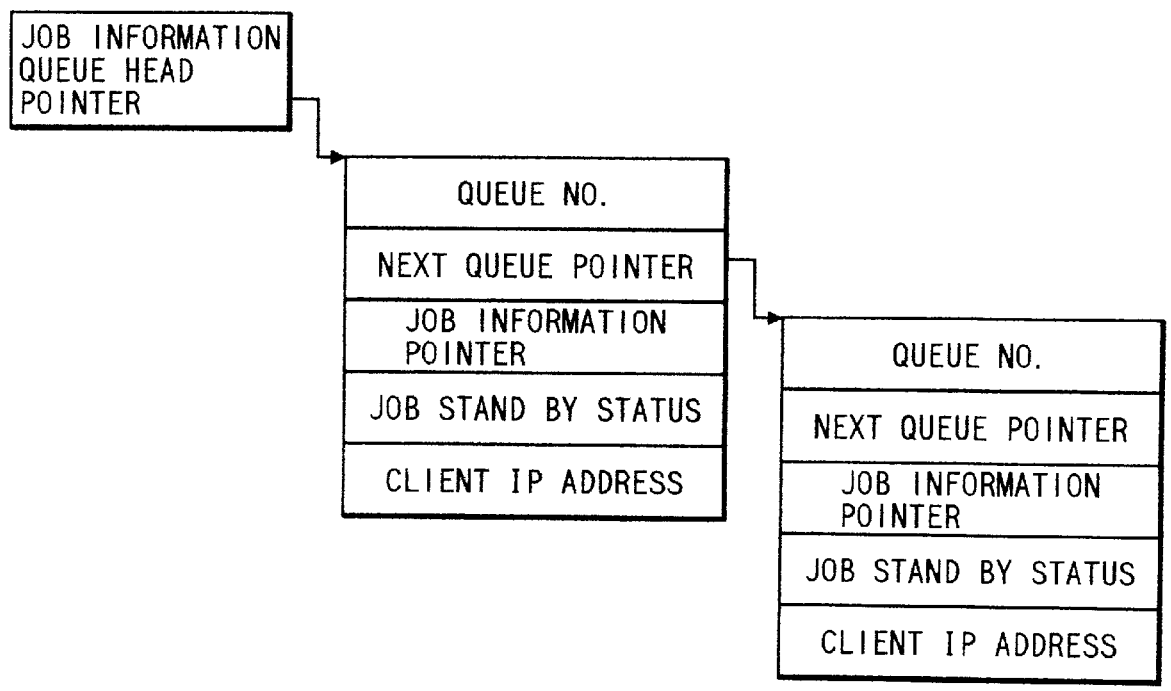
FIG. 17 is a diagram showing a job information queue.

The virtual print server service 712 schedules jobs and notifies the job ID whose job can be printed, to the virtual print server service 712 of the client computer 702. This can be executed by acquiring the client IP address as illustrated in FIG. 17. The virtual print server service (client) 712 reads the spool file of the print data spooled in the virtual print spooler 801. The virtual print server service (client) 712 passes the print data such as a print document to the network printer control monitor 709 which in turn transmits the print data to the network printer 701 in accordance with the protocol of the network printer 701 to print it.

The virtual print server service (server) 712 of the server 703 manages only the job information. When the network printer 701 managed by the server 703 can accept the next job, the server 703 issues the printable indication to the client computer 702 having a job waiting for the print operation. The client computer 702 given the printable indication by the server 703 transmits the print data of the spool file spooled in the virtual print spooler 801 directly to the network printer 701 without using the server. In the above manner, network printing can be performed.

FIG. 11 is a sequence flow illustrating the operation of the print monitor with a print function using the virtual print server according to this embodiment.

The print application program 704 instructs the Windows spooler 707 to perform an open process (OpenPrinter) (1101), and instructs to start printing the print data (StartDocPrinter) (1102). The Windows spooler 707 instructs the virtual print server print monitor 708 to perform a print start (VPSOpenPrinter) (1103). The virtual print service print monitor 708 instructs the virtual print server service (client/server) 712 to perform an open process (VPSOpenPrinter) for opening the printer managed by the virtual print server service 712 (1104). The virtual print server print monitor 708 inquires the printer information on the virtual print server service (client/server) 712 to acquire the port name of the network printer (VPSGetPort) (1105). A specific print job ID managed by the virtual print server service (client/server) 712 is acquired (VPSGetJobId) (1106). The print application 704 instructs the Windows spooler 707 to perform a write process (WritePrinter) of the print data (1107), and instructs the virtual print server print monitor 708 to perform a write process (WritePort) (1108). The print data actually written is in the virtual print spooler 801. The processes 1107 and 1108 are repeated until all the print data is written. After the completion of the write operation, the print application 704 performs a print completion process (1109). The Windows spooler 707 instructs the virtual print server print monitor 708 to perform a document print completion process (EndDocPrinter) (1110). The virtual print server print monitor 708 instructs the virtual print server service 712 to set the print job information (VPSSetJob) (1111). The virtual print server print monitor 708 instructs the virtual print server service 712 to perform a wait request (VPSWaitJob) of the designated print job (1112). This is performed in order to wait for the printable indication from the virtual print server service (server) 712. The print application 704 instructs the Windows spooler 707 to perform a close process (ClosePrinter) (1113). If the print preparation for the print job managed by the virtual print server service (client) 712 is completed, this virtual print server service (client) 712 gives the printable indication to the virtual print server print monitor 708 (1114). Prior to the print start, the virtual print server print monitor 708 sets the print job status managed by the server 703 to an under-printing status (VPSSetJob) (1115). The virtual print server print monitor 708 instructs the network printer 701 to perform a print operation (1116). After the completion of the print operation, the virtual print server print monitor 708 issues a print job cancel request (VPSSetJob(JOB_CONTROL_CANCEL)) (1117) and a printer close request (VPSClosePrinter) (1118) to the virtual print server service 712 (1117).

The print sequence flow using the virtual print server of this embodiment has been described above.

Figure 12:
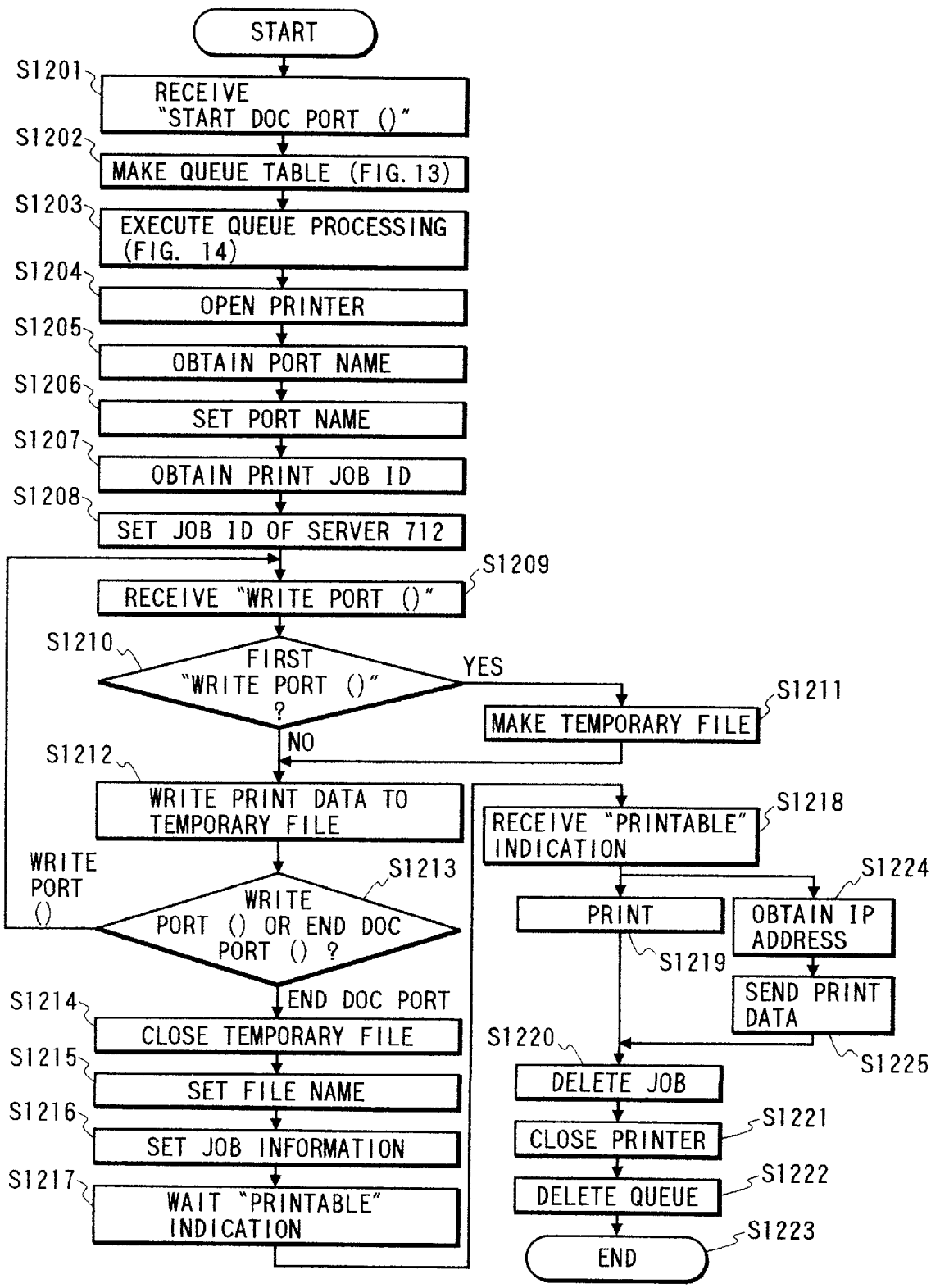
FIG. 12 is a flow chart illustrating a print operation of the virtual server of a client computer, by using a virtual printer server print monitor of the virtual server system according to the invention.

FIG. 12 is a flow chart illustrating the print function of the virtual print server print monitor 708, using the virtual print server service (client) 712 of the client computer, according to the embodiment.

At Step S1201, the virtual print server print monitor receives from the Windows spooler 707 an API Start-DocPort0 which is a print start request. At Step S1202, a registered job information queue table shown in FIG. 13 is formed. The job ID acquired at Step S1106 shown in FIG. 11 is set for StartDocPort0 received at Step S1201. At Step S1203 the registered job information queue table is linked to a queuing table as shown in FIG. 14. At Step S1204, the virtual print server print monitor 708 calls API of the virtual print server 712, VPSOpenPrinter0, to open the printer managed by the virtual print server 712. At Step S1205, the virtual print server print monitor 708 calls the virtual print server API, VSPGetPrinter0, to acquire the actual port name of the network printer. At Step S1206 the port name is set to a corresponding registered job information queue table (FIG. 13). At Step S1207, the virtual print server API, VSPGetJobId0, is called to acquire the print job ID managed by the virtual print server 712. At Step S1208 the acquired job ID of the virtual print server 712 is set to a corresponding registered job information queue table (FIG. 13). At Step S1209, API WritePort0 for writing the print data is received from the Windows spooler 707. It is judged at Step S1210 whether it is the first WritePort0. If affirmative, at Step S1211 a temporary file is generated in HD 205 of the client computer. This file is the spool file of the virtual print spooler 801. As above, in this embodiment, although the temporary file is stored in the virtual print spooler, the virtual print spooler may manage only the job information of the temporary file. In this case, the temporary file is generated in an empty area of the hard disk of the client. At Step S1212, the print data is written in the temporary file. At Step S1213 it is judged whether the function requested by the Windows spooler 707 is WritePort0 or EndDocPort0. If WritePort0, the flow advances to Step S1209, whereas if EndDocPort0, the flow advances to Step S1214. At Step S1214, the close process for the temporary file is performed, and at Step S1215 the pass name of the temporary file is set to a corresponding registered job information queue table (FIG. 13). At Step S1216, the virtual print server API, VSPSetJob0, is called to register the job information shown in FIG. 14 managed by the virtual print server print monitor 708 in the virtual print server 712. At Step S1217, VSP-WaitJob0 is called and set with the IP address used by the client computer, and a request for sending the printable indication of the designated print job is issued to thereafter wait for the printable indication. When the printable indication from the virtual print server service (server) 712 is received at Step S1218, a corresponding queue table is acquired in accordance with the corresponding registered job information queue corresponding to the job ID designated by the printable indication, and the network printer IP is acquired in accordance with the port name to thereby perform the print operation at the network printer at Step S1219. After the completion of the print operation, at Step S1220 the print monitor 708 calls VSPSetJob0 from the virtual print server service (client/server) 712, instructs to delete the job, and notifies the job completion. At Step S1221, API for closing the printer managed by the virtual print server service (client/server) 712 is called from the virtual print server service (client/server) 712. At Step S1222, the corresponding registered job information queue table (FIG. 13) is deleted to terminate the process.

Figure 18:
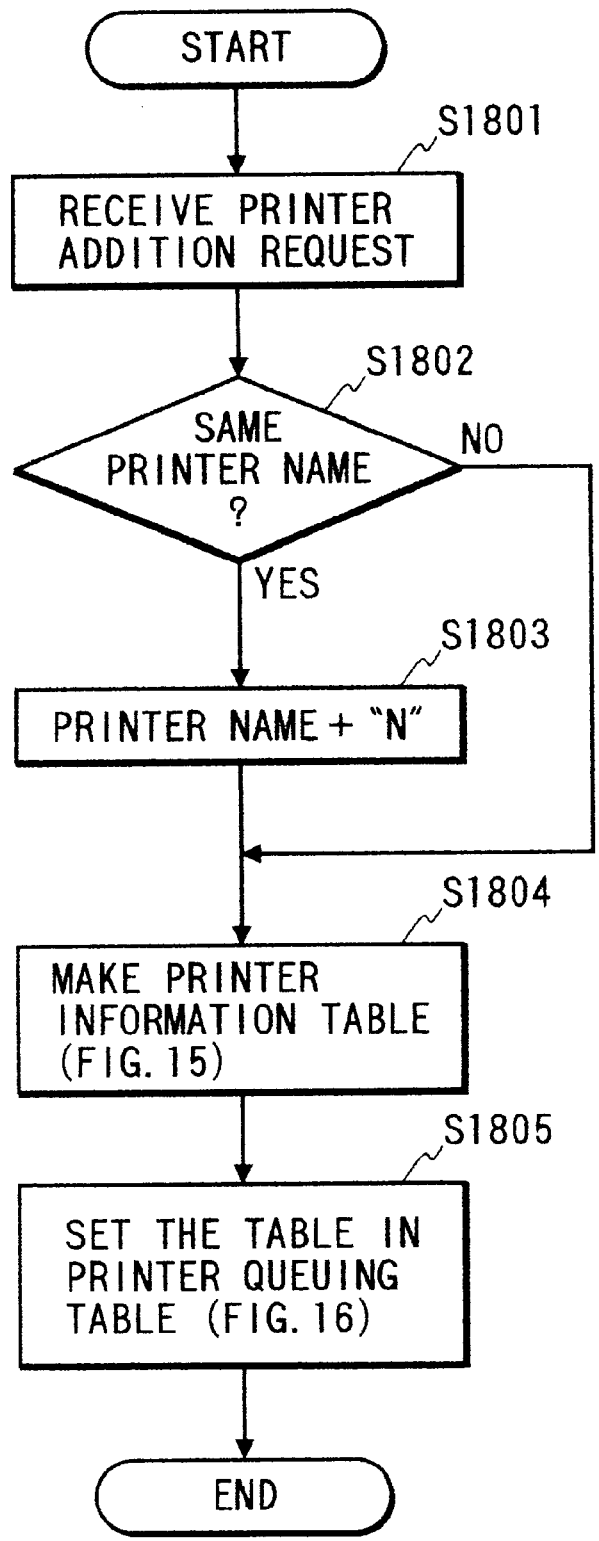
FIG. 18 is a flow chart illustrating the operation of registering a printer in the virtual print server in the virtual server system of the invention.

FIG. 18 is a flow chart illustrating the operation of the virtual print server service (server), regarding the function of registering a printer in the virtual print server.

At Step S1801 the virtual print spooler API having a function of adding a printer managed by the virtual print server service (client/server) is made open. If the virtual print spooler API having the printer adding function is to be executed, it is necessary to designate a printer information table (FIG. 15) containing the printer name and port name.

Figures 15, 16:
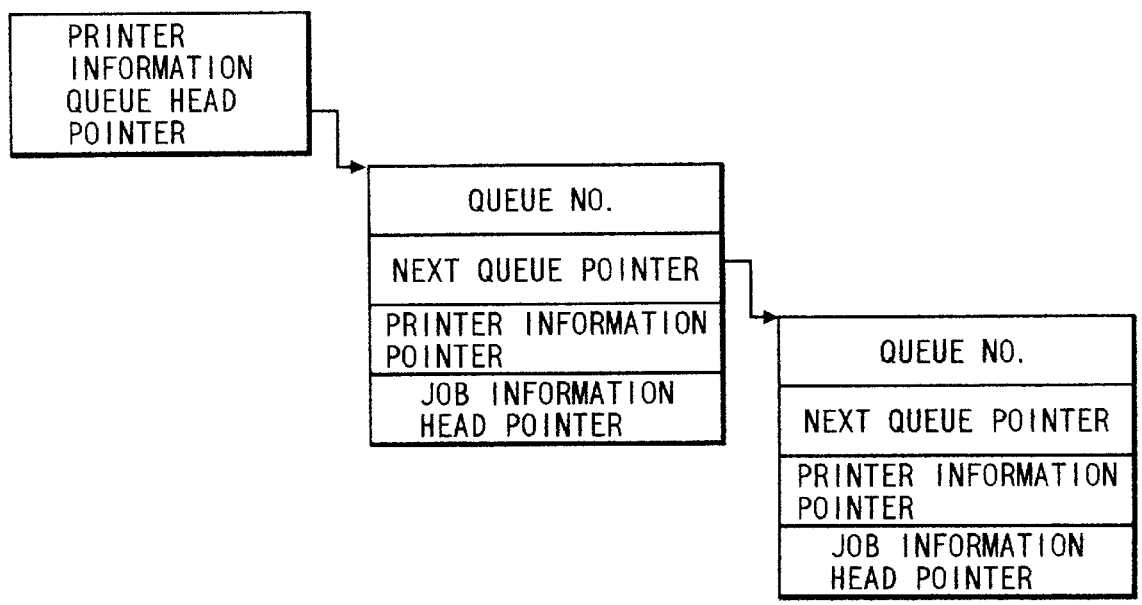
FIG. 15 is a diagram showing a printer information table.
FIG. 16 is a diagram showing a printer queuing table.

As a printer addition is received, the flow advances to Step S1802. At Step S1802 if the same printer name is already registered in the virtual print server, at Step S1803 this printer name is managed in a discriminating way as a printer name having "printer name"+"n" where n is a positive integer. If there is no same printer name at Step S1802, the process at Step S1803 is not performed and the flow skips to Step S1804 whereat the printer information table (FIG. 15) is generated, and at Step S1805 the printer information table is queued in a printer queuing table (FIG. 16). In the above manner, the registration process by the virtual print server service (server) of registering a printer in the virtual print server is completed.

Figure 19:
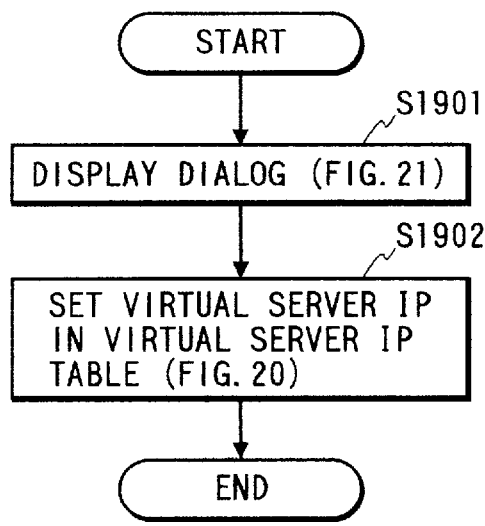
FIG. 19 is a diagram illustrating a sequence of registering information necessary for a print monitor of a virtual print server in the virtual server system of the invention.

FIG. 19 is a flow chart illustrating the operation of registering information necessary for the print monitor 708 according to the embodiment.

Figure 20:
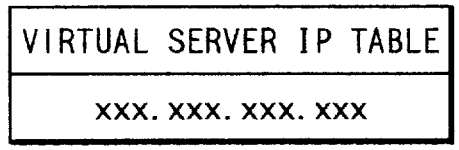
FIG. 20 is a diagram showing a virtual server IP table.
Figure 21:
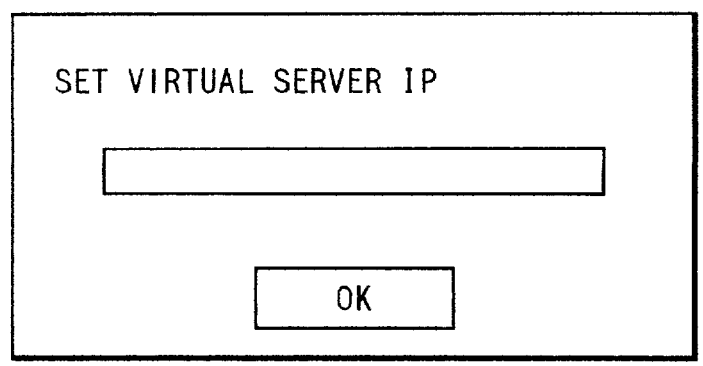
FIG. 21 is a diagram showing a dialog urging a user to enter an IP of the virtual server.

At Step S1901 the print monitor 708 displays a dialog (FIG. 21) urging a user to enter the virtual server IP. As the user enters the virtual server IP, this IP is set to a virtual server IP table (FIG. 20) in the print monitor 708 at Step S1902. The storage location is, for example, HD 205 shown in FIG. 2.

The print monitor 708 performs communications by using this IP address.

Figure 38:
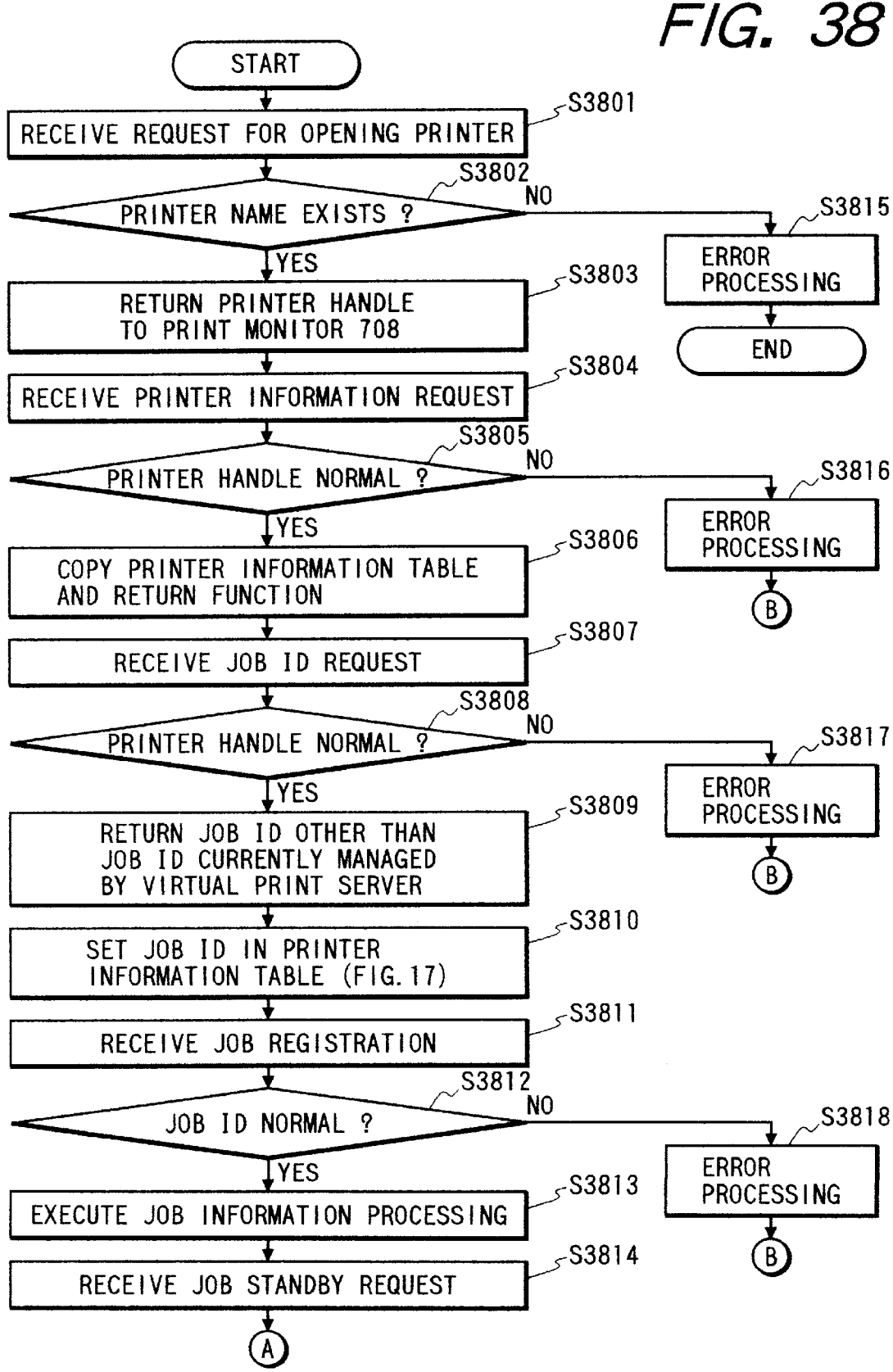
FIG. 38 is a flow chart illustrating a print instruction function of the virtual print server in the virtual server system according to a third embodiment of the invention.
Figure 39:
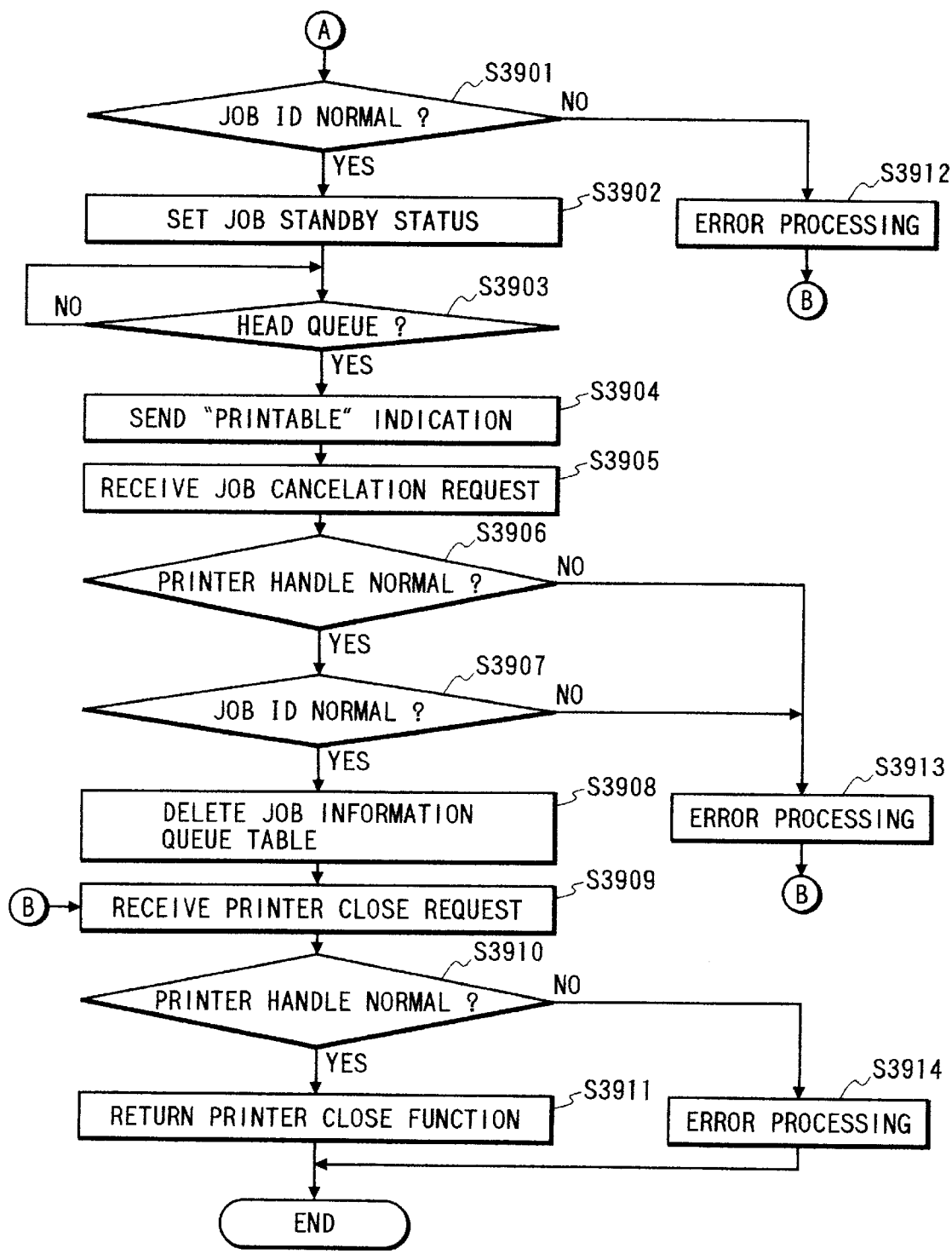
FIG. 39 is a flow chart illustrating the print instruction function of the virtual print server in the virtual server system according to the third embodiment of the invention, following the flow chart shown in FIG. 38.

FIGS. 38 and 39 are flow charts illustrating the operation of the virtual print server service (client/server) 712 regarding the print instruction function according to the embodiment. The flow charts shown in FIGS. 38 and 39 constitute one flow chart coupled at A and B.

At Step S3801 if there is a printer open request from the print monitor 708, at Step S3802 the virtual print server service (client/server) 712 searches all printer names to check whether the open requested printer name is contained in the printer information linked by a printer information pointer (FIG. 16) of the printer information queue table. If contained, the flow advances to Step S3803 whereat the pointer of the printer information queue table corresponding to the open requested printer name is returned as a printer handle back to the print monitor 708. At Step S3804 a printer information acquire request from the printer monitor 708 is received. At Step S3805 it is checked whether the printer handle as one parameter of the printer information acquire function is correct, i.e., whether there is printer information corresponding to the printer registered in the virtual print server. If there is corresponding printer information, at Step S3806 the contents of the printer information table are copied to the area assigned to the parameter of the printer information acquire function and returns the function. At Step S3807 a print job ID acquire request from the print monitor 708 is received. At Step S3808 it is checked whether the printer handle as one parameter of a print job ID acquire function is correct, i.e., whether there is printer information corresponding to the printer registered in the virtual print server. If there is corresponding printer information, at Step S3809 an ID different from the job ID presently managed by the virtual print server is issued and returned back to the print monitor 708. At Step S3810, in order to manage the job ID at the virtual print server, the job information queue table and the job information table area are reserved in a job information queue (FIG. 17) of a corresponding printer information table, and the job ID is set thereto and to the job information pointer of the job information queue table. At Step S3811, a job registration from the print monitor is received. At Step S3812 the job ID area of the job information table, linked to all the job information queues, is searched to check whether the job ID, which is one parameter of a job registration function, is managed by the virtual print server. If there is the designated job ID, at Step S3813 the job information process is performed. At Step S3813 the job information which is one parameter of the job registration function is set to the job information table corresponding to the job ID. At Step S3814, a job standby request from the print monitor is received and the flow advances to A.

A in FIG. 38 is coupled to A in FIG. 39. From A in FIG. 39, the flow advances to Step S3901. At Step S3901 the job ID area of the job information table lined to all the job information queues is searched to check whether the job ID which is a parameter of a job standby request is managed by the virtual print server. If there is the designated job ID, the IP address used by the client which is the parameter of the job standby request is set to an IP address area of the client in a corresponding job information queue (FIG. 17) to follow Step S3902. At Step S3902 a job standby status is set to a job standby status area of the job information queue table corresponding to the job ID. At Step S3903 it is checked whether the job information queue table set with the job standby status is at the head of the job information queue table. If at the queue head, the flow advances to Step S3904 whereat the client IP address is acquired from the IP address area of the client in the job information queue (FIG. 17) to which IP address the printable indication is transmitted by designating the corresponding ID. At Step S3905 a job cancel request indicating a print completion from the client is received. At Step S3906 it is checked whether the printer handle which is one parameter of a job cancel function is correct, i.e., whether there is printer information corresponding to the printer registered in the virtual print server. If there is corresponding printer information, at Step S3907 the job ID area of the job information table linked to all the job information queues is searched to check whether the job ID which is the parameter of the job cancel function is managed by the virtual print server. If there is the designated job ID, the flow advances to Step S3908 whereat the job information queue table corresponding to the job ID at Step S3907 is deleted. At Step S3907 a printer close process from the client is received. At Step S3910, the pointer to the printer information table managed by the virtual print server (the virtual print server services 712 for both the client and server) to check whether the printer handle as the parameter of the printer close function is correct. If there is the same pointer, at Step S3911, the printer close function is returned as normal.

At Step S3802 shown in FIG. 38, all printer names are searched to check whether there is the open requested printer name in the printer information linked by the printer information table (FIG. 16) in the printer information queue table. If there is no same printer name, the flow advances to Step S3815 to return the open function as error.

At Step S3805 it is checked whether the printer handle which is one parameter of the printer information acquire function has corresponding printer information registered in the virtual print server. If there is no corresponding printer information, at Step S3816 the printer information acquire function is terminated as error to follow B in FIG. 39 and hence to Step S3909.

At Step S3808 it is checked whether the printer handle which is one parameter of the print job ID acquire function has corresponding printer information registered in the virtual print server. If there is no corresponding printer information, at Step S3817 the print job ID acquire function is terminated as error to follow B in FIG. 39.

At Step S3812 the job ID area of the job information table linked to all the job information queues is searched to check whether the job ID which is one parameter of the job registration function is managed by the virtual print server. If there is the designated job ID, at Step S3818 the job registration function is terminated as error to follow B in FIG. 39.

At Step S3901 in FIG. 39, the job ID area of the job information table linked to all the job information queues is searched to check whether the job ID which is the parameter of the job standby request is managed by the virtual print server. If there is no designated job ID, at Step S3912 the job standby request is returned as error to follow B in FIG. 39.

At Step S3903 it is checked whether the job information queue table set with the job standby status at Step S3902 is at the head of the queue. If not at the head, the flow advances to Step S3903.

At Step S3906 it is checked whether the printer handle which is one parameter of the job cancel function has corresponding printer information registered in the virtual print server. If there is no corresponding printer information, at Step S3913 the job cancel function is returned as error to follow B in FIG. 39.

At Step S3907, the job ID area of the job information table linked to all the job information queues is searched to check whether the job ID which is the parameter of the job cancel function is managed by the virtual print server. If there is no designated job ID, at Step S3913 the job cancel function is returned as error to follow B in FIG. 39.

At Step S3910, the pointer to the printer information table managed by the virtual printer is searched to check if the printer handle which is the parameter of the printer close function is correct. If there is no same pointer, at Step S3914 the printer close function is returned as error to terminate the printer open process.

As above, the virtual print server system of the third embodiment of this invention is provided with a virtual job sequential order control mechanism for controlling the job order at the apparatus shared by a plurality of communications terminals on the network. Each communication terminal requesting a job print operation registers in the apparatus with the sequential order control mechanism, not the job data but only the data necessary for the sequential order control. This sequential order control mechanism determines the suspension of a print job request. Therefore, even an apparatus without a function of recognizing a job and a job deletion function which apparatus is shared by a plurality of communications terminal on the network, does not occupy excessive resources otherwise necessary for the sequential order control mechanism. Therefore, both the sequential order control and suspension of print job requests from communications terminals can be satisfied.

(Fourth Embodiment)

Figure 42:
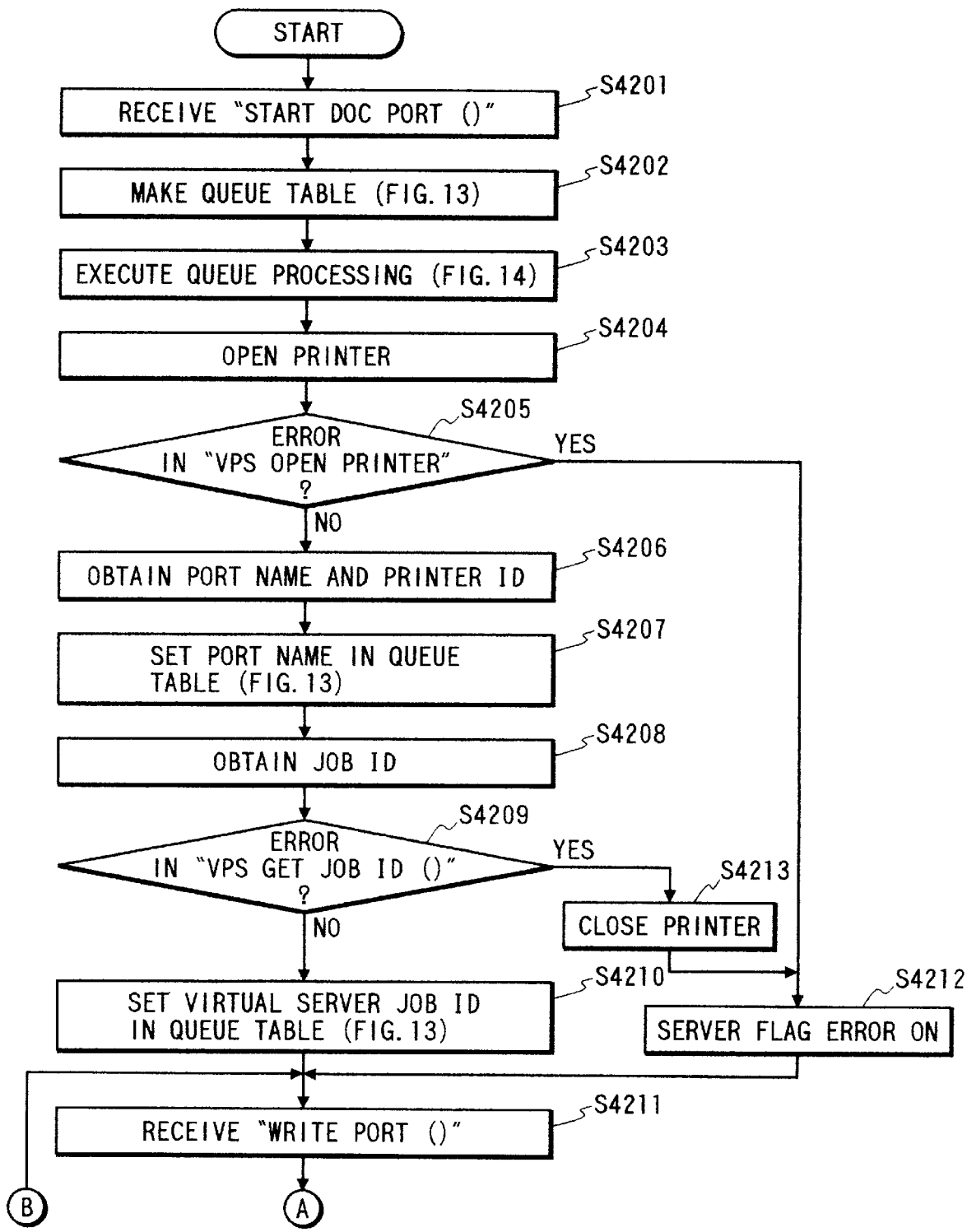
FIG. 42 is a flow chart illustrating the process of a print monitor for the print function using the virtual server according to a fourth embodiment of the invention.
Figure 43:
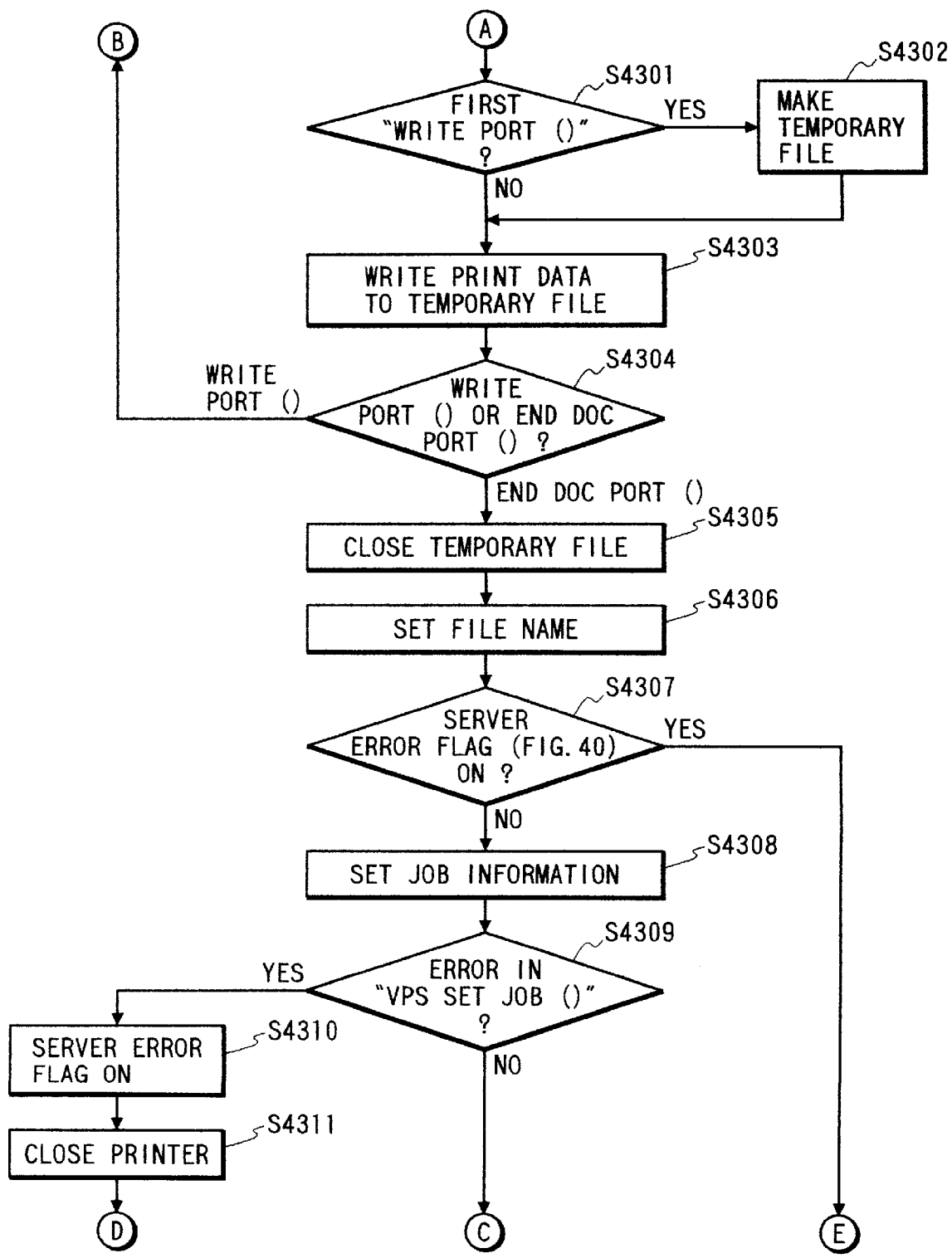
FIG. 43 is a flow chart illustrating the process of the print monitor for the print function using the virtual server according to the fourth embodiment of the invention, following the flow chart shown in FIG. 42.
Figure 44:
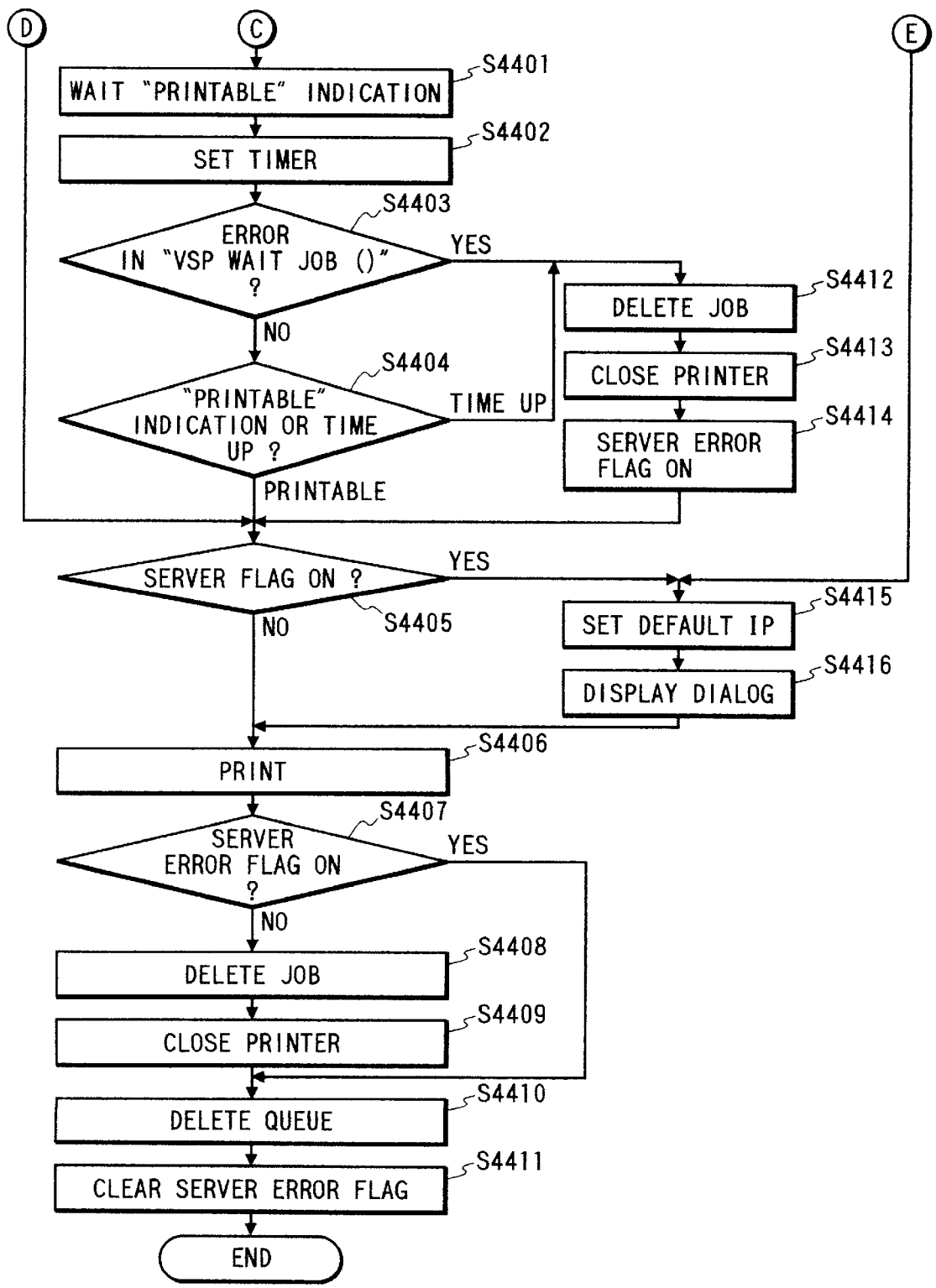
FIG. 44 is a flow chart illustrating the process of the print monitor for the print function using the virtual server according to the fourth embodiment of the invention, following the flow charts shown in FIGS. 42 and 43.

FIGS. 42 to 44 are flow charts illustrating the operation of the virtual printer server print monitor 708 according to the embodiment, in which if the virtual server 703 which uses the virtual print server print monitor 708 for the print operation is abnormal or is shut down, not the virtual server 703 but the client computer 702 directly instructs a default printer to perform the print operation and notifies a user of the effect that the default printer is used for the print operation. The flow charts shown in FIGS. 42 to 44 constitute a single flow chart. The default printer is a printer already set as an ordinary output destination of the client. In this embodiment, although the default printer is directly instructed to perform the print operation, the output destination is not limited to the default printer, but may be any other printer.

At Step S4201, the virtual printer server print monitor 708 receives API StartDocPort0 from the Windows spooler 707 which API is a print start request. At Step S4202, the registered job information queue table shown in FIG. 13 is generated, and at Step S4201 the job ID given by Start-DocPort0 at Step S4201 is set to the registered job information queue table.

At Step S4203, the registered job information queue table is linked to the queuing table as shown in FIG. 14. At Step S4204 the print monitor 708 calls VPSOpenPrinter0, which is API of the virtual print server (which is a collection of the virtual print server services 712, print monitor 708 and control monitors 709), from the virtual print server 712, to thereby open the printer managed by the virtual print server.

At Step S4205 it is checked whether VPSOpenPrinter0 is error. If normal, at Step S4206 the virtual print server API VSPGetPrinter0 is called from the virtual print server service 712 to acquire the port name and printer ID of the network printer set to the virtual print server service 712.

At Step S4207 the port name is set to the corresponding registered job information queue table (FIG. 13). At Step S4208 the virtual print server API VPSGetJobId0 is called to acquire the print job ID managed by the virtual print server. At Step S4209 it is checked whether the VPSGetJobId0 function is error. If normal, the flow advances to Step S4210.

At Step S4210, the acquired virtual server job ID is set to the corresponding registered job information queue table (FIG. 13). At Step S4211, API WritePort0 for writing print data from the Windows spooler 707 is received to follow A in FIG. 43 and hence Step S4301. At Step S4301, it is checked whether the received WritePort0 is the first WritePort0. If affirmative, at Step S4302 a temporary file is formed in HD 205 of the client computer. At Step S4303, the print data is written in the temporary file formed at Step S4302. At Step S4304, it is checked whether the function requested by the Windows spooler 707 is WritePort0 or EndDocPort0. If WritePort0, the flow advances to B in FIG. 42 and to Step S4211. If the function requested is judged as EndDocPort0 at Step S4304, the flow advances to Step S4305.

Figure 40:
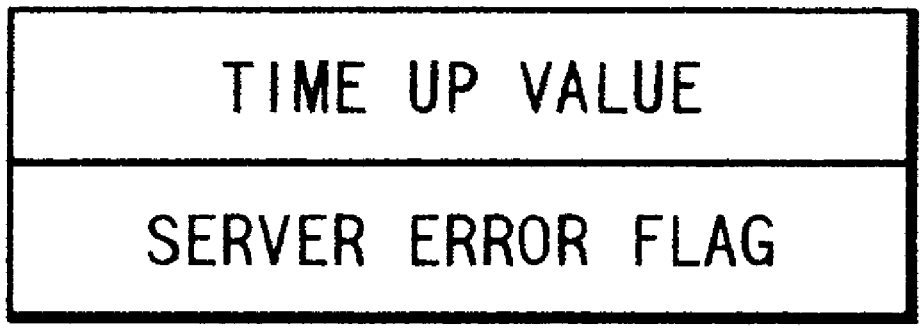
FIG. 40 is a diagram showing a time-up value and a server error flag.

At Step S4305, the close process of the temporary file is performed. At Step S4306, the pass name of the temporary file is set to the corresponding registered job information queue table (FIG. 13). At Step S4307, it is checked whether a server error flag (FIG. 40) is on. If on, at Step S4308 the virtual print server API VPSSetJob0 is called and the job information shown in FIG. 13 and managed by the print monitor 708 is registered in the virtual print server. At Step S4309, it is checked whether the VPSSetJob0 function is error. If normal, the flow advances to C in FIG. 44 and hence Step S4401.

At Step S4401, the virtual print server API VPSWaitJob0 is called to request an issue of the printable indication when the designated print job becomes printable, and waits for the printable indication. At Step S4402, the timer function of issuing a time-up indication when a designated time lapses is called to acquire a time-up value (FIG. 40) and set the timer. The time-up value indicates a time when the print operation starts if the server 703 does not issue the printable indication until this time. The time-up value shown in FIG. 40 and the server error flag are stored in RAM 202 of the client or virtual server.

At Step S4403, it is checked whether VPSWaitJob0 is normal. If normal, the flow advances to Step S4404. At Step S4404, the flow stands by until either the reception of the printable indication or until the time-up. If the printable indication is received, the flow advances to Step S4405 whereat it is checked whether the server error flag (FIG. 40) is on. If off, at Step S4406 the corresponding queue table is acquired in accordance with the registered job information queue (FIG. 13) corresponding to the job ID designated by the printable indication, and the network IP is acquired from the port name to thereby perform the print operation at the network printer. The job information queue shown in FIG. 13 is stored in RAM 202 or HD 205 of the virtual server. After the print operation, at Step S4407 it is checked whether the server error flag (FIG. 40) is on. If off, at Step S4408 VPSSetJob0 is called from the virtual print server to instruct the deletion of the corresponding job and notify the job completion. At Step S4409, the printer opened at Step S4204 shown in FIG. 42 is closed by calling a VPSPrinterClose0 function. At Step S4410, the corresponding registered job information queue table (FIG. 13) and the temporary file written with the print data are deleted to terminate the process. At Step S4411, the server error flag (FIG. 40) is cleared.

At Step S4205 shown in FIG. 42, it is checked whether VPSOpenPrinter0 is error. If error, the flow advances to Step S4213 whereat the printer opened at Step S4204 is closed by calling VPSPrinterClose0. At Step S4212, the server error flag (FIG. 40) is turned on to follow Step S4211.

At Step S4307 shown in FIG. 43, it is checked whether the server error flag (FIG. 40) is on. If on, the flow advances to E in FIG. 44 and hence Step S4415. At Step S4415 the IP address of the default printer is set to the port name of the queue table corresponding to the registered job information queue. At Step S4416, a dialog is displayed to notify the user of the effect that the default printer is used for the print operation without an instruction from the server. Thereafter, the flow advances to Step S4406.

At Step S4309 shown in FIG. 43, it is checked whether the VPSSetJob0 function is error. If error, at Step S4310, the server error flag (FIG. 40) is turned on to follow Step S4311 whereat the printer opened at Step S4204 shown in FIG. 42 is closed by calling VPSPrinterClose0 to follow D in FIG. 44 and hence Step S4405.

If it is judged at Step S4403 that the VPSWaitJob0 function is error, the flow advances to Step S4412. At Step S4412, VPSSetJob0 is called from the virtual print server to instruct the deletion of the corresponding job and notify the job completion. At Step S4413, the printer opened at Step S4204 is closed by calling VPSPrinterClose0. At Step S4414, the server error flag (FIG. 40) is turned on to follow Step S4405.

At Step S4405, it is checked whether the server error flag is on. If on, at Step S4415 the IP address of the default printer is set to the port name of the queue table corresponding to the registered job information queue. At Step S4416, a dialog is displayed to notify the user of the effect that the default printer is used for the print operation without receiving an indication from the server 703. Thereafter, the flow advances to Step S4406.

At Step S4407, it is checked whether the server error flag is on. If on, the flow advances to Step S4410.

As above, in the fourth embodiment, even if the virtual server has some error or is shut down while the client computer registers a job in the virtual server or transfers a command to and from the virtual server, the client can perform a print operation directly at a default printer. Furthermore, even if the printable indication is not returned for a predetermined time from the virtual server after a job is registered, the print operation can be performed so that the waist time of the user can be shortened.

(Fifth Embodiment)

Figure 45:
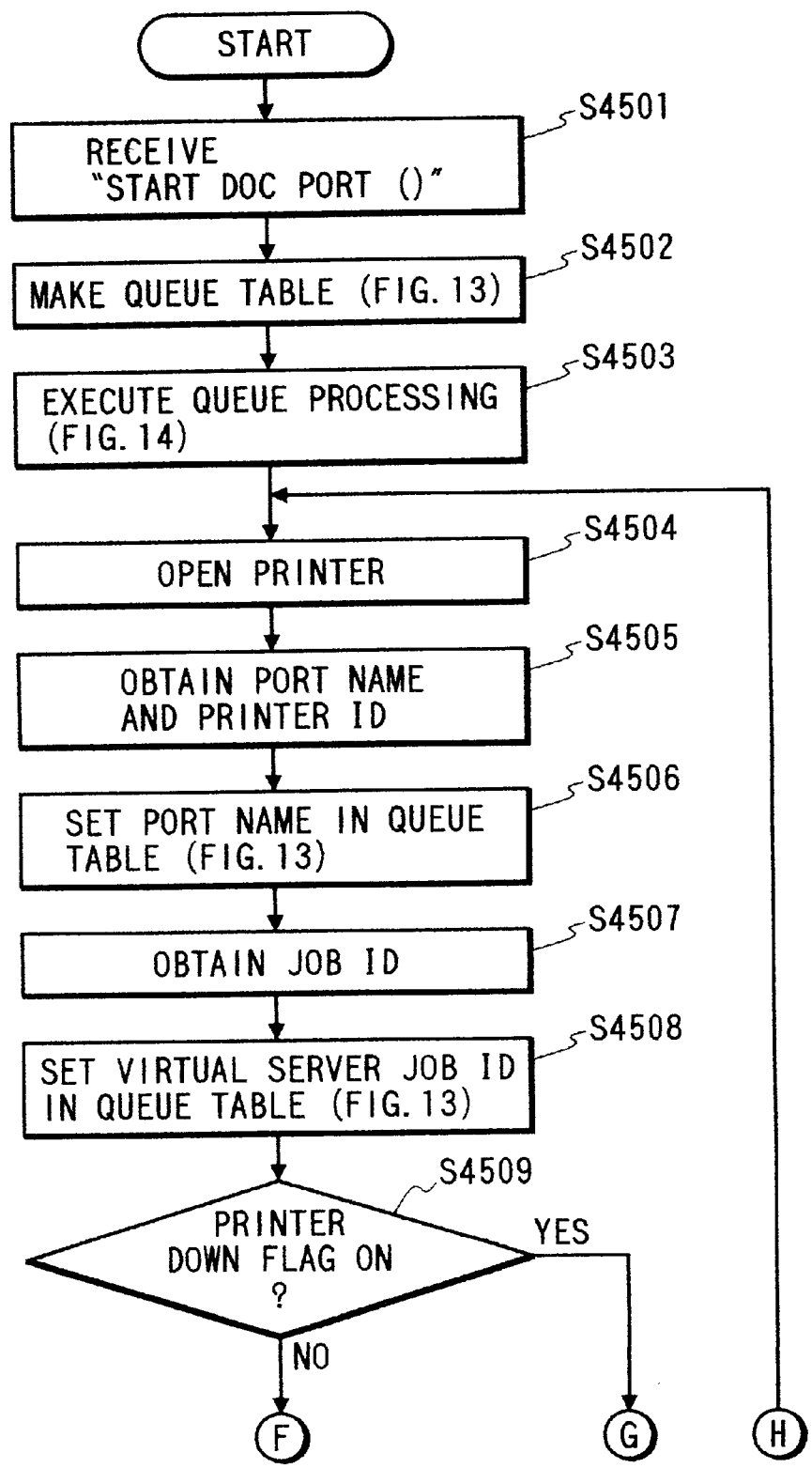
FIG. 45 is a flow chart illustrating the process of the print monitor for the print function using the virtual server according to a fifth embodiment of the invention.
Figure 46:
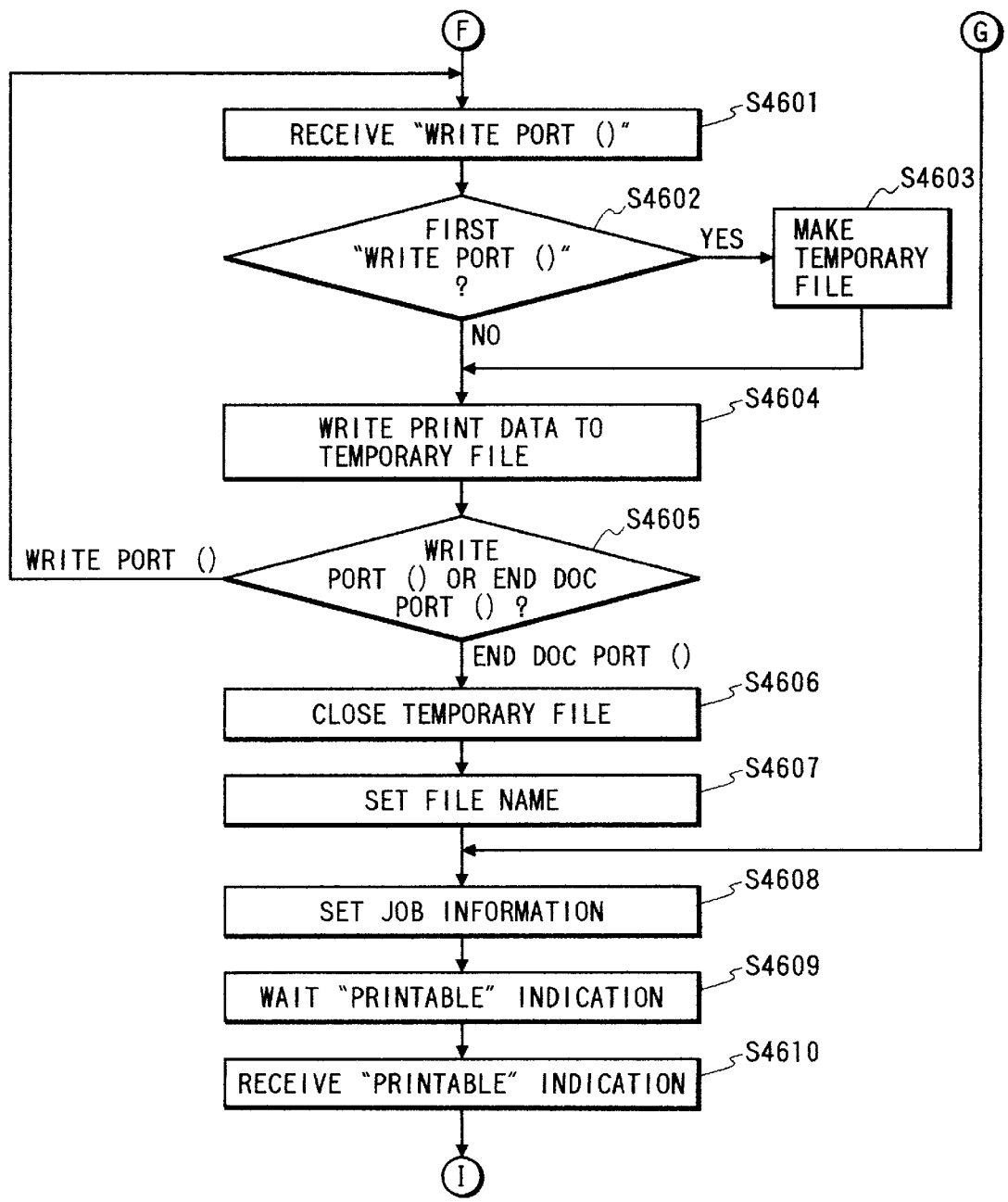
FIG. 46 is a flow chart illustrating the process of the print monitor for the print function using the virtual server according to the fifth embodiment of the invention, following the flow chart shown in FIG. 45.
Figure 47:
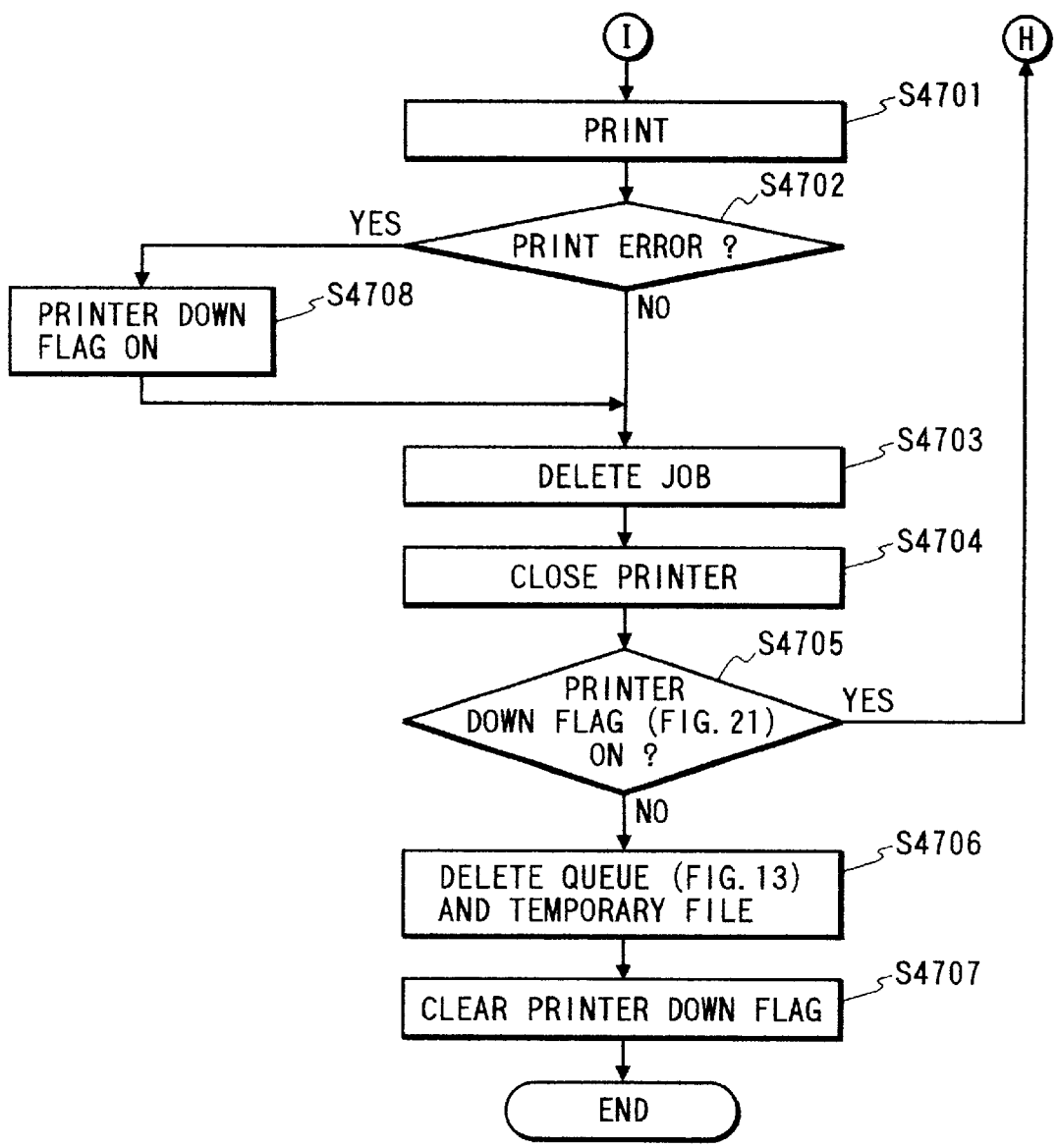
FIG. 47 is a flow chart illustrating the process of the print monitor for the print function using the virtual server according to the fifth embodiment of the invention, following the flow charts shown in FIGS. 45 and 46.

FIGS. 45 to 47 are flow charts illustrating the print operation by the virtual print server print monitor 708 and virtual print server service 712 according to the fifth embodiment. The program realizing the functions illustrated in these flow charts is stored in HD 205 or ROM 201, and developed onto RAM 202 so that CPU 200 can control each device of the apparatus.

At Step S4501, the virtual print server print monitor 708 receives the print start request API StartDocPort0 from the Windows spooler 707. At Step S4502, the registered job information queue table shown in FIG. 13 is generated in RAM 202, and the job ID given by StartDocPort0 at Step S4501 is set to the registered job information queue table.

At Step S4503, the registered job information queue table linked to the queuing table is stored in RAM 202 or HD 205 in the manner described with FIG. 14. At Step S4504, the virtual print server print monitor 708 calls the virtual print server API VPSOpenPrinter0 from the virtual print server service 712 to open the printer managed by the virtual print server service 712. At Step S4505, the virtual print server API VPSGetPrinter0 is called to acquire the port name and printer ID of the network printer. At Step S4506, the port name is set to the corresponding registered job information queue table (FIG. 13). At Step S4507, the virtual print server API VPSGetJobId0 is called to acquire the print job ID managed by the virtual print server service 712. At Step S4508, the acquired job ID of the virtual server 703 is set to the corresponding registered job information queue table (FIG. 13).

Figure 41:
FIG. 41 is a diagram showing a printer-down flag.

At Step S4509, the virtual print server service 712 checks whether a printer-down flag (FIG. 41) is on. If off, the flow advances to F in FIG. 46 and hence Step S4601. At Step S4601, API WritePort0 for writing print data from the Windows spooler 707 is received. At Step S4602, it is checked whether the received WritePort0 is the first Write-Port0. If affirmative, at Step S4603 a temporary file is formed in HD 205 of the client computer. At Step S4604, the print data is written in the temporary file formed.

At Step S4605, it is checked whether the function requested by the Windows spooler 707 is WritePort0 or EndDocPort0. If WritePort0, the flow advances to Step S4601, whereas if EndDocPort0, the flow advances to Step S4606. At Step S4606, the close process of the temporary file is performed. At Step S4607, the pass name of the temporary file is set to the corresponding registered job information queue table (FIG. 13). At Step S4608 the virtual print server API VPSSetJob0 is called and the job information shown in FIG. 13 and managed by the print monitor 708 is registered in the virtual print service 712.

At Step S4609, the IP address of the client computer is set to the virtual print server API VPSWaitJob0 which is called from the virtual print server service (server) 712, to thereby request an issue of the printable indication when the designated print job becomes printable, and to wait for the printable indication from the virtual print server service (server) 712. If the printable indication is received from the virtual print server service (server) 712 at Step S4610, the flow advances to I in FIG. 47 and hence Step S4701. At Step S4701 the print monitor 708 acquires the queue table in accordance with the registered job information queue corresponding to the job ID designated by the printable indication, and the network IP is acquired from the port name to thereby perform the print operation at the network printer. After the print operation, at Step S4702 it is checked whether there is any error of the print operation. If not, the flow advances to Step S4703.

At Step S4703, VPSSetJob0 is called from the virtual print server to instruct the deletion of the corresponding job and notify the job completion. At Step S4704, the virtual print server service 712 is instructed to close the printer managed by the virtual print server. At Step S4705, it is checked whether the printer-down flag (FIG. 41) is on. If off, the flow advances to Step S4706. At Step S4706, the corresponding registered job information queue table (FIG. 13) and the temporary file written with the print data are deleted. At Step S4707, the printer-down flag (FIG. 41) is turned on to terminate the process.

At Step S4509 shown in FIG. 45, it is checked whether the printer-down flag (FIG. 41) is on. If on, the flow advances to G shown in FIG. 46 and hence Step S4608. At Step S4608, the virtual print server API VPSSetJob0 is called to register the job information shown in FIG. 13 and managed by the print monitor 708 in the virtual print server.

At Step S4702 shown in FIG. 47, the print monitor 708 checks whether the printer has any error during the print operation. If there is any error, the flow advances to Step S4708 whereat the printer-down flag (FIG. 41) is turned on to follow Step S4703.

At Step S4705, it is checked whether the printer-down flag (FIG. 41) is on. If on, the flow advances to H shown in FIG. 45 and hence Step S4504. At Step S4504, the print monitor 708 calls the virtual print server API VPSOpen-Printer0 to open the printer managed by the virtual print server.

In this embodiment, if the printer does not accept a job from the client, the job is registered again in the server. Instead, since the server confirms the printer status by using the SNMP manager, a flag indicating whether the printer has any error may be provided in the server. In this case, the client registers a job again when the flag is set. When a job is registered again, the current output destination printer may be registered, or another normal printer may be registered.

As above, in the fifth embodiment, even if the printer does not accept a print job of the client computer after the virtual server instructs, the job stored in the virtual server is registered again so that the server can confirm the printer status and the job control is made easy.

(Sixth Embodiment)

In this embodiment, confirmation of a print operation by a network printer will be described.

First, the virtual print server system described above will be briefly summarized.

According to one aspect of the invention, a client as one example of an information processing apparatus comprises: means (virtual print server service (client) 712 and interface 209) for transmitting job information of print data to a server; and spool means (virtual print spooler 801 in HD 205) for spooling the print data, and the server as one example of a print control apparatus comprises: means (virtual print server service (server) 712 and interface 209) for transmitting transmission enabled information indicating that the print data can be transmitted to a printer.

In the system constructed as above, a client computer as the information processing apparatus transmits job information to a virtual server which in turn controls the print order, and the client computer received the transmission enabled information transmits print data directly to a printer. Confirmation of the print operation by such a print system according to the embodiment will be described hereinunder.

Figure 48:
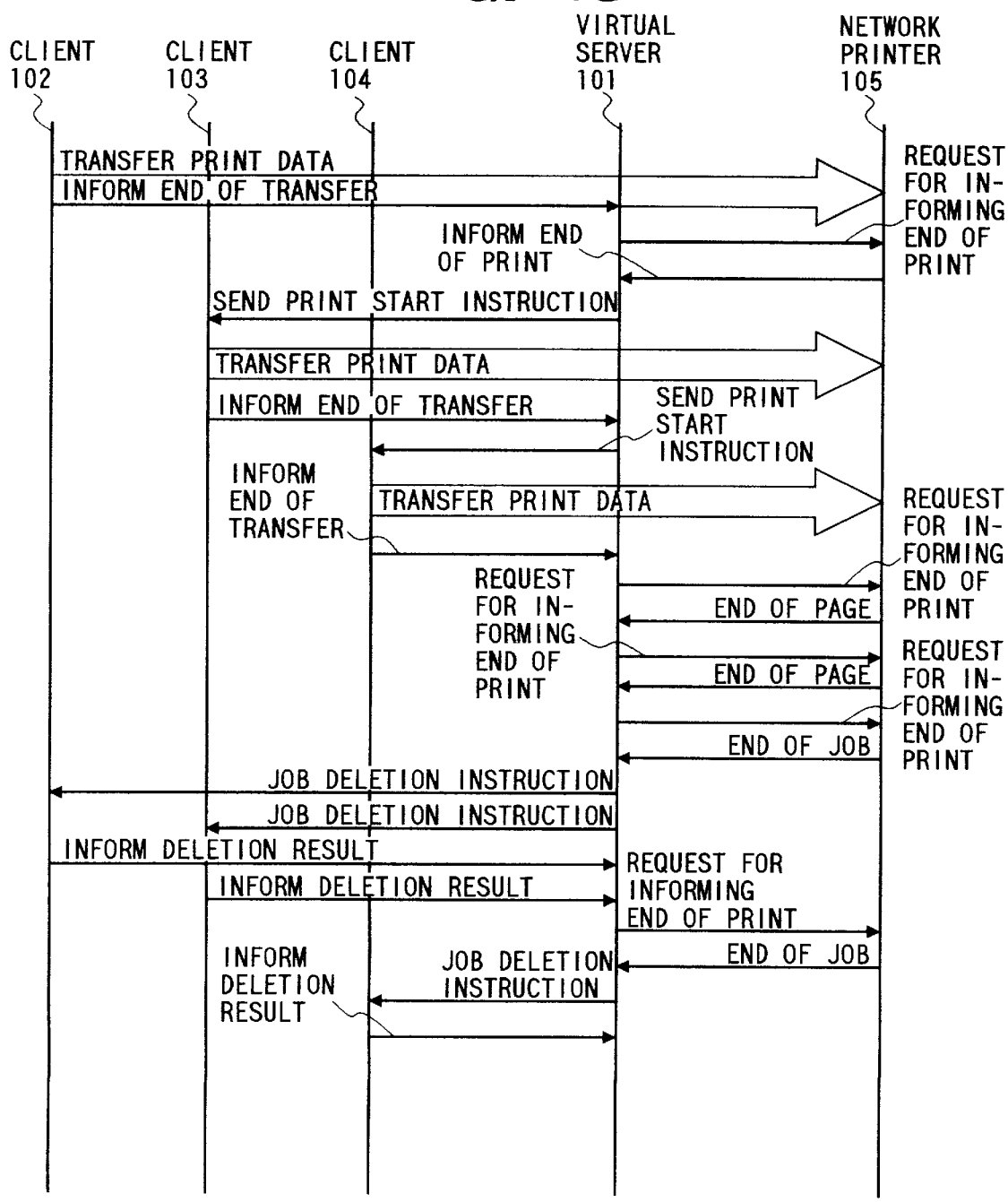
FIG. 48 is a sequence diagram of the system when a print operation of a job is completed normally.
Figure 49:
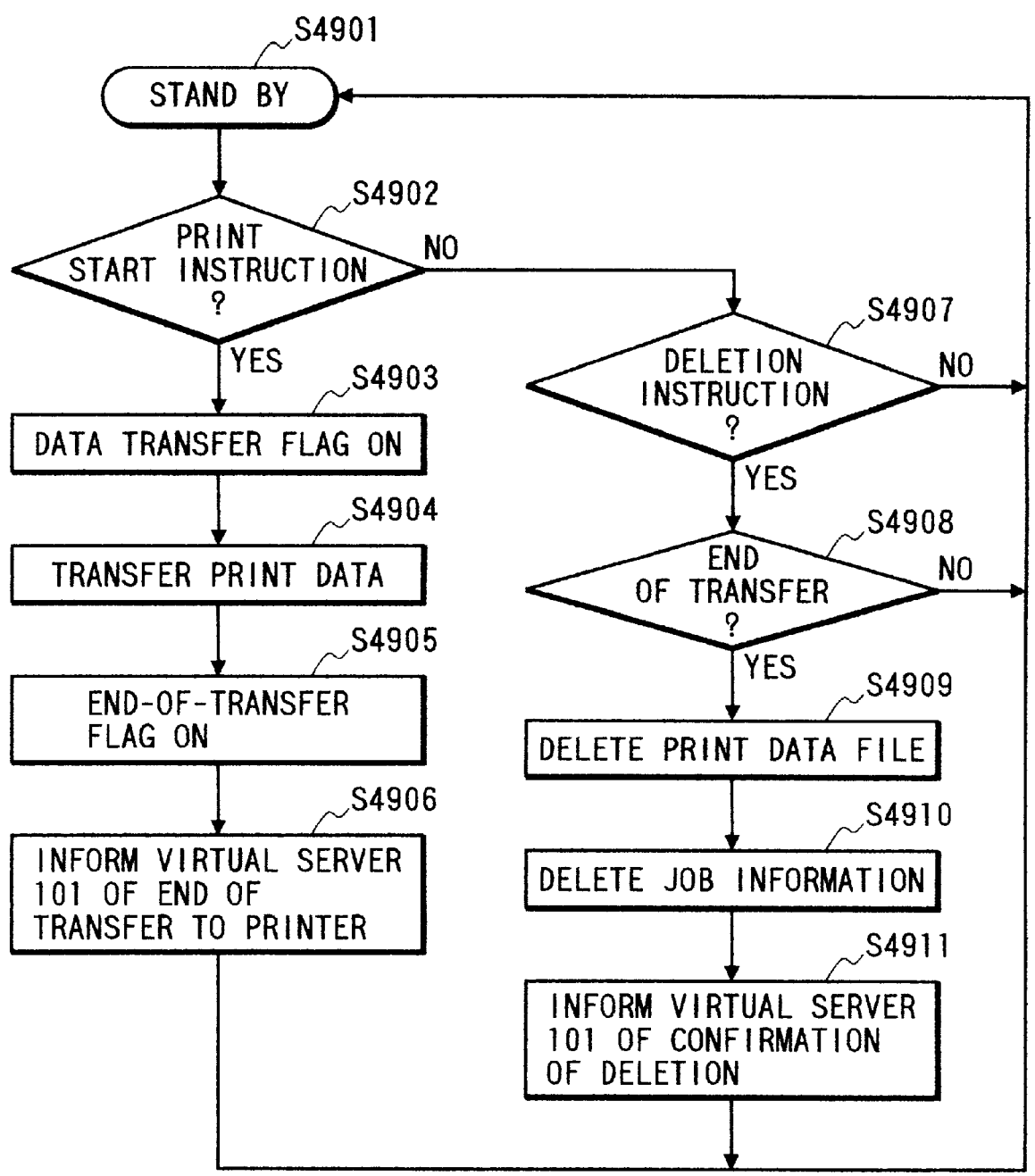
FIG. 49 is a flow chart illustrating the operation of the client for the confirmation of a print operation of a network printer according to a sixth embodiment of the invention.
Figure 50:
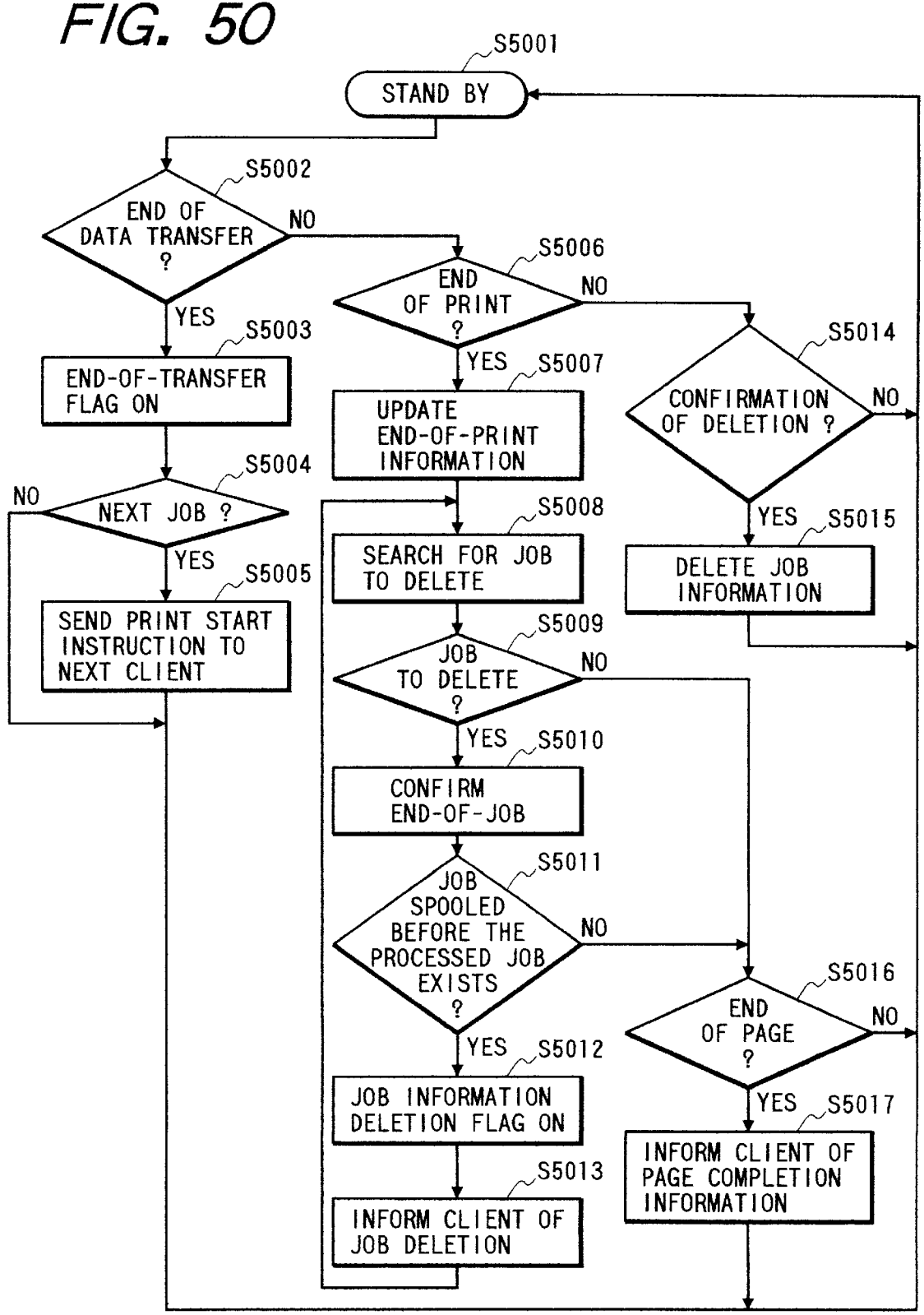
FIG. 50 is a flow chart illustrating the operation of the virtual server for the confirmation of a print operation of a network printer according to a sixth embodiment of the invention.

FIG. 49 is a flow chart illustrating the operation on the side of a client computer PC for the confirmation of the print operation by a network printer, according to the embodiment of the invention. FIG. 50 is a flow chart illustrating the operation on the side of a virtual server for the confirmation of the print operation by the network printer according to the embodiment. FIG. 48 is a sequence diagram illustrating a normal print job for the confirmation of the print operation by the network printer according to the embodiment.

In this embodiment, it is assumed that the virtual print server system running on a network as shown in FIG. 1 is constituted of three client PCs (client PCs 102 to 104) with the virtual print server service (client) (client service) 712 being installed and executed, a server (virtual server) 101 with the virtual print server service (server) (virtual print server) 712 being installed and executed, and a network printer configured such as shown in FIG. 6. It is also assumed that the virtual server 101 (703) can always monitor the status of the network printer 105 (701) and can acquire a job identifier for identifying a finished job and the print end page at a constant polling interval. The job identifier may use a job ID number.

In the sequence diagram shown in FIG. 48, the client PCs 102 to 104 spool in this order the job information relative to the virtual server 101, and the virtual server 101 sends a print instruction first to the client PC 102.

The client PC 102 waits for an instruction from the virtual print server service (server) managing the printer name the client service of the client PC 102 can use and for an instruction from application software running on the client PC 102 or from a user interface used by the client service or other instructions.

In order to describe the confirmation of the print operation, the operations by the client PCs, virtual server, and network printer will be described with reference to the sequence diagram of FIG. 28.

The operations of the other client PCs 103 and 104 already registered jobs are executed in the similar manner to the case of the client PC 102. Upon reception of a print instruction of the job spooled at the client PC 102 from the virtual server 101, the client PC 102 transfers print data of the job to the network printer 105. This data transfer may be performed in accordance with a protocol dedicated to printing, such as LPR of TCP/IP, a protocol whose main object is not concerned about printing, such as FTP, or any other protocols usable by the client PC and the network printer or its network board.

After the print data is transferred, the client PC 102 notifies the virtual server 101 of a data transfer end to the network printer 105. In this case, the client PC 102 terminates communications with the network printer 105 after the normal data transfer, without confirming that the printer has normally printed the print data. The virtual server 101 and client PC 102 renew a data transfer flag, without deleting the temporary file written with the job print data and the job information. The virtual server 101 requests, at a constant interval by using a protocol such as SNMP, the network printer 105 to notify the status thereof and a print end. Upon reception of a print end notice request from the virtual server 101, the network printer 105 returns information such as the job identifier for which job the printer has printed in a normal manner and the page number during printing. This operation can be performed in a multi-task way by another thread or task different from that used by the operation of the virtual server 101, by the data transfer from the client PCs 102 to 104 to the network printer 105, or by other operations. Upon reception of the data transfer end notice of the job spooled by the client PC 102, the virtual server 101 searches the queue and sends a print start instruction to the client PC 103 for printing the job next spooled. Upon reception of the print start instruction, the client PC 103 which has been waiting for the instruction transfers the print data to the network printer 105, renews the status of the job information, and notifies the virtual server 101 of the data transfer end, similar to the case of the client PC 102. Upon reception of the data transfer end notice from the client PC 103, the virtual server 101 sets the data transfer end flag, and sends the print start instruction to the client PC 104 for printing the job next spooled. Similarly, the client PC 104 transfers the print data, resets the data transfer end flag, and notifies the data transfer end to the virtual server 101 which in turn sets the data transfer end flag.

Next, the virtual server communicates with the network printer 105 at the constant interval to send the print end notice request. When the page number with completed printing is returned, this page number is overwritten in a print end information table in the virtual server 101, similar to the operation at the network printer. If a job end is returned, the job identifier is overwritten to indicate the normal printing completion, similar to the page number.

For the first print end notice request after the completion of the data transfer by the client PC 104, it is assumed that only the page number is returned and the job ID is not renewed. In this case, the virtual server renews only the page number in the print end information table. Similarly, in response to the second print end notice request, only the page number is renewed.

Between the second and third print end notice requests, it is assumed that printing both the jobs of the client PC 102 and PC 103 are completed. The network printer 105 overwrites first the job identifier of the client PC 102 and then the job identifier of the client PC 103.

Thereafter, when the job identifier of the client PC 103 is returned in response to the third print end notice request, the virtual server 101 searches the job identifiers for which the data transfer was performed before that of the print end confirmed job identifier, among those job identifiers with the set data transfer end flag in the queue of the network printer 105. Of the job identifiers with the set data transfer end flag in the queue, the job (in this example, the job of the client PC 102) spooled before the job of the client PC 103 is judged as having completed printing. Therefore, a job deletion instruction is sent to each client PC in order to make each client PC delete the job information and the temporary file. In this case, although the data transfer end flag of the client PC 104 is being set in the queue, the job of the PC 104 was spooled before the job of the client PC 103. Therefore, the print completion is not judged for the job of the client PC 104, and the instruction to delete the job information and the temporary file is not sent.

The client PCs 102 and 103 received the job deletion instruction delete the job information and temporary files, and a deletion result is notified to the virtual server 101. Upon reception of the deletion result, the virtual server 101 recognizes the deletion of the jobs of the client PCs and deletes the corresponding job information from the queue of the virtual server 101.

It is assumed that the network printer 105 completes the printing of the job of the client PC 104 transferred at the third time and that the job identifier of the completed job is overwritten. In this case, until the print data to be next transferred is printed completely, the network printer 105 does not renew any job identifier.

In response to the next print end notice request, if the network printer 105 returns the job identifier of the client PC 104 as having completed printing, the virtual server 101 performs the operation similar to the preceding two jobs to send the deletion instruction to the client PC 104. The client PC 104 performs the operation similar to the case of the preceding two jobs to delete the job and notify the deletion result to the virtual server 101. Upon reception of the deletion result notice, the virtual server 101 deletes the job information from the queue and resumes the steady state, similar to the case of the preceding jobs.

In the above description, after the print data of each job is sequentially transferred, the network printer 105 returns an end notice of page or job to the virtual server 101, and the virtual server 101 performs necessary processes. The page end or job end is not necessarily acquired after the data transfer, but the page end or job deletion instruction may be performed at any timing when the virtual server 101 acquires it.

In the example of the above operation sequence, each client PC spools each job relative to the same printer. Even if one client PC sequentially spools a plurality of jobs in an optional order, the confirmation of the print operation can be achieved in the above manner.

The network printer stores therein a job identifier with finished printing. Instead, the network board may store a job ID number sent from a client PC together with print data, as MIB information. The job ID number may be a number predetermined by the virtual server service, a job name, or a simple numerical value. The virtual server acquires such an identifier by using SNMP.

Next, the above sequence operations by the client machine, virtual server and network printer will be described with reference to the flow charts.

The operation by the client PC when the print start instruction is received from the virtual server as illustrated in FIG. 48, will be described with reference to the flow chart of FIG. 49.

At Step S4901, the client PC waits for an instruction. Upon reception of an instruction from the virtual server 101 under the conditions that the client PC waits for the instruction at Step S4901, the flow advances to Step S4902. At Step S4902, the client PC checks whether the instruction received from the virtual server 101 is the print start instruction. If the instruction from the virtual server 101 is the print start instruction, the flow advances to Step S4903.

At Step S4903, in accordance with the job ID contained in the print start instruction of the virtual server 101, the job information of the job received the print start instruction is searched from all sets of the job information managed by the client service, and a flag is set indicating the data transfer. This flag may be an independent bit provided in the job information, which bit is set during the data transfer and reset after the data transfer, or this flag may be a shared flag in the job information in which the flag is used so that the job status is set to "during data transfer" during the data transfer and is changed to "already transferred" after the data transfer to leave the job. In the following, such a flag is collectively called a data transfer flag.

After the data transfer flag is set, at Step S4904 the temporary file of the job recorded in the job information searched by the job ID is transmitted over the network to the port designated by the printer name and with the spooled job (e.g., designated by an identifier capable of discriminating the network printer, such as an IP address), to thereby transfer the print data. This print data contains the print data written by a page descriptive language as well as a job identifier written by JL (job language).

After the data transfer, the flow advances to Step S4905 whereat a data transfer end flag indicating the completion of the data transfer of the job is set, or the job status is changed to a status representative of the data transfer completion.

Next, at Step S4906, the client PC notifies the virtual server 101 of the effect that the print data of the job received the print start instruction was transferred. The virtual server 101 renews the job information on the virtual server 101 and the data transfer end flag or changes the job status to the status representative of the data transfer completion. After the data transfer end notice, the standby state at Step S4901 resumes while the job information and job temporary file are retained.

The data transfer operation by the client PC has been described above.

Next, the operation of the virtual server 101 when it receives the data transfer end notice will be described with reference to the flow chart shown in FIG. 50.

At Step S5001, the virtual server waits for an instruction received by the virtual server service. If the virtual server service receives any instruction, the flow advances to Step S5002.

At Step S5002, it is checked whether the instruction received by the virtual server service is the data transfer end notice from the client PC. If it is the data transfer end notice, the flow advances to Step S5003.

At Step S5003, the virtual server sets the transfer end flag to the job information of the job with the confirmed print data transfer, or changes the job status to a status representing the data transfer completion.

At Step S5004, it is checked whether there is the next job in the queuing table of the next job spooled to the same printer which the virtual server confirmed the job transfer end.

If the next job is spooled, at Step S5005 the print start instruction is sent to the next client PC, by referring to the address and job ID of the next client acquired from the job information of the job spooled in the virtual server 101.

If there is no job next spooled to the virtual server 101 at Step S5004, after the process at Step S5005, the flow returns to Step S5001 to wait for the next instruction.

Next, with reference to FIG. 50, the operation of the virtual server when it confirms a page or job end by an end notice from the printer, will be described. This process starts when the virtual server receives an end notice from the printer in response to the print end notice request transmitted from the virtual server. When the end process is received by the virtual server, the current print status of the printer can be known.

At Step S5001, the virtual server 101 performs polling at a constant interval, and when it receives the print end notice returned from the network printer 105, the flow changes from the standby state at Step S5001 to Step S5002.

At Step S5002, it is checked whether the instruction received by the virtual server is the data transfer end notice. Since the instruction received by the virtual server is the print end notice, the process advances to Step S5006. The judgements at Steps S5002, S5006 and S5014 upon reception of an instruction by the virtual server, may be performed in any method so long the virtual server service can discriminate each event, such as a process difference by a difference of a communications protocol, and a command or flag in the communications data.

At Step S5006, it is checked if the instruction is the print end notice from the network printer 105. If it is the print end notice, at Step S5007 the end information of each network printer is renewed. In updating the end information, two types of information including the page number and the completed job identifier are overwritten in the current end information table. This table is managed by the virtual server service and may have any format if it can record the page number and completed job identifier.

Next, at Step S5008 it is checked whether there is the job still not deleted in the queuing table.

If there is no job still not deleted and having a set data transfer end flag at Step S5009, the flow advances to Step S5016 for the judgement of a page end. If there is a job already transmitted data to the network printer and still not deleted, the process at Step S5010 is performed.

At Step S5010, it is checked whether the renewed end information is not an initializing code and whether it has a valid value as the job identifier. If the renewed end information is the job identifier, the flow advances to Step S5011.

At Step S5011, in accordance with the completed job identifier, a job with a set data transfer end flag is searched from the queue. If the searched job has the job identifier of the completed job or has the job identifier of a job spooled before the searched job, then the flow advances to Step S5012. If there is no corresponding job, the flow advances to Step S5016 for the page end judgement. At Step S5012, the job information deletion flag is set.

Next, at Step S5013 the job deletion notice is sent. The flow returns from Step S5013 to Step S5008 to repeat the above processes until the job information deletion flag is set to the job identifier of the completed job and to all the job identifiers of jobs spooled before the searched job. After the job information deletion flag is set to all the job identifiers spooled before the print completed job identifier, among the queuing tables with the set data transfer flag in the queue, the flow advances from Step S5011 to Step S5016. If all the jobs with the set data transfer flag are spooled before the searched job, the job information deletion flag is set at Step S5012 and when there is no job still not deleted, the flow advances to Step S5016.

If the renewed end information is not an initializing code and has a numerical value proper for the end page, then the flow advances to Step S5017 whereat the end page number is notified to each client PC, and thereafter the flow returns to Step S5017 in the standby state. If the renewed end information has an improper numerical value as the end page number, the flow returns to the standby state at Step S5017, without performing any operation.

Next, with reference to FIG. 49, the operation of the client PC when it receives the job information deletion instruction from the virtual server, will be described.

When the client PC under the standby state at S4901 receives the job deletion notice from the virtual server, since the instruction is the deletion instruction, the flow advances to Step S4902 to Step S4907. At Step S4908, it is checked whether the corresponding job is a job already transferred print data. If there is no job with a set data transfer end flag in the client PC, it means an error and the job deletion notice is neglected to return to Step S4901. If there is a job with the set data transfer end flag instructed to be deleted from the virtual server, the flow advances to Step S4909.

At Step S4909, the client service acquires the pass name of the temporary film from the job information and deletes the print data file.

Next, at Step S4910, the job information of the job received the deletion instruction and managed by the client PC is deleted. After the print data and job information of the job received the deletion instruction are deleted, at Step S4911 the deletion result notice is notified to the virtual server to thereafter return to the standby state at Step S4901.

Next, the operation of the virtual server received the deletion result notice will be described with reference to FIG. 50.

At Step S5001, when the virtual server in the standby state at Step S5001 receives the deletion result notice from the client PC, the flow advances to Steps S5002, S5006 and S5014. If the instruction is not the deletion result notice or if the job information deletion flag is not set to the job information of the job the client PC confirmed the deletion, this instruction is discarded. If the job information deletion flag is set to the job information of the job indicated by the deletion result notice, at Step S5015 the job information is deleted to thereafter return to the standby state at Step S5015.

Next, the operation of recording the job identifier of a job completed by the network printer and the page number of a print completed page will be described with reference to FIG. 51.

Figure 51:
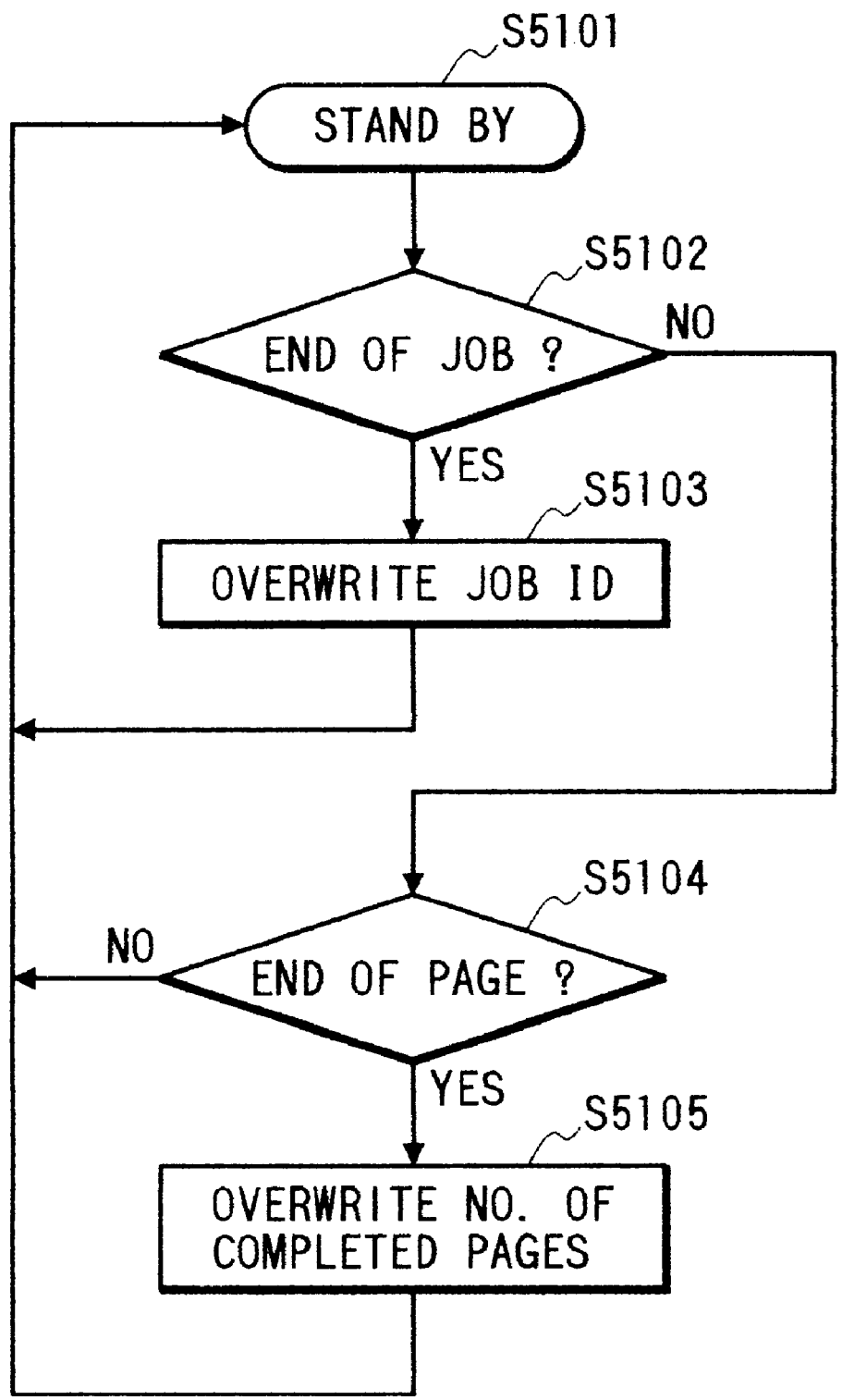
FIG. 51 is a flow chart illustrating the process of the network printer when an identifier of a print completed job and the number of printer pages are recorded.

Step S5101 shown in FIG. 51 indicates a standby state in which the network board or communication unit of the network printer waits for information of a non-request status such as JL. When a job print is completed, a non-request status is supplied from the network printer.

At Step S5102, CPU 501 of the printer judges a job print end.

At Step S5103, the job identifier is acquired from the non-request status of JL, and overwritten in the end job identifier field of a notice returned from the communication unit to the virtual server, to thereafter return to Step S5101. In this embodiment, although the communication unit is the network board, the communication unit may be an interface via which the job identifier is stored in the storage unit 603 of the printer.

If the instruction received at Step S5102 is not the job end notice, the flow advances from Step S5102 to Step S5104. At Step S5104, it is checked whether the received notice is a page end notice. If it is the page end notice, the flow advances to Step S5105. Similar to Step S5103, at Step S5105 the end page number is overwritten to thereafter return to Step S5101. If the received notice is any one of other non-request statuses, all these non-request statuses are neglected.

As described above, the network system comprises: a printer including storage means (RAM 602, storage unit 603, or storage means in the network board 606) for storing identification information of print completed print data and notifying means (network board 606) for notifying the server of the identification means stored in the storage means; an information processing apparatus including transmitting means (interface 209 of the client) for transmitting the job information of print data to the server and spooling means (virtual print spooler in HD 205) for spooling print data; and a server including sequential order control means (CPU 200 of the server) for controlling the print sequential order in accordance with the job information transmitted from the transmitting means and transferring means (interface 209 of the server) for transferring transmission enabled information indicating that print data can be transmitted to the printer, wherein the server deletes the job information of a job with the completed print operation notified by the notifying means.

The server further includes deletion instruction means (virtual print server service (server) 712) for instructing the information processing apparatus to delete print data possessed by the apparatus, wherein when the notifying means notifies a job with the completed print operation, the deletion instruction means instructs the information processing apparatus to delete print data.

After the information processing apparatus (client computer) deletes the print data, the server deletes the corresponding job information.

With the above processes, it is possible to confirm that the print data of a job in the network printer has been printed completely and to perform after this confirmation the function of deleting the job information and print data by the client PC. At the same time, it is possible for a user to know from an absence of the job information in the virtual server that the print data has been printed completely.

(Seventh Embodiment)

Figure 52:
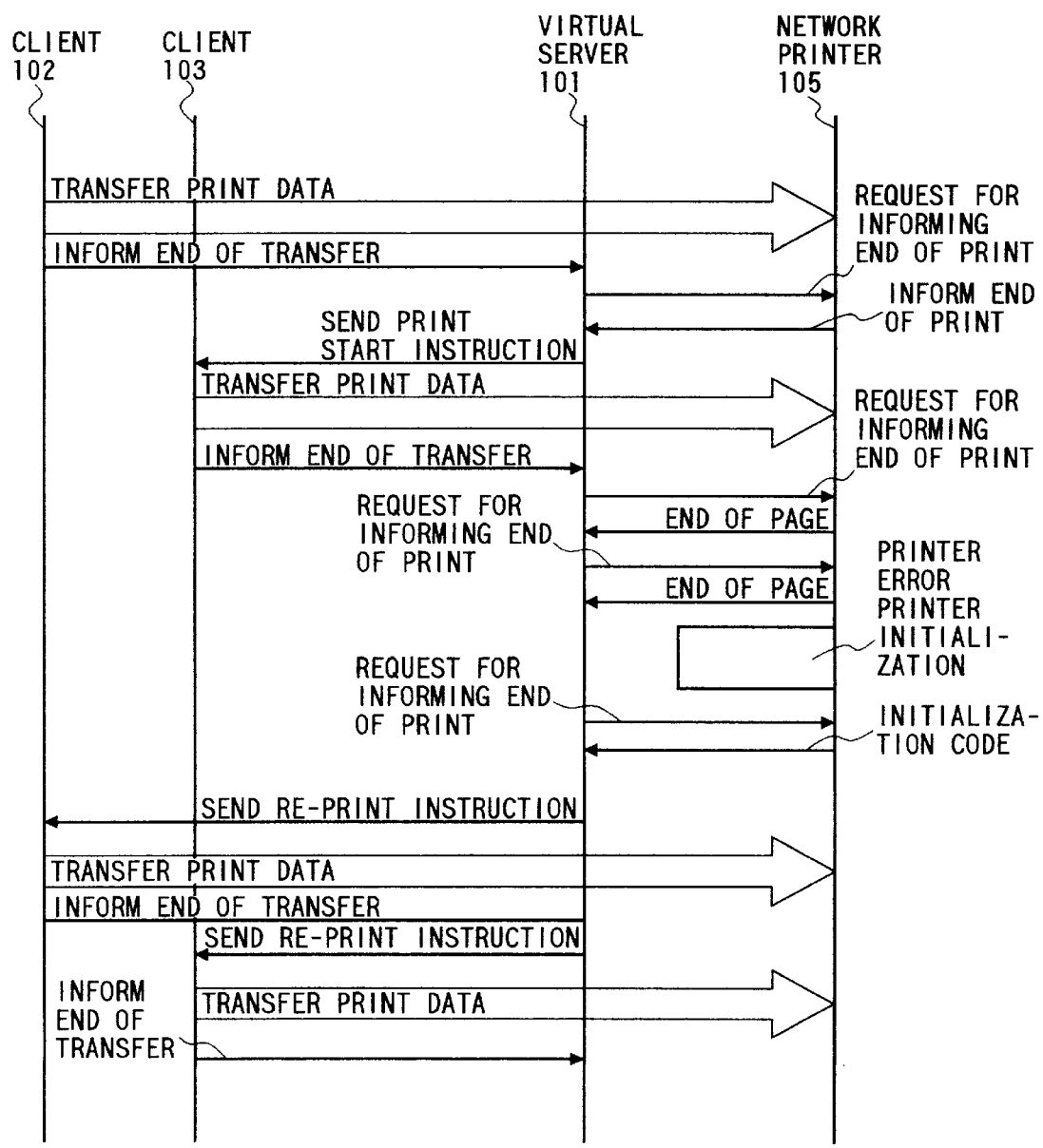
FIG. 52 is a flow chart illustrating the reprint process according to a seventh embodiment of the invention.

The sequence of reprinting according to the embodiment will be described. FIG. 52 is a sequence diagram illustrating the operation of reprinting according to the seventh embodiment of the invention. In the sequence diagram shown in FIG. 52, the client PC 102 and PC 103 spool two jobs to the virtual server 101 in the system shown in FIG. 1 by using the normal registration method, and the client PC 102 transfers print data to the network printer 105.

When the client PC 102 returns a transfer end notice of the print data to the virtual server 101, the virtual server 101 sends the print start instruction to the client PC 103 spooled to the virtual server 101, and the client PC 103 transfers the print data to the network printer 105. After the print data is transferred, the client PC 103 returns the transfer end notice to the virtual server 101. During the above operations, the virtual server 101 transmits at a constant interval the end notice request to the network printer 105 to thereby obtain the job identifier of a job with the print end notice, similar to the embodiment of the print operation confirmation.

Even if an error occurs at the network printer 105 without the confirmation of print ends of the jobs of the client PCs 102 and 103 by the print end notice, if the error is of the type it can be recovered, the print data is not lost. However, depending upon the type of errors, the printer is required to be initialized. After the network printer 105 is initialized and the error is recovered, initializing codes used only for the initializing process are written in the reception buffer of the network printer 105 in place of the job identifier of a print completed job and the end page number. After the initialization, both the job identifier and end page number are not overwritten until the first job is normally printed and ejected. The intializing codes may be any codes if they can indicate the initialization of the network printer 105. For example, if the job identifier and end page number are constituted of only numerical values, they may be filled with asterisk "*" marks.

If the virtual server 101 having two jobs with the set data transfer end flag receives the initializing codes as the print end notice from the network computer 105, the virtual server 101 sends a job reprint instruction to the client PCs 102 and 103 which in turn transfer the print data again to the network printer 105. In the above manner, reprinting is performed.

Next, with reference to the flow chart shown in FIG. 53, the operation of reprinting on the side of the virtual server will be described.

Figure 53:
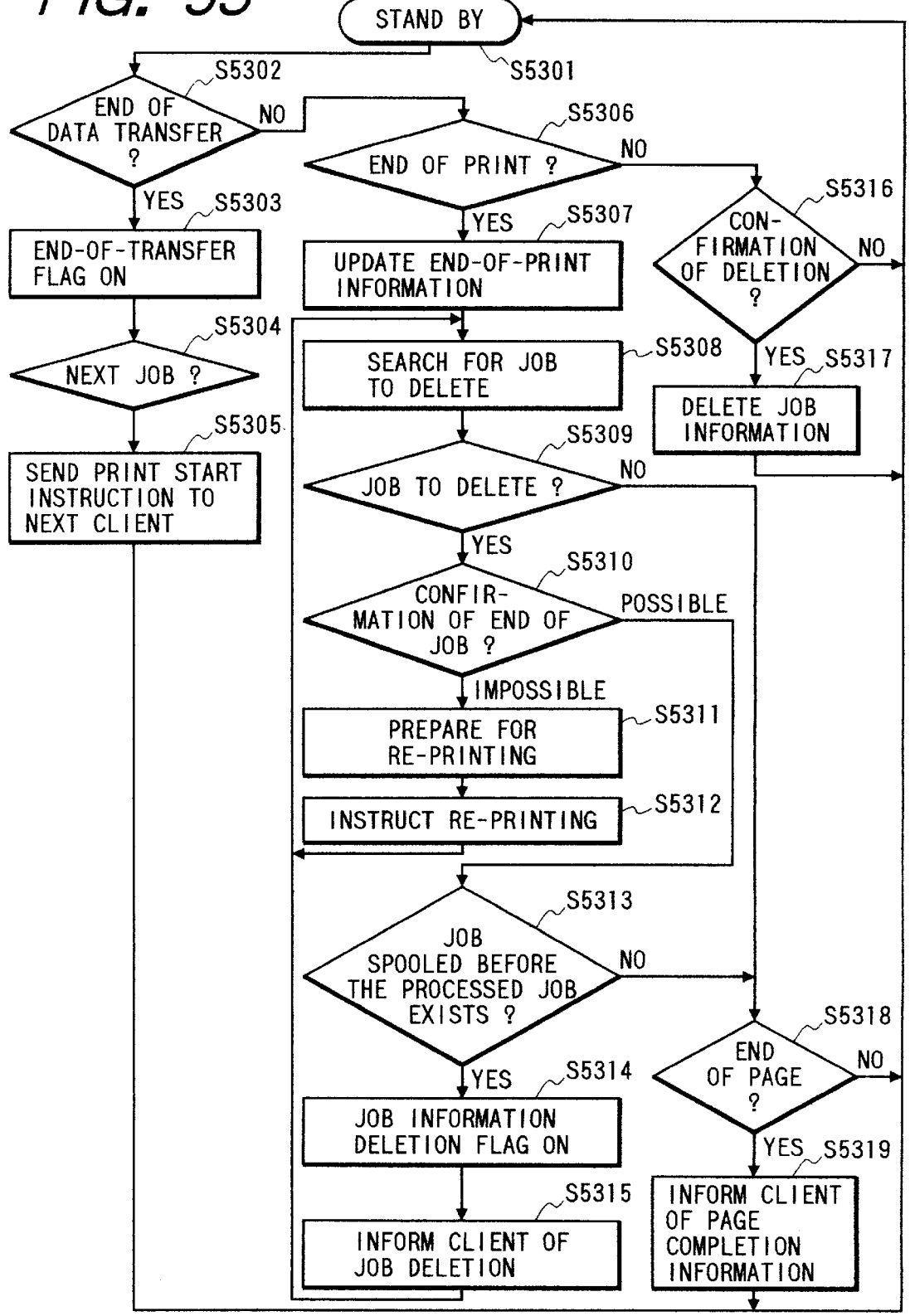
FIG. 53 is a flow chart illustrating the reprint process of the virtual server according to the seventh embodiment of the invention.

FIG. 53 is a flow chart illustrating the operation of the virtual server for the reprinting process of the seventh embodiment, added to the flow chart of FIG. 50 illustrating the operation of the virtual server for the print operation confirmation.

When the initializing codes as the print end notice are received in the standby state at Step S5301, the flow advances to Steps S5302 and S5306, and at Step S5307 the initializing codes themselves are used as the print end notice.

At Step S5308, a job with the set data transfer end flag and still not deleted is searched from the printer queue.

At Step S5309, it is checked whether there is a job already transferred and still not deleted, among spooled jobs. If not, the print end notice is a normal initialization and is not the end page number, so that the flow returns via Step S5318 to Step S5301.

If at Step S5309 there is a job with the set data transfer end flag and still not deleted, at Step S5310 it is checked whether the job end can be confirmed. If not, the flow advances to Step S5311 whereat the data transfer end flag of the job already transferred is reset or the status is changed to a reprint status to allow the print queue to issue a print start instruction.

At Step S5312, a reprint instruction is issued to the client PC. After the reprint instruction is issued, the flow returns to Step S5308 to repeat the above processes if there is a job still not deleted. If there is no job still not deleted, the flow advances from Step S5309 to Step S5318 and resumes the standby state at Step S5301.

The operation of reprinting by the client PC will be described with reference to the flow chart of FIG. 54. The flow chart of FIG. 54 illustrates the operation of reprinting by the client PC according to the seventh embodiment of the invention.

Figure 54:
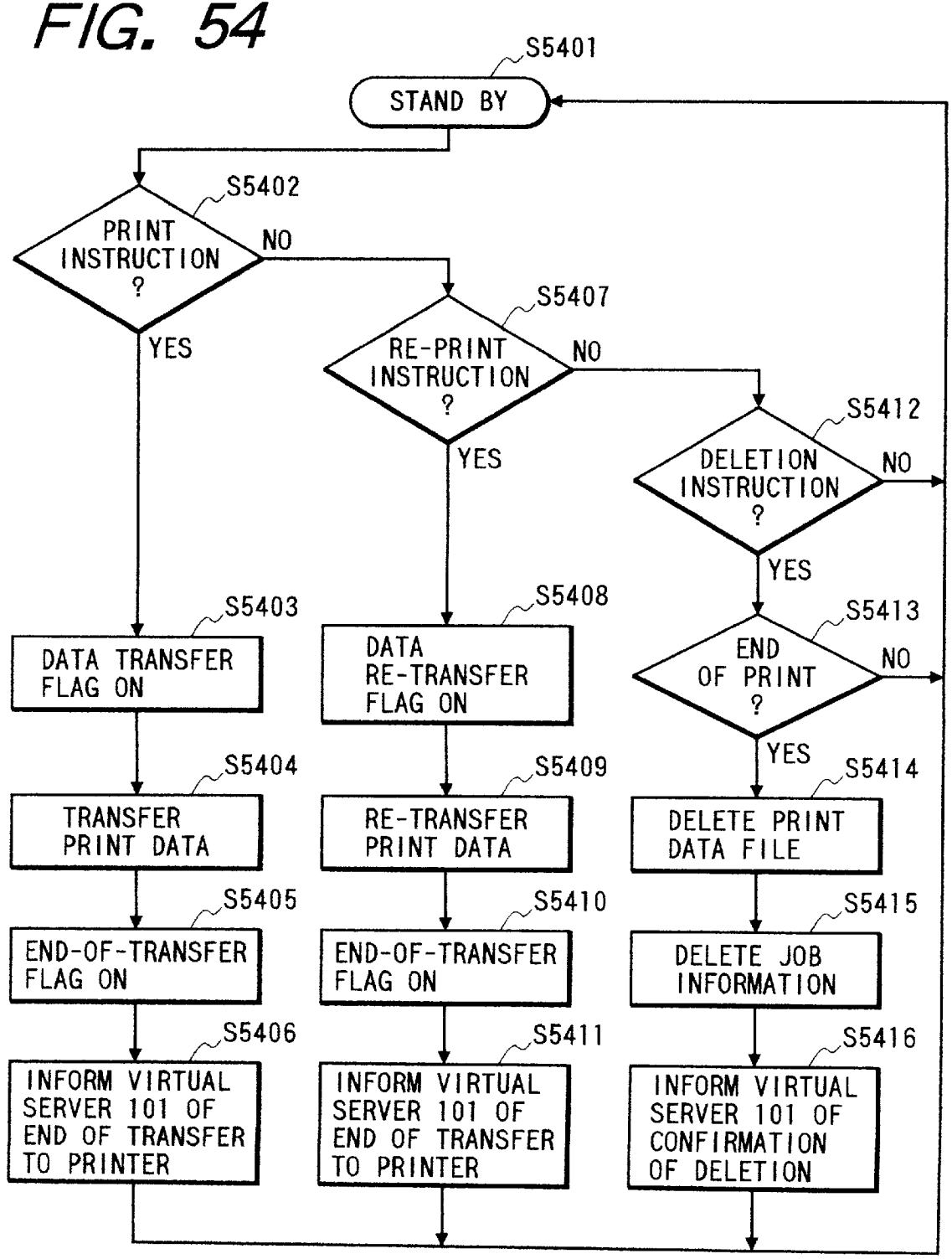
FIG. 54 is a flow chart illustrating the reprint process of the client according to the seventh embodiment of the invention.

The flow chart of FIG. 54 is a flow chart illustrating the operation of reprinting by the client PC according to the seventh embodiment of the invention, added to the flow chart of FIG. 49 illustrating the operation of the client PC for the print operation confirmation.

After the client service receives the reprinting instruction at Step S5401, the flow advances to Step S5402 and Step S5407. Since the print end notice is the reprinting, a data retransfer flag is set to the job information.

At Step S5409, the client PC transfers again the print data to the network printer. After the print data is transferred, a data transfer end flag is again set at Step S5410.

At Step S5411, a data transfer end notice is sent to the virtual server to thereafter return to the standby state at Step S5401.

The client operates in the above manner.

Figure 55:
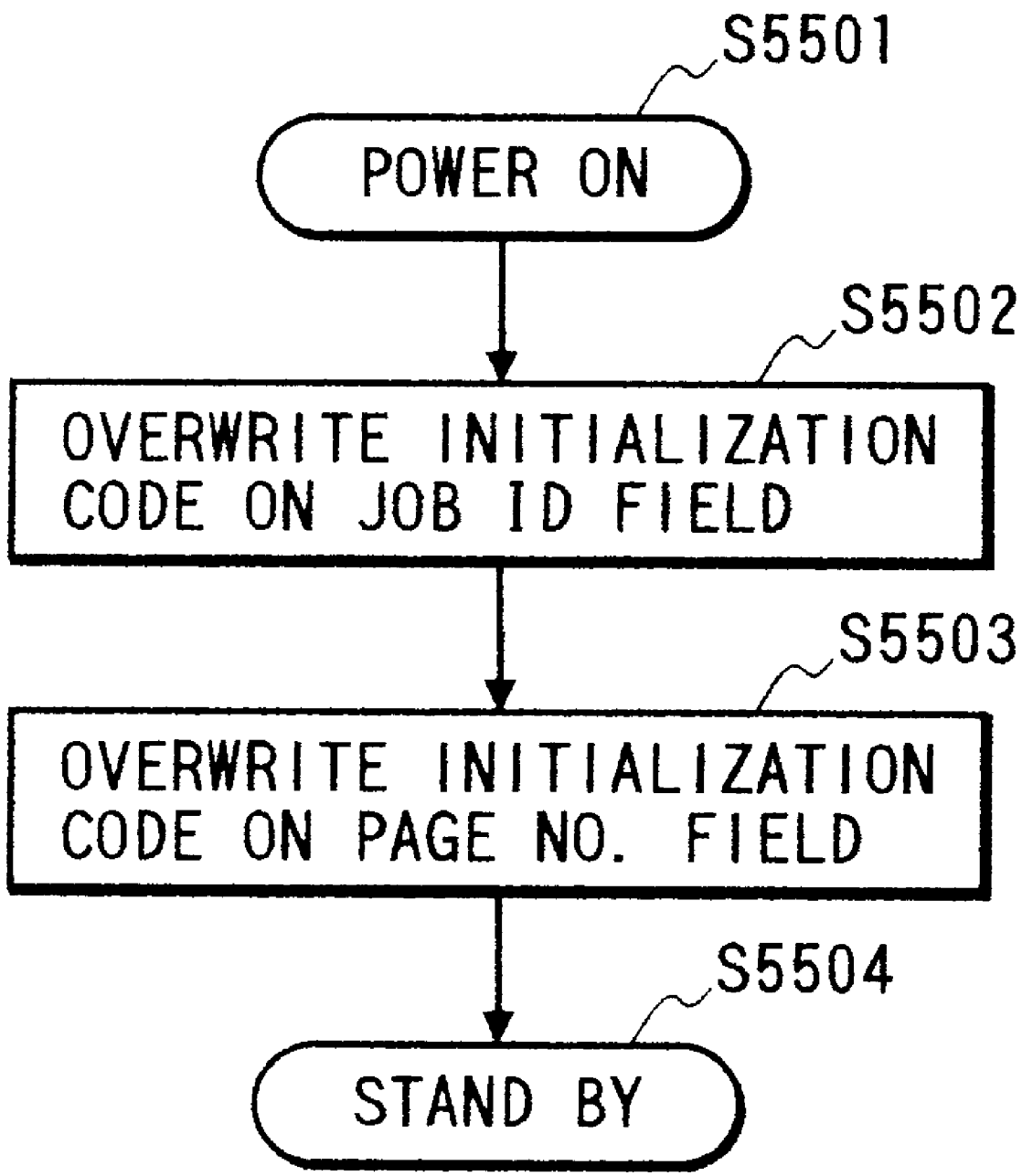
FIG. 55 is a flow chart illustrating a process of overwriting an initializing code when the network printer is initialized.

The operation of overwriting the initializing codes when the network printer is to be initialized, will be described with reference to FIG. 55.

After the network printer is initialized at Step S5501, the initializing codes such as asterisks are written in the storage medium (RAM or the like) of the network printer or in the job identifier field of the storage medium of the network board, at Step S5502. At Step S5503, the initializing codes are written in the end page field. The flow thereafter enters the standby state at Step S5504 whereat the print end notice request from the virtual server can be received.

With the above processes and the print operation confirmation processes, the lost job can be reprint.

(Eighth Embodiment)

In the eighth embodiment of the invention, the operation of stopping data transfer by the client service upon reception of a suspension instruction from a user and thereafter resuming its operation will be described with reference to the flow chart of FIG. 56.

Figure 56:
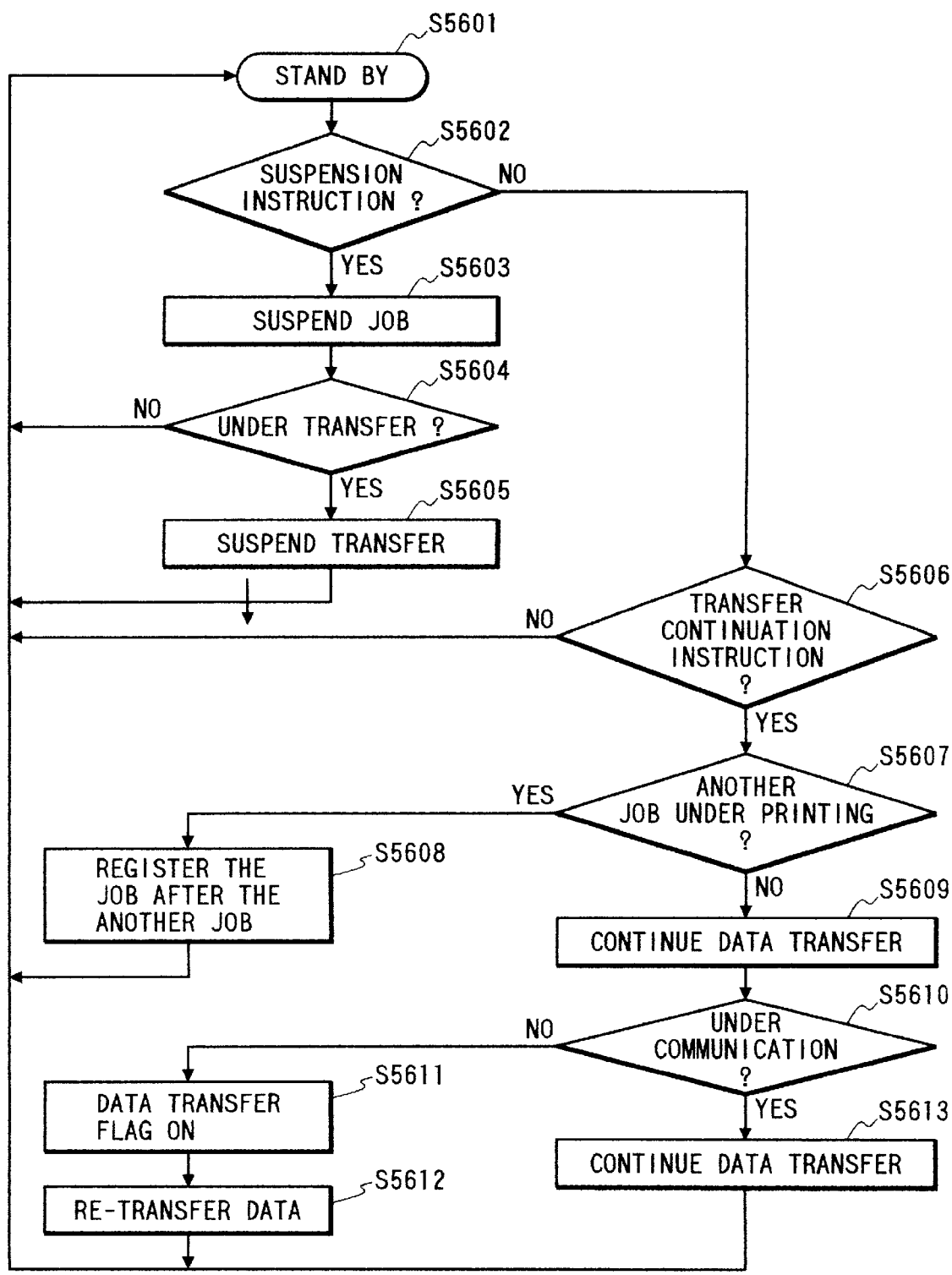
FIG. 56 is a flow chart illustrating a reprint instruction process for a job temporarily suspended during data transfer according to an eighth embodiment of the invention.

The flow chart of FIG. 56 illustrates the operation of the client service which suspends data transfer upon reception of the suspension instruction from a user and thereafter resumes its operation.

In order to send the suspension instruction of a user to the client service, the server service may send the instruction similar to the print start instruction, or the instruction may be directly sent to the client service if the instruction is sent from the client PC which is now transferring print data. In the latter case, it is assumed that even if the instruction is directly sent to the client service, the job and printer status are processed synchronously with the server service so that the job information and other management information have no contradiction.

At Step S5601 shown in FIG. 56, the client service waits for an instruction form a server or a user. For example, in the case of Windows, even if the client service is executing another process, the instruction can be received by using another thread.

If the client service receives some instruction, it is checked at Step S5602 whether the instruction is the suspension instruction to a job which can be suspended. At Step S5603, the job status is suspended, the job information is renewed in accordance with the status change, and if necessary, the server service information is renewed.

At Step S5604, the data transfer flag is checked, and if the job whose print data is still not transferred, the flow returns to the standby state at Step S5601 to suspend the job.

If during the data transfer, the flow advances to Step S5605 to suspend the print data transfer and thereafter return to the standby state at Step S5601.

When a data transfer continuation instruction reaches the client service, the flow advances to Step S5602 and Step S5606 whereat it is checked whether the print data transfer continuation instruction is directed to the suspended job. If the instruction is not directed to the suspended job managed by the client service, the flow returns to the standby state at Step S5601. If the instruction is directed to the suspended job managed by the client service, the flow advances to Step S5607 to check whether another job is being printed.

If another job is being printed by the same printer, the flow advances to Step S5608 whereat the job is registered again at the top of jobs which are waiting for the print operation, and thereafter the flow returns to the standby state at Step S5601.

If there is no job under printing and the data transfer can be resumed at Step S5607, the job information is renewed, for example, by changing the job status to a printing status, and if necessary, the job information of the server is also renewed.

At Step S5610, it is judged from the print data transfer flag whether the suspended job continues print data transfer. If the job is suspended before the print data transfer, or if the job is suspended during the print data transfer by errors or time-out at a communication partner, then the flow advances to Step S5611 whereat the print data transfer flag is set, and at Step S5612 the print data from the start thereof is transferred in the manner like the ordinary print operation.

If another job is printing at the same printer after the suspension, then the print operation of the suspended job is performed after the completion of the print operation of the other job. The data transfer flag is reset if the data transfer is suspended by errors or time-out. If the print data transfer still continues at Step S5610, the flow advances to Step S5613 to continue the print data transfer in the manner like the ordinary print operation.

With the above processes, the job suspended during the print data transfer can later continue its operation to perform the print or reprint operation in the manner like the ordinary print operation.

As described so far, according to the present invention, the printer information is entered in a printable indication command received by the client from the server and entered when setting the client port and printer during the client setting process. Therefore, an operator is not necessary to enter the printer information (IP address and the like), but the printer information can be acquired automatically from the printer name and the like and the client setting can be changed automatically only by changing the server setting. It is therefore possible to manage the system easily.

Since the virtual server is given a virtual printer name, a user is not necessary to set another print specification for each printer each time a print operation is performed. For example, if an operator (manager) of a virtual server registers a name "VPS-PRINTER1" for an A4 horizontal cassette and a name "VPS-PRINTER2" for an A4 vertical cassette, even a novice user can set the print specification set by the manager by selecting the virtual printer name. Since the virtual printer can be assigned a virtual printer name, it is not necessary for a user to set a different print specification of one printer each time the user performs a print operation. For example, if an operator (manager) of a virtual server registers a name "VPS-PRINTER1" for an A4 horizontal cassette and a name "VPS-PRINTER2" for an A4 vertical cassette, even a novice user can set the print specification set by the manager by selecting the virtual printer name.

When a job inquiry is issued from the client to the server, the server inquiries a list of jobs presently in the printer, and in accordance with the received job list and the list of jobs presently in the server, the server generates a list of jobs presently in the whole system and notifies the client of the new list. As compared to conventional techniques, more correct information can be referred. Even if a job disappears because of some errors in the network printer, the client can confirm this disappeared job.

The virtual server receives from the client the information necessary only for the sequential order control of print data, and adds the printer information to the printable indication command to be received by the client. The server sends print data to the printer. With this system, the load on the server can be reduced. Accordingly, if the client requests the server to send the job list, the server requests also the job list of the printer so that a job list of the whole system can be formed. Furthermore, even an apparatus without a function of recognizing a job and a job deletion function which apparatus is shared by a plurality of communications terminal on the network, does not occupy excessive resources otherwise necessary for the sequential order control mechanism. By changing only the server setting, it becomes unnecessary to change the setting of all clients so that the system can be managed easily.

Even if the virtual server has some error or is shut down, the client can perform a print operation. Furthermore, even if the printable indication is not returned for a predetermined time from the virtual server, the client can perform a print operation.

Even if a printer becomes abnormal after the virtual server judges that the printer is normal and it sends a print instruction to a client, the client can issues again the job so that the server can recognize the printer status and the job can be controlled easily.

It is possible to confirm that the print data of a job has been printed completely and to perform under this confirmation the function of deleting the job information and print data by the client computer. At the same time, it is possible for a user to know from an absence of the job information in the virtual server that the print data has been printed completely.

The disappeared job can be printed later.

The job suspended during the print data transfer can later continue its operation to perform the print or reprint operation in the manner like the ordinary print operation.

What is claimed is:

1. A print system comprising:
    a print control apparatus; and
    an information processing apparatus,
    wherein said information processing apparatus comprises:
        transmitter for transmitting job information that includes information designating a printer but includes no print data to said print control apparatus so as to allow said print control apparatus to control a print order of the printer, and a spool circuit adapted for spooling the print data corresponding to the job information transmitted from the transmitter in a memory even after the transmitter transmits the job information to said print control apparatus, wherein said print control apparatus comprises:

a sequential order controlling circuit adapted for controlling the print order at the printer in accordance with the job information that includes information designating the printer but includes no print data, the job information being transmitted from the transmitter, and an outputting circuit adapted for, when the sequential order controlling circuit judges that printing is due in the printer for print data of a job represented by the job information, outputting output enabled information to said information processing apparatus, the output enabled information indicating that the print data can be output to the printer, and wherein said information processing apparatus instructs the transmitter to transmit the job information of the print data, necessary for the sequential order controlling circuit of said print control apparatus, to said print control apparatus, said print control apparatus instructs the sequential order controlling circuit to control the print order in accordance with the job information transmitted from the transmitter, and, when said print control apparatus outputs the output enabled information to said information processing apparatus, said information processing apparatus transmits the print data stored in the memory to the printer.

2. A print system according to claim 1, wherein said print system is configured in a network having at least one information processing apparatus, at least one print control apparatus, and at least one printer.

3. A print system according to claim 1, wherein said print control apparatus further includes a judging circuit adapted for judging whether graphics data can be output to the printer, and the outputting circuit outputs the output enabled information to said information processing apparatus which transmits job information of the graphics data, if the judging circuit judges that the graphics data can be output to the printer.

4. A print system according to claim 1, wherein said information processing means includes an inquiry circuit adapted for inquiring of a job list to said print control apparatus, and if the inquiry circuit inquires of the job list to said print control apparatus, said print control apparatus inquires of a list of jobs presently in the printer, forms job list information of a list of all jobs in said print system in accordance with a job list received from the printer and a list of jobs presently in said print control apparatus, and notifies said information processing apparatus of the job list information.

5. A print system according to claim 1, wherein, if said print control apparatus does not output the output enabled information to said information processing apparatus, said information processing apparatus transmits the print data directly to the printer.

6. A print system according to claim 1, wherein, in registering the job information of the print data in said print control apparatus by said information processing apparatus, if said print control apparatus is in an error state, said information processing apparatus transmits the print data directly to the printer.

7. A print system according to claim 1, wherein, if the output enabled information is not transmitted from said print control apparatus to said information processing apparatus for a preset time after said information processing apparatus registers the job information of the print data in said print control apparatus, said information processing apparatus transmits the print data directly to the printer.

8. A print system according to claim 1, wherein, if said information processing apparatus receives the output enabled information from said print control apparatus and transmits the print data to the printer and the printer does not receive the print data, the job information of the print data in said print control apparatus is re-registered in said print control apparatus.

9. A print system according to claim 1, wherein said information processing apparatus holds the print data in the memory until the printer completes a print operation.

10. A print system according to claim 1, wherein the printer includes a storage device for storing discrimination information of the print data with a completed print operation and a notifying circuit adapted for notifying said print control apparatus of the discrimination information stored in the storage device, wherein said print control apparatus deletes the job information of the print data when notified by the notifying circuit that a print operation is completed.

11. A print system according to claim 10, wherein said print control apparatus further includes a deletion instructing circuit adapted for instructing said information processing apparatus to delete the print data held by said information processing apparatus, and said print control apparatus causes the deletion instructing circuit to instruct said information processing apparatus to delete the print data if said print control apparatus is notified of a job with a completed print operation by the notifying circuit.

12. A print system according to claim 10, wherein the discrimination information of the print data stored in the storage device includes a page number of a printed page and an identifier of a job with the completed print operation.

13. A print system according to claim 10, wherein said print control apparatus issues a reprint instruction to said information processing apparatus, if the print data is transferred from said information processing apparatus to the printer before the job notified by the notifying circuit as a job with a completed print operation.

14. A print system according to claim 10, wherein said print control apparatus notifies a server of the discrimination information of the notifying circuit when said print control apparatus sends a job end notice request to the printer.

15. A print system according to claim 10, wherein, when said information processing apparatus receives a suspension instruction while said information processing apparatus transfers the print data to the printer, said information processing apparatus suspends transfer of the print data, and resumes the transfer of a remaining print data after a data transfer continuity instruction is received.

16. An information processing apparatus comprising:

a transmitter for transmitting job information that includes information designating a printer but includes no print data to a print control apparatus so as to allow the print control apparatus to control a print order of the printer; and spool means for spooling print data in storage means even after said transmitting means transmits the job information to the print control apparatus, wherein when the print control apparatus indicates that print data can be output to the printer, the print data spooled in the storage means is transmitted to the printer but not through the print control apparatus.

17. An information processing apparatus according to claim 16, wherein said information processing apparatus is connected to a network including a plurality of information processing apparatuses, print control apparatuses, and printers.

18. An information processing apparatus according to claim 16, further comprising inquiry means for inquiring of a job list to the print control apparatus.

19. An information processing apparatus according to claim 16, wherein said information processing apparatus transmits the print data directly to the printer if the print control apparatus notifies said information processing apparatus that the print data can be output to the printer.

20. An information processing apparatus according to claim 16, wherein in registering the job information of the print data in the print control apparatus by said information processing apparatus, if the print control apparatus is in an error state, said information processing apparatus transmits the print data directly to the printer.

21. An information processing apparatus according to claim 16, wherein, if output enabled information is not transmitted from the print control apparatus to said information processing apparatus for a preset time after said information processing apparatus registers the job information of the print data in the print control apparatus, said information processing apparatus transmits the print data directly to the printer.

22. An information processing apparatus according to claim 16, wherein if said information processing apparatus receives output enabled information from the print control apparatus and transmits the print data to the printer and the printer does not receive the print data, the job information of the print data in the print control apparatus is re-registered in the print control apparatus.

23. An information processing apparatus according to claim 16, wherein said information processing apparatus holds the print data in the storage means until the printer completes a print operation.

24. An information processing apparatus according to claim 16, wherein when said information processing apparatus receives a suspension instruction while said information processing apparatus transfers the print data to the printer, said information processing apparatus suspends transfer of the print data, and resumes the transfer of a remaining print data after a data transfer continuity instruction is received.

25. An information processing apparatus comprising:
sequential order control means for controlling a print order at a printer in accordance with job information that includes information designating the printer but includes no print data, the job information being transmitted from an external apparatus; and
outputting means for, when said sequential order means judges that printing is due in the printer for print data of a job represented by the job information, outputting output enabled information to the external apparatus, the output enabled information indicating that the print data can be output to the printer,
wherein the external apparatus outputs the print data to the printer but not through said information processing apparatus.

26. An information processing apparatus according to claim 25, wherein said information processing apparatus is connected to a network including a plurality of information processing apparatuses and printers.

27. An information processing apparatus according to claim 25, wherein said outputting means judges whether the print data can be output from the external apparatus to the printer, and if it is judged that the print data can be output, the output enabled information is output to the external apparatus with the print data.

28. An information processing apparatus according to claim 25, wherein when a job list is inquired of by the external apparatus, said information processing apparatus inquires of a list of jobs presently in the printer, forms job list information of a list of all jobs in a system in accordance with a job list received from the printer and a list of jobs presently in said information processing apparatus, and notifies the external apparatus of the job list information.

29. An information processing apparatus according to claim 25, wherein when discrimination information of print data with a completed print operation is notified by the printer, the job information of the print data is deleted.

30. An information processing apparatus according to claim 25, further comprising deletion instructing means for instructing the external apparatus to delete the print data of the external apparatus, wherein when a job with a completed print operation is notified by the printer, said deletion instructing means instructs the external apparatus to delete the print data.

31. An information processing apparatus according to claim 29, wherein, if there is print data transferred from the external apparatus to the printer before the job notified by the printer as a job with the completed print operation, a reprint instruction is issued to the external apparatus.

32. An information processing apparatus according to claim 29, further comprising requesting means for requesting a job end notice to the printer, wherein discrimination information of the job end notice is received from the printer after said requesting means requests the job end notice.

33. A method of controlling a print system comprising an information processing apparatus and a print control apparatus, said method comprising the steps of:
transmitting job information that includes information designating a printer but includes no print data from the information processing apparatus to the print control apparatus so as to allow the print control apparatus to control a print order of the printer;
spooling the print data corresponding to the job information transmitted in said transmitting step in storage means even after said transmitting step transmits the job information to the print control apparatus;
controlling the print order at the printer in accordance with the job information that includes information designating the printer but includes no print data, the job information being transmitted in said transmitting step;
outputting output enabled information from the print control apparatus to the information processing apparatus when said controlling step judges that printing is due in the printer for print data of a lob represented by the job information, the output enabled information indicating that the print data can be output to a printer;
instructing said transmitting step to transmit the job information of the print data, necessary for said controlling step, to the print control apparatus;
instructing said controlling step to control the print order in accordance with the transmitted job information; and
upon output of the output enabled information from the print control apparatus to the information processing apparatus, transmitting the stored print data from the information processing apparatus to the printer.

34. A method of controlling an information processing apparatus comprising the steps of:

transmitting job information that includes information designating a printer but includes no print data to a print control apparatus so as to allow the print control apparatus to control a print order of the printer;

spooling print data in storage means even after said transmitting step transmits the job information to the print control apparatus; and when the print control apparatus indicates that the print data can be output to a printer, transmitting the spooled print data to the printer but not through the print control apparatus.

35. A method of controlling an information processing apparatus comprising the steps of:

controlling a print order at a printer in accordance with job information that includes information designating the printer but includes no print data, the job information being transmitted from an external apparatus;

when said controlling step judges that printing is due in the printer for print data of a job represented by the job information, outputting output enabled information to the external apparatus, the output enabled information indicating that the print data can be output to the printer, wherein the external apparatus outputs the print data to the printer but not through the information processing apparatus.

36. A method according to claim 33, wherein said print system is configured in a network having at least one information processing apparatus, at least one print control apparatus, and at least one printer.

37. A method according to claim 33, further comprising the step of judging whether graphics data can be output to the printer, wherein said outputting step outputs the output enabled information to the information processing apparatus which transmits job information of the graphics data, if the judging step judges that the graphics data can be output to the printer.

38. A method according to claim 33, further comprising the step of inquiring of a job list to the print control apparatus, and if the inquiring step inquires of the job list to the print control apparatus, the print control apparatus inquires of a list of jobs presently in the printer, forms job list information of a list of all jobs in said print system in accordance with a job list received from the printer and a list of jobs presently in the print control apparatus, and notifies the information processing apparatus of the job list information.

39. A method according to claim 33, wherein if the print control apparatus does not output the output enabled information to the information processing apparatus, the information processing apparatus transmits the print data directly to the printer.

40. A method according to claim 33, wherein in registering the job information of the print data in the print control apparatus by the information processing apparatus, if the print control apparatus is in an error state, the information processing apparatus transmits the print data directly to the printer.

41. A method according to claim 33, wherein, if the output enabled information is not transmitted from the print control apparatus to the information processing apparatus for a preset time after the information processing apparatus registers the job information of the print data in the print control apparatus, the information processing apparatus transmits the print data directly to the printer.

42. A method according to claim 33, wherein if the information processing apparatus receives the output enabled information from the print control apparatus and transmits the print data to the printer and the printer does not receive the print data, the job information of the print data in the print control apparatus is re-registered in the print control apparatus.

43. A method according to claim 33, wherein the information processing apparatus holds the print data in the storage means until the printer completes a print operation.

44. A method according to claim 33, further comprising the steps of storing discrimination information of the print data with a completed print operation, and notifying the print control apparatus of the discrimination information stored in the storage device, wherein the print control apparatus deletes the job information of the print data when notified that a print operation is completed.

45. A method according to claim 44, further comprising the steps of instructing the information processing apparatus to delete the print data held by the information processing apparatus if the print control apparatus is notified of a job with a completed print operation.

46. A method according to claim 44, wherein the discrimination information of the print data stored in the storage device includes a page number of a printed page and an identifier of a job with the completed print operation.

47. A method according to claim 44, wherein the print control apparatus issues a reprint instruction to the information processing apparatus, if the print data is transferred from the information processing apparatus to the printer before the job notified in said notifying step as a job with a completed print operation.

48. A method according to claim 44, wherein the print control apparatus notifies a server of the discrimination information when the print control apparatus sends a job end notice request to the printer.

49. A method according to claim 44, wherein when the information processing apparatus receives a suspension instruction while the information processing apparatus transfers the print data to the printer, the information processing apparatus suspends transfer of the print data, and resumes the transfer of a remaining print data after a data transfer continuity instruction is received.

50. A method according to claim 34, wherein the information processing apparatus is connected to a network including a plurality of information processing apparatuses, print control apparatuses, and printers.

51. A method according to claim 34, further comprising the step of inquiring of a job list to the print control apparatus.

52. A method according to claim 34, wherein the information processing apparatus transmits the print data directly to the printer if the print control apparatus notifies the information processing apparatus that the print data can be output to the printer.

53. A method according to claim 34, wherein in registering the job information of the print data in the print control apparatus by the information processing apparatus, if the print control apparatus is in an error state, the information processing apparatus transmits the print data directly to the printer.

54. A method according to claim 34, wherein, if output enabled information is not transmitted from the print control apparatus to the information processing apparatus for a preset time after the information processing apparatus registers the job information of the print data in the print control apparatus, the information processing apparatus transmits the print data directly to the printer.

55. A method according to claim 34, wherein if the information processing apparatus receives output enabled information from the print control apparatus and transmits the print data to the printer and the printer does not receive the print data, the job information of the print data in the print control apparatus is re-registered in the print control apparatus.

56. A method according to claim 34, wherein the information processing apparatus holds the print data in the storage means until the printer completes a print operation.

57. A method according to claim 34, wherein when the information processing apparatus receives a suspension instruction while the information processing apparatus transfers the print data to the printer, the information processing apparatus suspends transfer of the print data, and resumes the transfer of a remaining print data after a data transfer continuity instruction is received.

58. A method according to claim 35, wherein the information processing apparatus is connected to a network including a plurality of information processing apparatuses and printers.

59. A method according to claim 35, wherein the outputting step judges whether the print data can be output from the external apparatus to the printer, and if it is judged that the print data can be output, the output enabled information is output to the external apparatus with the print data.

60. A method according to claim 35, wherein when a job list is inquired of by the external apparatus, the information processing apparatus inquires of a list of jobs presently in the printer, forms job list information of a list of all jobs in a system in accordance with a job list received from the printer and a list of jobs presently in the information processing apparatus, and notifies the external apparatus of the job list information.

61. A method according to claim 35, wherein when discrimination information of print data with a completed print operation is notified by the printer, the job information of the print data is deleted.

62. A method according to claim 35, further comprising the step of instructing the external apparatus to delete the print data of the external apparatus, wherein when a job with a completed print operation is notified by the printer, said instructing step instructs the external apparatus to delete the print data.

63. A method according to claim 61, wherein, if there is print data transferred from the external apparatus to the printer before the job notified by the printer as a job with the completed print operation, a reprint instruction is issued to the external apparatus.

64. A method according to claim 61, further comprising the step of requesting a job end notice to the printer, wherein discrimination information of the job end notice is received from the printer after said requesting step requests the job end notice.

65. A computer-readable memory medium storing a computer program comprising:
    first transmission program code for transmitting job information that includes information designating a printer but includes not print data to a print control apparatus so as to allow the print control apparatus to control a print order of the printer;
    spooling program code for spooling print data in storage means even after said first transmission program code transmits the job information to the print control apparatus; and
    second transmission program code for transmitting the print data spooled in the storage means to the printer but not through the print control apparatus when the print control apparatus indicates that print data can be output to the printer.

66. A computer program comprising:
    first transmission program code for transmitting job information that includes information designating a printer but includes no print data to a print control apparatus so as to allow the print control apparatus to control a print order of the printer;
    spooling program code for spooling print data in storage means even after said first transmission program code transmits the job information to the print control apparatus; and
    second transmission program code for transmitting the print data spooled in the storage means to the printer but not through the print control apparatus when the print control apparatus indicates that print data can be output to the printer.

67. A memory medium according to claim 65, wherein the information processing apparatus is connected to a network including a plurality of information processing apparatuses, print control apparatuses, and printers.

68. A memory medium according to claim 65, wherein the program further comprises inquiry program code for inquiring of a job list to the print control lapparatus.

69. A memory medium according to claim 65, wherein the information processing apparatus transmits the print data directly to the printer if the print control apparatus notifies the information processing apparatus that the print data can be output to the printer.

70. A memory medium according the claim 65, wherein, in registering the job information of the print data in the print control apparatus by the information processing apparatus, if the print control apparatus is in an error state, the information processing apparatus transmits the print data directly to the printer.

71. A memory medium according to claim 65, wherein, if output enabled information is not transmitted from the print control apparatus to the information processing apparatus for a preset time after the information processing apparatus registers the job information of the print data in the print control apparatus, the information processing apparatus transmits the print data directly to the printer.

72. A memory medium according to claim 65, wherein, if the information processing apparatus receives output enabled information from the print control apparatus and transmits the print data to the printer and the printer does not receive the print data, the job information of the print data in the print control apparatus is re-registered in the print control apparatus.

73. A memory medium according to claim 65, wherein the information processing apparatus holds the print data in the memory until the printer completes a print operation.

74. A memory medium according to claim 65, wherein, when the information processing apparatus receives a suspension instruction while the information processing apparatus transfers the print data to the printer, the information processing apparatus suspends transfer of the print data, and resumes the transfer of a remaining print data after a data transfer continuity instruction is received.

75. A computer program according to claim 66, wherein the information processing apparatus is connected to a network including a plurality of information processing apparatuses, print control apparatuses, and printers.

76. A computer program according to claim 66, further comprising inquiry program code for inquiring of a job list to the print control apparatus.

77. A computer program according to claim 66, wherein the information processing apparatus transmits the print data directly to the printer if the print control apparatus notifies the information processing apparatus that the print data can be output to the printer.

78. A computer program according to claim 66, wherein, in registering the job information of the print data in the print control apparatus by the information processing apparatus, if the print control apparatus is in an error state, the information processing apparatus transmits the print data directly to the printer.

79. A computer program according to claim 66, wherein, if output enabled information is not transmitted from the print control apparatus to the information processing apparatus for a preset time after the information processing apparatus registers the job information of the print data in the print control apparatus, the information processing apparatus transmits the print data directly to the printer.

80. A computer program according to claim 66, wherein, if the information processing apparatus receives output enabled information from the print control apparatus and transmits the print data to the printer and the printer does not receive the print data, the job information of the print data in the print control apparatus is re-registered in the print control apparatus.

81. A computer program according to claim 66, wherein the information processing apparatus holds the print data in the memory until the printer completes a print operation.

82. A computer program according to claim 66, wherein, when the information processing apparatus receives a suspension instruction while the information processing apparatus transfers the print data to the printer, the information processing apparatus suspends transfer of the print data, and resumes the transfer of a remaining print data after a data transfer continuity instruction is received.

* * * * *

UNITED STATES PATENT AND TRADEMARK OFFICE
CERTIFICATE OF CORRECTION

PATENT NO. : 6,115,132
DATED : September 5, 2000
INVENTOR(S) : Takuji Nakatsuma et al.

It is certified that error appears in the above-identified patent and that said Letters Patent is hereby corrected as shown below:

[30] FOREIGN APPLICATION PRIORITY DATA

"Nov. 1, 1997" should read --Nov. 7, 1997--.

Column 1:
Line 66, "print server should read --printer server--.

Column 2:
Line 58, "terminal" should read --terminals--.

Column 5:
Line 52, "network 16" should read --network 106--.

Column 11:
Line 44, "inquiries" should read --inquiries of --.

Column 12:
Line 30, "it is a time" should read --it is time--.
Line 34, "it is a time" should read --it is time--.

Column 13:
Line 30, "therefor" should read --therefore--.
Line 37, "requested" should read --that requested--.

Column 20:
Line 64, "waist" should read --wasted--.

Column 22:
Line 58, "received" should read --which received--.

Column 24:
Line 48, "received" should read --which received--.

UNITED STATES PATENT AND TRADEMARK OFFICE
CERTIFICATE OF CORRECTION

PATENT NO.    : 6,115,132
DATED         : September 5, 2000
INVENTOR(S)   : Takuji Nakatsuma et al.

It is certified that error appears in the above-identified patent and that said Letters Patent is hereby corrected as shown below:

Column 25:
Line 42, "received" should read --which received--.
Line 67, "received" should read --which received--.

Column 26:
Line 53, "so long" should read --so long as--.

Column 27:
Line 4, "already" should read --that already--; and
       "and still not" should read --and still has not been--.
Line 45, "to Step S4902" should read --from Step 4902--.
Line 56, "received" should read --which received--.
Line 58, "received" should read --which received--.
Line 61, "received" should read --which received--.

Column 30:
Line 45, "reprint." should read --reprinted.--.
Line 67, "form" should read --from--.

Column 32:
Line 14, "inquiries" should read --inquiries of--.
Line 32, "communications terminal" should read --communication terminals--.
Line 45, "issues" should read --issue--.
Line 65, "transmitter" should read --a transmitter--.

Column 34:
Line 60, " spool means" should read --a spool circuit adapted--; and
       "storage means" should read a memory--.
Line 61, "transmitting means" should read --transmitter--.
Line 66, "storage means" should read --memory--.

UNITED STATES PATENT AND TRADEMARK OFFICE
CERTIFICATE OF CORRECTION

PATENT NO.    : 6,115,132
DATED         : September 5, 2000
INVENTOR(S)   : Takuji Nakatsuma et al.

It is certified that error appears in the above-identified patent and that said Letters Patent is hereby corrected as shown below:

Column 35:
Line 6, "inquiry means" should read --an inquiry circuit adapted--.
Line 36, "storage means" should read --memory--.
Line 47, "sequential" should read --a sequential--; and "means" should read
    --circuit adapted--.
Line 53, "outputting" should read --an outputting--; and "means" (first occurrence)
    should read --circuit adapted--; and "means" (second occurrence) should
    read --control circuit--.
Lin 67, "means" should read --circuit--.

Column 36:
Line 5, "wherein" should read --wherein,--.
Line 13, "wherein" should read --wherein,--.
Line 17, "deletion" should read --a deletion--; and
    "means" should read --circuit adapted--.
Line 19, "wherein" should read --wherein,--.
Line 21, "means" should read --circuit--.
Line 29, "requesting" should read --a requesting--; and "means" should read
    --circuit adapted--.
Line 32, "means" should read --circuit--.
Line 42, "storage" should be deleted.
Line 43, "means" should read --a memory--.

Column 37:
Line 53, "wherein" should read --wherein,--.
Line 66, "wherein" should read --wherein,--.

UNITED STATES PATENT AND TRADEMARK OFFICE
CERTIFICATE OF CORRECTION

PATENT NO. : 6,115,132
DATED : September 5, 2000
INVENTOR(S) : Takuji Nakatsuma et al.

It is certified that error appears in the above-identified patent and that said Letters Patent is hereby corrected as shown below:

Column 38:
Line 7, "storage means" should read --memory--.
Line 12, "storage device" should read --memory--.
Line 22, "storage device" should read --memory--.
Line 53, "wherein" should read --wherein, --.
Line 66, "wherein" should read --wherein,--.

Column 39:
Line 7, "storage means" should read --memory--.
Line 8, "wherein" should read --wherein,--.
Line 59, "storage" should be deleted.
Line 60, "means" should read a --a memory--.
Line 64, "storage means" should read --memory--.

Column 40:
Line 12, "storage means" should read --memory--.
Line 22, "/apparatus." should read --apparatus.--.
Line 28, "the claim" should read --to claim--.

Signed and Sealed this

Nineteenth Day of June, 2001

*Attest:*

*Attesting Officer*

NICHOLAS P. GODICI
*Acting Director of the United States Patent and Trademark Office*